ated Liquid Crystal

United States Patent [19]

Nishimura et al.

[11] Patent Number: 4,848,879
[45] Date of Patent: Jul. 18, 1989

[54] LIGHT MODULATING DEVICE

[75] Inventors: Yukuo Nishimura, Sagamihara; Yuko Miyajima, Tokyo; Kazuo Minoura, Yokohama; Takeshi Baba, Yokohama; Kazuhiko Matsuoka, Yokohama; Masayuki Usui, Yokohama; Atsushi Someya, Machida, all of Japan

[73] Assignee: Canon Kabushiki Kaisha, Tokyo, Japan

[21] Appl. No.: 63,788

[22] Filed: Jun. 22, 1987

Related U.S. Application Data

[63] Continuation of Ser. No. 902,074, Aug. 27, 1986, abandoned, which is a continuation of Ser. No. 539,675, Oct. 6, 1983, abandoned.

[30] Foreign Application Priority Data

| Oct. 9, 1982 | [JP] | Japan | 57-178154 |
| Oct. 13, 1982 | [JP] | Japan | 57-179265 |
| Mar. 30, 1983 | [JP] | Japan | 58-54339 |
| Apr. 12, 1983 | [JP] | Japan | 58-63868 |
| Apr. 12, 1983 | [JP] | Japan | 58-63869 |
| Apr. 25, 1983 | [JP] | Japan | 58-72427 |
| Apr. 28, 1983 | [JP] | Japan | 58-75833 |
| Apr. 28, 1983 | [JP] | Japan | 58-75835 |
| May 19, 1983 | [JP] | Japan | 58-88668 |
| Jun. 10, 1983 | [JP] | Japan | 58-103730 |

[51] Int. Cl.$^4$ .............................. G02F 1/19
[52] U.S. Cl. .................. 350/353; 350/339 R; 350/351; 350/355
[58] Field of Search ............... 350/353–354, 350/351, 391–393, 418

[56] References Cited

U.S. PATENT DOCUMENTS

| 3,085,469 | 4/1963 | Carlson | 350/393 |
| 3,434,779 | 3/1969 | Damen et al. | 350/353 |
| 3,529,156 | 9/1970 | Fergason et al. | 350/351 |
| 3,637,287 | 1/1972 | Hansen | 350/393 |
| 3,669,541 | 6/1972 | Duguay | 350/393 |
| 3,790,252 | 2/1974 | Pao | 350/354 |
| 3,796,999 | 3/1974 | Kahn | 350/351 |
| 3,840,695 | 10/1974 | Fischer | 350/408 |
| 4,031,529 | 6/1977 | Borel et al. | 350/351 |
| 4,169,661 | 10/1979 | Yamada et al. | 350/353 |
| 4,262,198 | 4/1981 | Gupta et al. | 250/340 |
| 4,297,004 | 10/1981 | Nishimura et al. | 350/339 R |
| 4,470,669 | 9/1984 | Kubota et al. | 350/351 |
| 4,472,026 | 9/1984 | Boyd et al. | 350/351 |
| 4,480,899 | 11/1984 | Sprague | 350/356 |
| 4,491,393 | 1/1985 | Roelants | 350/392 |

FOREIGN PATENT DOCUMENTS 2548846 5/1976 Fed. Rep. of Germany ...... 350/353

OTHER PUBLICATIONS

Liu et al. "Optical Beam Deflection by Pulsed Temperature Gradients in Bulk GaAs", Proc. IEEE 5-1965, pp. 522–523.

Gunn, J. B., "Light Modulator and Optical Logical Devices", IBM Tech. Disc. Bull. 5-1965, pp. 1202–1204.

Grischkowsky, D. "A Light-Controlled Light Modulator" App. Phys. Letts. 10-1977, pp. 437–440.

Powers, J. V. "Thermally Activated Liquid Crystal (List continued on next page.)

Primary Examiner—Bruce Y. Arnold
Assistant Examiner—Martin Lerner
Attorney, Agent, or Firm—Fitzpatrick, Cella, Harper & Scinto

[57] ABSTRACT

This specification discloses a light modulating device comprising a liquid medium whose physical properties are variable by heat, and a heat-generating element for heating the liquid medium to such a degree that boiling does not occur to the liquid medium. The specification also discloses a light modulation apparatus comprising a liquid medium whose physical properties are variable by heat, a heat-generating element for heating the liquid medium to such a degree that boiling does not occur to the liquid medium, and a optical system for taking out one of a light flux modulated by the variation in physical properties of the liquid medium and a light flux not modulated by said variation from a state in which the light fluxes are mixedly present.

19 Claims, 53 Drawing Sheets

OTHER PUBLICATIONS

Display", IBM Tech. Disc. Bull. 11-1972, pp. 1811.
Rieckhoff, K. E. "Self-Induced Divergence of C. W. Laser Beams in Liquids—A New Nonlinear effect in the Propagation of Light" App. Phys. Letts. 7-1966, pp. 87-88.
Reintjes, J. F. "Nonlinear Optical Parametric Processes in Liquids & Gases" Academic Press 1984 pp. 1-4.
Tilton et al., "Refractive Index and Dispersion of Distilled Water For Visible Radiation", at Temperatures 0° to 60° C., Research Paper RP1085 National Bureau of Standards, Jr. of Research Nat. Bur. of Stand. vol. 20, 4-1938.
CRC Handbook of Chemistry and Physics, 56th Ed. (1975:6) B-95.

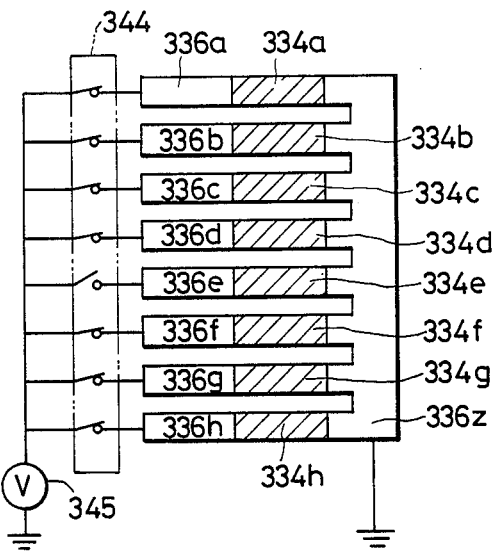
FIG. 51
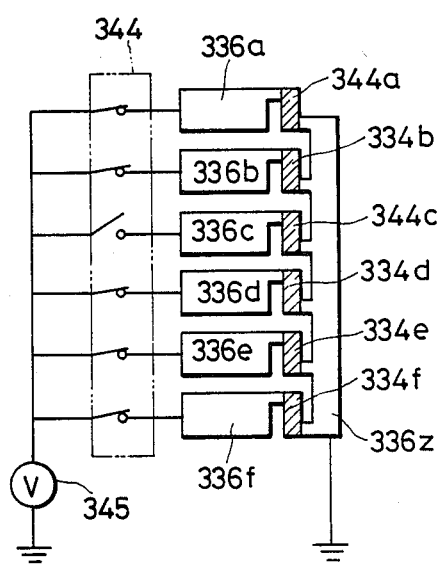
FIG. 52
FIG. 53(A)
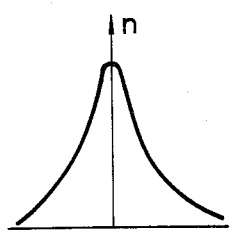
FIG. 53(B)
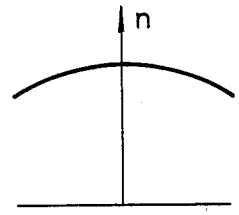

FIG. 97
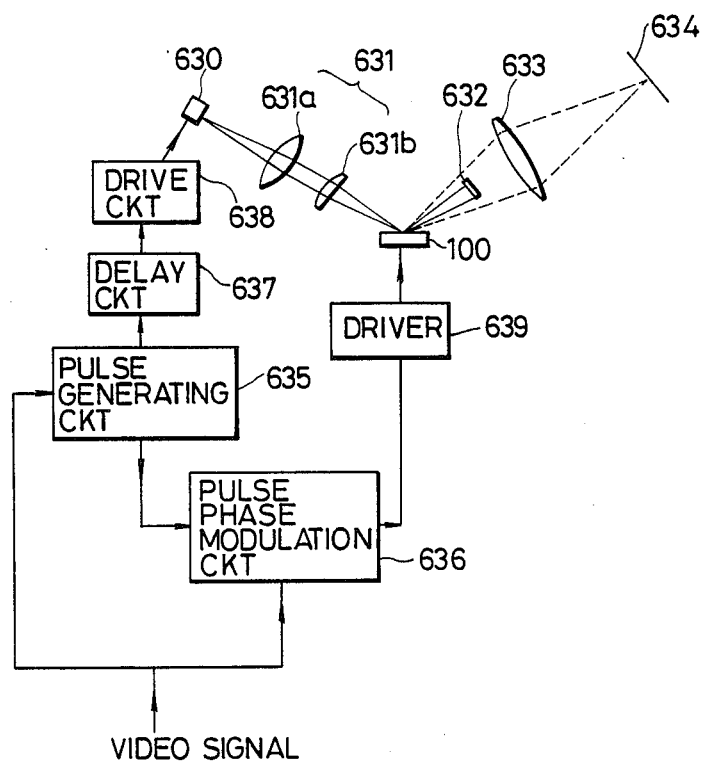
VIDEO SIGNAL
FIG. 98(A)
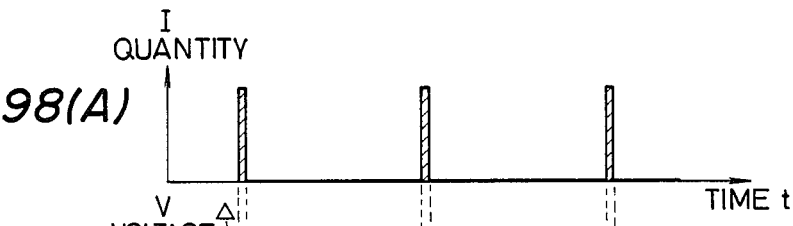
FIG. 98(B)
FIG. 98(C)
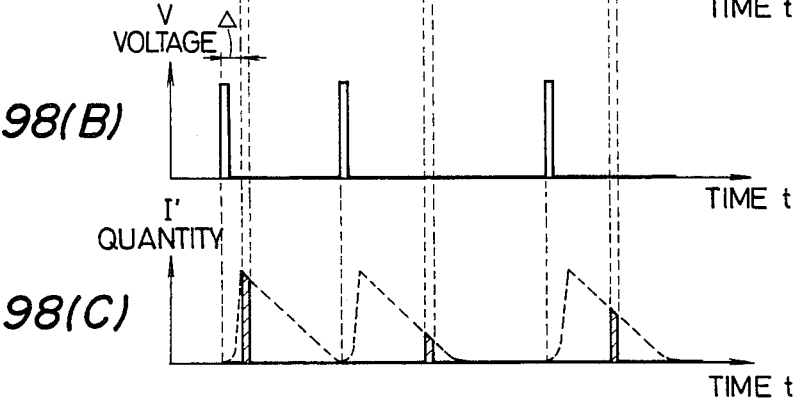

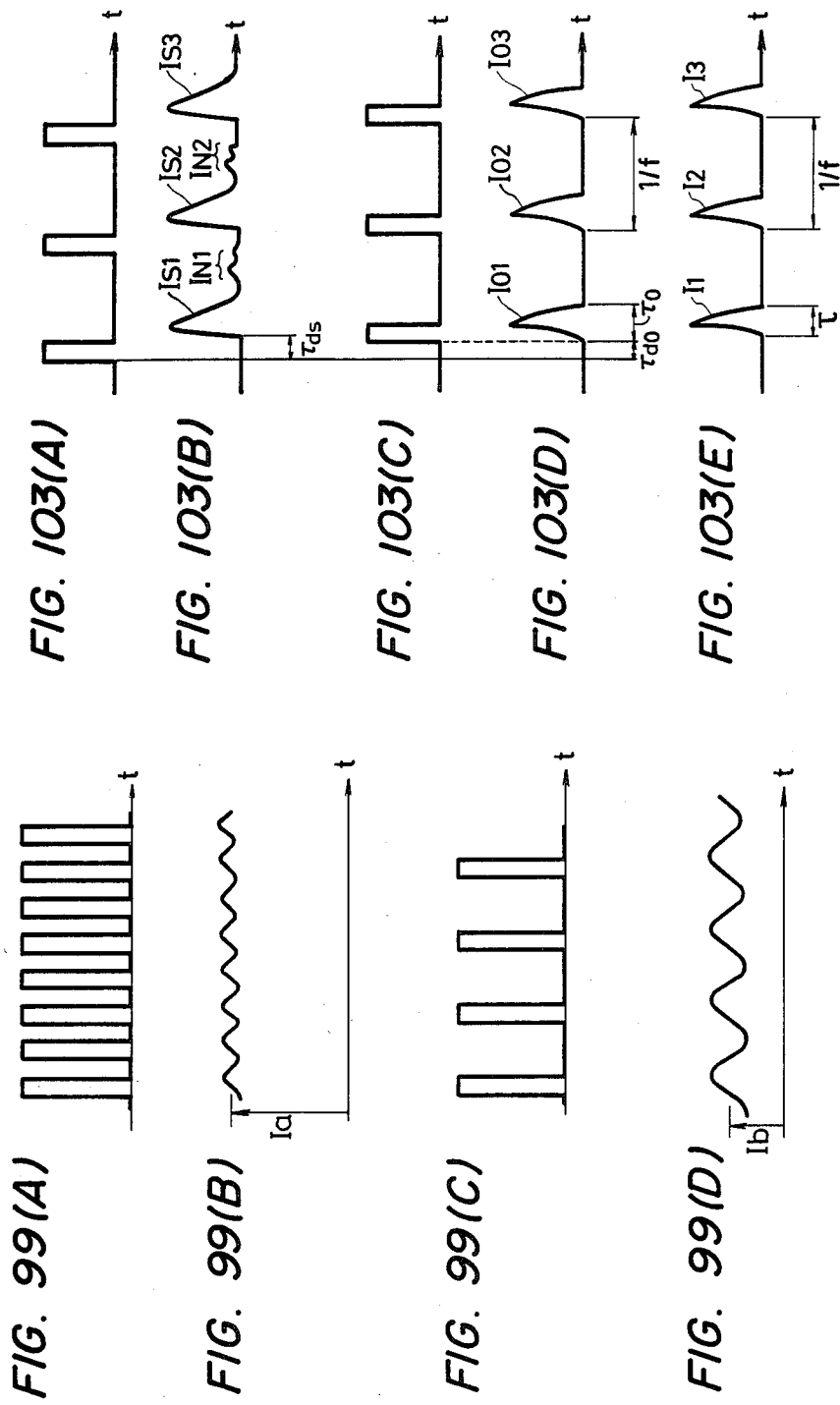

FIG. 104
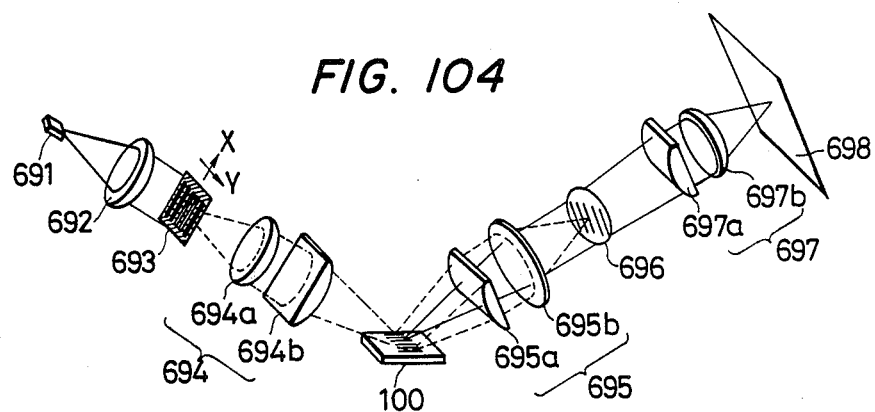
FIG. 105(A)
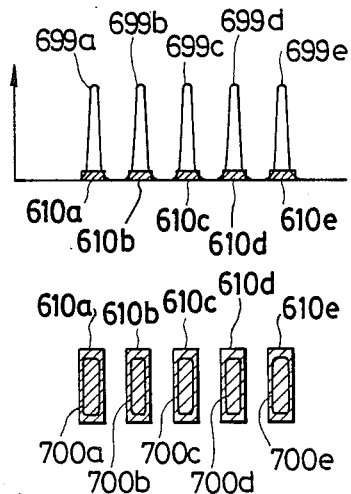
FIG. 105(B)
FIG. 107(A)
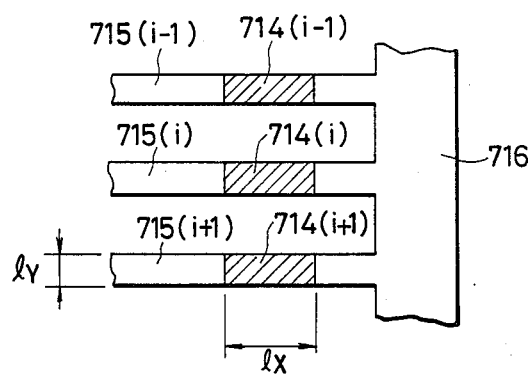
FIG. 107(B)
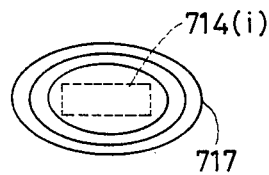

LIGHT MODULATING DEVICE

This application is a continuation of application Ser. No. 902,074, filed Aug. 27, 1986, now abandoned, which is a continuation of application Ser. No. 539,675 filed Oct. 6, 1983, also now abandoned.

BACKGROUND OF THE INVENTION

1. Field of the Invention

This invention relates to a light modulating device suitable for an optical recording apparatus, an optical display apparatus or the like.

2. Description of the Prior Art

Using a light flux to effect recording or display has heretofore been widely practiced. Various techniques of imparting modulation to a light flux for this purpose are known, and U.S. Pat. No. 4,281,904 discloses varying the electric field distribution in crystal having an electro-optic effect and causing a light flux entering a portion of the crystal in which the refractive index is varied as a result of the electric field distribution to be diffracted, thereby accomplishing modulation. However, electro-optic crystal is expensive and in use, a predetermined polarizing characteristic must be given to the light flux entering the crystal. Also, where the above-mentioned modulation is to be effected, in order that the light flux may be totally reflected in the interior portion of the optical crystal material in which an electric field has been produced and that the diffracting efficiency may be enhanced, a limitation that the light flux must be caused to enter as nearly parallel to the electrode as possible is imposed.

U.S. Pat. No. 3,612,653 may be mentioned as another example of the prior art. In the embodiment shown in this patent, an electrically conductive thin film is formed on a support member and this thin film is disposed so as to be in contact with liquid. A ray light entering the support member obliquely from the support member side is transmitted to the liquid side when the thin film is not supplied with electric power while, on the other hand, the liquid near the thin film changes into vapor when the thin film is supplied with electric power and as a result, the incident light ray is totally reflected in the interface between the electrically conductive thin film and the vapor. Therefore, the above-described embodiment suffers from numerous disadvantages, in that it is necessary to apply a high voltage to the electrically conductive thin film in order to change the liquid into vapor, the degree of freedom of the structure and arrangement of the device is lost to keep the vapor bubbles in contact with the thin film and achieve the stailization of the function of the device because the vapor bubbles are affected by buoyancy, and the electrically conductive thin film is liable to be destroyed by the localized pressure when the vapor bubbles disappear and this leads to a problem in respect of the durability of the device.

In contrast, in recent years, attention has been paid to the utilization of the distribution of refractive index by the thermal effect to effect modulation of light. The modulation of light utilizing the distribution of refractive index by the thermal effect is introduced in "The Deflection of Light Caused by the Variation in Refractive Index by Heat" (*Nikkei Electronics*, Aug. 16, 1982) or "Thermo-optic Deflection and Switching in Glass" (*Applied Optics*, Vol. 21, No. 19, pp. 3461–3465).

In these examples, $TiO_2$ crystal or glass made by the use of the ion-exchange process is used as the thermal effect medium. Generally, the degree of temperature dependence of the refractive index of a solid is small and to obtain a desired deflection characteristic, a high voltage is required as the voltage applied between electrodes or the voltage applied to a heater resistance. Also, to obtain an efficient deflection characteristic in each of the above-described examples, it is necessary to limit the propagation position of the incident light flux relative to the position of the electrode or the heater. That is, since the degree of temperature dependence of the refractive index is small as previously mentioned, it is necessary to cause the light flux to propagate through a portion as near to the position of the electrode or the heater as possible and as parallel to the surface of the electrode or the heater as possible in order to provide a suitable phase variation to the light flux.

As a further example of the prior art, an example in which use is made of an optical element comprising a dielectric metal oxide film on a light-transmitting type substrate and a pair of electrodes on the metal oxide film and the variation in refractive index by a variation in temperature of the dielectric metal oxide film is utilized to deflect transmitted light is described in Japanese Laid-open Pat. Application No. 23019/1983. However, again in this example, use is made of a solid material whose degree of temperature dependence of the refractive index is small and therefore, to obtain a desired deflection characteristic, a high voltage is required as the voltage applied between electrodes.

Japanese Laid-open Patent Application No. 97026/1983 may be mentioned as still a further example of the prior art. In the embodiment shown in this patent application, the interface between a non-heated area and a heated area is inclined relative to the optical path and a light ray is refracted and deflected in said interface by a variation in refractive index in the heated area. However, again in this embodiment, dielectric crystal is used as the medium of the heated area and, therefore, the amount of variation in refractive index resulting from the temperature change of the heated area is small, and this leads to the disadvantage that the angle of deflection is limited. Further, in the embodiment shown in said patent application, due to its construction in which a heat-generating resistance member is formed on the surface of the dielectric substrate which is parallel to the incident light, the area of the dielectric substrate in which a variation in refractive index occurs is limited to the vicinity of the heat-generating resistance member and as a result, the incidence position of the incident light ray is limited.

Also, as a prior art example of the total reflection element using liquid crystal, there is a report entitled "Integrated Hologram Memory Device Using Liquid-Crystal Optical Switch Matrix", M. Sawada et al., a paper presented at the Technical Group on Optics and Quantum Electronics, IECE Japan, Jan. 1982, available as OQE81-116. In this report, with attention being paid to the extraordinary refracting property of liquid crystal, an electric field is applied to liquid crystal to thereby vary the orientation of the liquid crystal and vary the refractive index thereof. However, this prior art example suffers from the disadvantages that the driving voltage is limited to an AC voltage, a very high voltage is required where a planar-type electrode is used, and where sandwich type electrodes are employed, two electrodes are opposed to each other on the opposite sides of the liquid crystal, which leads to a limitation in construction of the device.

SUMMARY OF THE INVENTION

It is an object of the present invention to overcome the above-noted disadvantages peculiar to the prior art and to provide a light modulating device of high performance which is excellent in drivability, producibility, durability and reliability, by a simple method.

In the present invention, the above object is achieved by using a liquid whose degree of temperature dependence of refractive index is great as a thermal effect medium whose refractive index is variable by the thermal effect. That is, heat is imparted to the liquid in accordance with an input signal, whereby a distribution or gradient of refractive index is created in the liquid, and a light flux is caused to enter the liquid having this distribution of refractive index and the wavefront of incident light flux is converted by the distribution of refractive index, thereby effecting modulation.

The light modulating device basically comprises heat-generating means formed on a base and a liquid medium. The device may be of any of the light-transmitting type which transmits incident light flux and the light-reflecting type which reflects incident light flux. In the case of the light-reflecting type, a light-reflecting layer must be disposed between the heat-generating means and the liquid medium.

The basic principle of the light modulating device of the present invention is as described above, but the contents described herein regarding the embodiments for embodying the present invention or the embodiments of the various applied forms of the device of the present invention are very diverse.

Accordingly, before the description of specific embodiments is started, description of the basic characteristics of the device of the present invention and the terms used herein and general introduction of possible applied forms will first be made.

In the light modulating device of the present invention, the degree of temperature dependence of refractive index specifically means the gradient $\Delta n/\Delta T$ of refractive index when it is assumed that when the aforementioned liquid has changed from a temperature T° C. to a temperature $(T+\Delta T)°$ C., the refractive index of the liquid changes from n to $(n+\Delta n)$ correspondingly to said temperature change. The liquid used as the thermal effect medium may be any liquid such as water or various organic solvents as later described in detail with respect to embodiments of the present invention and in addition, liquid crystal is also included in the category thereof. Particularly, liquid crystal has great $\Delta n/\Delta T$ as compared with the other liquids and in addition, when a phase change is caused between the liquid crystal phase and the liquid phase by a temperature change, the refractive index thereof varies by 0.1 or more and therefore, it is preferred as a material for embodying the present invention.

As the means for imparting heat to liquid, as will later be described with respect to the embodiments, mention may be made of a heat-generating resistance member, namely, a resistance member which generates heat due to Joule's heat by having a voltage applied thereto, or a light-to-heat converting medium, namely, a medium which absorbs radiation and generates heat.

Conversion of incidence wavefront including scattering, diffraction, deflection, etc. is caused by the aforementioned distribution of refractive index, and the wavefront subjected to said conversion and the wavefront not subjected to said conversion can be separated from each other by various methods as will later be shown with respect to the embodiments. The former will hereinafter be referred to as the modulated light flux, and the latter as the non-modulated light flux.

The ratio of quantity of light between the modulated light flux and the non-modulated light flux is defined as the contrast of quantity of light.

Also, the effect of modulating a light flux by imparting heat to a thermal effect medium as in the light modulating device of the present invention will hereinafter be referred to as the thermo-optic effect.

Describing now the response speed of the device, many of the conventional light modulating devices utilizing the electro-optic effect or the acousto-optic effect use optic crystal and the response speed of the modulation of light relative to an electrical signal input to them is high and the decay or fall time is short. For example, in many of the light modulating devices utilizing the electro-optic effect or the acousto-optic effect, the decay time is 1 μsec or less.

In contrast, the modulation characteristics of the light modulating device of the present invention differ from those of the electro-optic or acousto-optic type light modulating devices and a particularly remarkable difference is that the decay time is as long as several tens of μsec to several tens of msec.

Herein, the time from after a thermal pulse has been applied to the liquid until the temperature reaches a external value in the heated area in the liquid layer is called the rise time and conversely, the time during which this heated area disappears or is erased is called the fall or decay time.

The features, function and possible forms of the light modulating device of the present invention will hereinafter be introduced briefly.

In the light modulating device according to the present invention, with attention being paid to the fact that the decay time of the aforedescribed thermo-optic effect type light modulating device is long, such phenomenon is positively utilized to effect time-shared drive, whereby simplification of driving means can be achieved. Also, the application of such simplified driving means to a shutter array device is possible. Alternatively, the quantity of light of the modulated light flux can be controlled by controlling the illuminating method within said decay time.

Such control of the quantity of light of the modulated light flux enables formation of half-tone images in recording and display. Also, as a half-tone image forming method, it is possible to selectively operate a plurality of light modulating portions.

Description will now be made of several possibilities regarding the improvement of the modulating efficiency of the device and the reduction of noise. There are various causes of the noise which is present in the modulated light flux of the device, including the noise attributable to the structure of the device and the scattered light caused by dust or impurities present in the liquid, and these noises can be eliminated by applying a contrivance to the shape of the device or the illuminating method. Alternatively a method of providing illuminating means using a grating for illuminating only the light modulating portions of the light modulating device which are arranged at a predetermined interval is also possible. As a method for reducing the noise by the use of an optical system, use may be made of a so-called Schlieren optical system and the effect can be enhanced by contriving the arrangement thereof.

If attention is paid to the thermal effect medium or the heat-generating means, the diverging angle of the emergent modulated light flux can be made greater to enhance the rate of utilization of light by contriving the structure of the medium material or the heat-generating means for endowing the distribution of refractive index in the medium with a particular directionality.

A method which does not use the Schlieren optical system as mentioned above is also possible as the means for separating the modulated light flux and the non-modulated light flux. Some examples thereof will be shown below.

For example, it is possible to separate the modulated light flux and the non-modulated light flux by utilizing the phenomenon of total reflection on the interface or to separate the modulated light flux and the non-modulated light flux by utilizing an eccentric optical system. Alternatively, there is a method whereby a light-receiving medium is disposed at a position different from the imaging point of the modulated light flux by an optical system and when heat is generated in the thermal effect medium, a centrally shaded image is created on the light-receiving medium to thereby effect light modulation. The term "centrally shaded image" used herein means a state in which the quantity of light in the central portion of the imaged light flux is reduced as compared with that in the marginal portion and the central portion forms a dark or shaded area.

As regards the possible forms of the present invention, there are also a color light valve, an optical switch, etc. in addition to the previously described examples. As far as structure is concerned, the device of the present invention and the optical system can also be integrated into a device of integral structure. According to such a method, the device, including the optical system, can be manufactured by a consistent process and thus, it is possible to realize a light modulating optical system having an inexpensive, light-weight and compact construction.

In addition, it is also possible to provide an illuminating method suitable for a light modulating optical system which requires uniform illumination over the entire array as in a case where a plurality of devices of the present invention are arranged into a long arrayed-structure.

Finally, the time response characteristic of the device of the present invention will be described. In the light modulating device of the present invention, it is known that if the angle of incidence of the light flux is changed, the time response characteristic of the optical output is varied. Accordingly, an optimum angle of incidence of the light flux can be chosen in accordance with the frequency of the driving pulse.

The features, function and possible forms of the light modulating device of the present invention have been described above. As will be seen from the foregoing description, the device of the present invention has the following excellent effects:

(1) By choosing a liquid having the thermal effect, the diverging angle of the light flux modulated by the distribution of refractive index can be secured relatively greatly, whereby the modulated light and the non-modulated light. can be efficiently separated from each other which leads to high utilization efficiency of the light flux and high contrast;

(2) Where the light flux is caused to diverge by the distribution of refractive index, a predetermined scattering characteristic is obtained relative to a relatively wide range of the angle of incidence of the light flux incident on a liquid having a distribution of refractive index and therefore, little limitation is imposed on the arrangement of the optical system;

(3) Where electro-optic crystal is used, one light modulation can be accomplished by two electrodes, whereas if the divergence by the distribution of refractive index is used as in the present invention, one light modulation can be accomplished by one electrode and accordingly, high density modulation per unit area is possible and it becomes possible to enhance the quality during display or recording;

(4) Where the light flux is caused to diverge by the distribution of refractive index, the incident light flux need not be polarized and even the use of a popular light source other than a laser may result in obtainment of a similar effect and, thus, the device can be formed inexpensively;

(5) The heat-generating resistance member for causing the distribution of refractive index can be easily formed by the use of the IC pattern manufacturing method and high density arrangement of 100 or more such resistance members per 1 mm is also readily possible and thus, it becomes possible to enhance the quality of images. Further, if the IC pattern manufacturing method is used, 1,000 to 10,000 heat-generating resistance members can be arranged on the order of 1 micron and it is easy to arrange heat-generating resistance members corresponding to the number of dots necessary for the scanning of one line. Accordingly, the scanning of one line can be accomplished at a time, and this leads to increased speed of image recording and image display;

(6) Multi-colored display and full-colored display can be easily carried out;

(7) Modulation is effected not by forming vapor bubbles but by heating the liquid layer to a temperature below its boiling point and therefore, the electric power used for the modulating device may be small and correspondingly, the power source unit, i.e., the light recording apparatus and the display apparatus, can be made compact; and (8) The display contrast depends on the degree of heating of the liquid in the liquid layer and therefore, it is easy for display to be effected in half-tone in an analogous fashion.

The invention will become more fully apparent from the following detailed description thereof taken in conjunction with the accompanying drawings.

BRIEF DESCRIPTION OF THE DRAWINGS

FIGS. 102, 103(A) and (B), 104, 105(A) and (B), 106(A) and (B), 107(A) and (B), 108, 109(A) and (B), 110, 111 and 112 illustrate embodiments regarding an illuminating system for causing a light flux to enter the light modulating device of the present invention or the method thereof.

DESCRIPTION OF THE PREFERRED EMBODIMENTS

The present invention will hereinafter be described in detail by reference to the drawings.

Figure 1A:
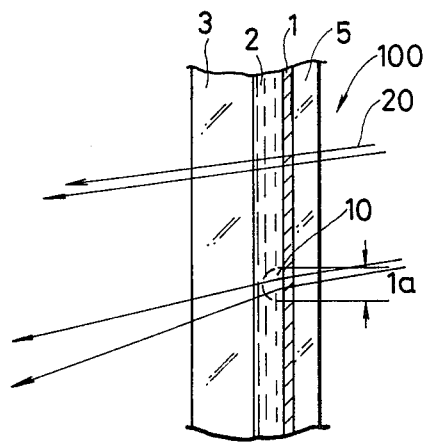
FIGS. 1(A) and (B) illustrate the principle of the present invention.
Figure 1B:
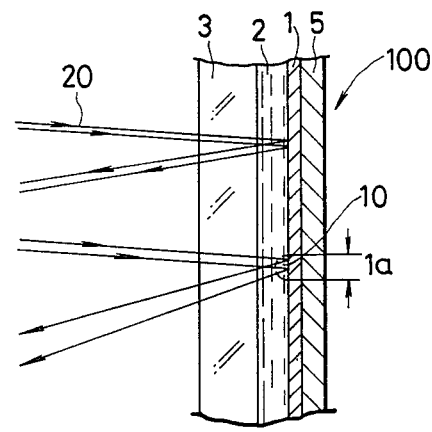

FIGS. 1(A) and 1(B) are schematic cross-sectional views for illustrating the principle of operation of the modulating device according to the present invention. FIG. 1(A) shows a transmitting type modulating device 100, and FIG. 1(B) shows a reflecting type modulating device 100. Designated by 1 is heat-generating means for varying the physical properties of a liquid layer 2 and heating the liquid layer 2 to such a degree that boiling does not occur to the liquid layer 2. This heat-generating means 1, as will later be described, generates heat in one of various forms such as dot matrix form, dot line form, line form and island form and heats the liquid layer 2 by heat conduction. This heat-generating means 1 may be, for example, one utilizing the radiation heating to be described on one utilizing Joule's heat such as resistance heating. Where the modulating device 100 is of the transmitting type, the heat-generating means 1 and the liquid in the liquid layer 2 must be of the transmitting type for incident light. The basic composition of the liquid in the liquid layer 2 may be single one of water or various organic solvents, or any mixture thereof. Alternatively, liquid crystal may also be used. The various organic solvents include alkyl alcohol such as methyl alcohol, ethyl alcohol, n-propyl alcohol, isopropyl alcohol, n-butyl alcohol, sec-butyl alcohol, tertbutyl alcohol, isobutyl alcohol, pentyl alcohol, hexyl alcohol, heptyl alcohol, octyl alcohol, nonyl-alcohol and decylalcohol; hydrocarbon solvents such as hexane, octane, cyclopentane, benzene, toluene and xylol; halogenated hydrocarbon solvents such as carbon tetrachloride, trichloroethylene, tetrachloroethylene, tetrachloroethane and dichlorobenzene; ether solvents such as ethylether, butylether, ethylene glycol diethylether and ethylene glycol monoethylether; ketone solvents such as acetone, methyl ethyl ketone, methyl propyl ketone, methyl amyl ketone and cyclohexanone; ester solvents such as ethyl formate, methylacetate, propyl acetate, phenyl acetate and ethylene glycol monoethyletheracetate; alcohol solvents such as diacetone alcohol; amides such as dimethylformamide and dimethylacetamide; amines such as triethanolamine and diethanolamine; polyalkylene glycols such as polyethylene-glycol and polypropylen glycol; alkylene glycols such as ethylene glycol, proplene glycol, butylene glycol, hexlene glycol; polyhydric alcohols such as glycerol; and petroleum hydrocarbon solvents. The thickness of the liquid layer 2 should desirably be in the range of 1 $\mu$m to 1 mm.

Designated by 3 is a transparent protective plate formed of light-transmitting (colorless or light-colored) glass or plastics having a pressure-resisting property as much as possible. Where the modulating device 100 is horizontally disposed, this protective plate need not be employed. Reference numeral 5 designates a substrate. In the case of the transmitting type modulating device 100 shown in FIG. 1(A), the substrate 5, like the transparent protective plate 3, may be formed of light-transmitting (colorless or light-colored) glass or plastics having a pressure-resisting property, and in the case of the reflecting type modulating device shown in FIG. 1(B), the substrate 5 should preferably be formed of a material having a pressure-resisting property. The heat-generating means 1 is provided on the substrate 5, but in some cases, the heat-generating means 1 and the substrate 5 are used in common and in some particular case, the heat-generating means does not require the substrate 5. Basically, the substrate 5, the heat-generating means 1, the liquid layer 2 and the transparent protective plate 3 layered in the named order together constitute the modulating device 100 according to the present invention. Reference numeral 20 denotes an illuminating light entering the modulating device 100 in the form of a parallel beam. The illuminating light 20 may be a natural light or light from an artificial light source, not shown, and enters both the non-heating section and the heating section 1a of the heat-generating means 1 Reference numeral 10 designates the heated area of the liquid layer which is a high temperature region formed by heating a part of the low-temperature region of the liquid layer 2 to such a degree that it is not boiled, that is, the portion of the liquid layer 2 heated, for example, by the heating section 1a in which the heat-generating means 1 is generating heat. Actually, in some cases, there is a temperature gradient from the heating section 1a toward the surrounding liquid layer and the physical properties of the liquid in this portion of the liquid layer 2 ar changed from the physical properties thereof before heated by the heat-generating means 1 (however, where the liquid layer 2 is preheated by the heat-generating means 1, the liquid layer 2 is further heated t form the heated area 10 of the liquid layer from the preheated state of the liquid layer and therefore, the physical properties of the thus formed heated area 10 of the liquid layer are changed from the physical properties of the liquid layer 2 in the preheated state).

Such change of the physical properties of the liquid layer 2 particularly means a change of optical physical properties and more specifically, means, for example, changes of the refractive index, density, polarizability, etc. of the liquid forming the liquid layer 2. For example, as regards the refractive index, it is assumed that the liquid of the liquid layer 2 has risen from a temperature $T°$ C. to a temperature $(T+\Delta T)°$ C. due to the heat generation of the heating section 1a of the heat-generating means 1. In this case, if the refractive index of the liquid at the temperature $T°$ C. is n and the refractive index of the liquid at the temperature $(T+\Delta T)°$ C. in $n+\Delta n$, then the degree of temperature dependence of the refractive index of the liquid is expressed by $\Delta n/\Delta T$. The rate of change of the refractive index, namely, the change of the refractive index for temperature, is slight, but when a minute area of the liquid layer near the heating section 1a is heated, the gradient of the refractive index in this minute area becomes great and accordingly, by passing through the heated area 10 of the liquid area in this heated minute area, light is subjected to conversion of wavefront including refraction, scattering, diffraction, etc. in the area wherein the gradient of the refractive index is great.

The degree of temperature dependence $\Delta n/\Delta T$ of refractive index of liquid, if the above-mentioned liquids are taken as examples, is $-1.0 \times 10^{-4}$ in the case of water and $-4.0 \times 10^{-4}$ in the case of ethyl alcohol. In contrast, in the case of the previously mentioned conventional thermal effect type crystals, $TiO_2$ exhibits $-7.2 \times 10^{-5}$ for abnormal light and $-4.2 \times 10^{-5}$ for ordinary light, $PbMoO_4$ exhibits $-4.1 \times 10^{-5}$ for extraordinary light and $-7.2 \times 10^{-5}$ for ordinary light, and $LiNbO_3$ exhibits $5.3 \times 10^{-5}$ for extraordinary light and $0.56 \times 10^{-5}$ for ordinary light, and thus, any of these crystals exhibits a value smaller by a unit than liquids. These data are the values for a light flux of wavelength 632.8 mm.

Where isotropic liquid is thus used a medium for converting the wavefront of incident light, no special attention need be paid to polarization as in the conventional crystals. Also, the degree of temperature dependence $\Delta n/\Delta T$ of refractive index is great in its absolute value as compared with the conventional crystals, and the phase difference between a light flux subjected to modulation and a light flux not subjected to modulation can be made great. This means that it is not necessary to cause the light flux to propagate parallel to the surface of the electrode or the surface of the heat-generating resistance member as in the prior art. That is, the light flux may be caused to enter perpendicularly to the surface of the heat-generating resistance member or any other angle of incidence may be used and thus, the limitations in assembling the modulating device into an apparatus can be eliminated.

It is to be noted that a liquid crystal is also used as the medium constituting the liquid layer 2. The liquid crystal also has an absolute value of the degree of the temperature dependence of the refractive index, as compared with ordinary crystals. In addition, the liquid crystal has peculiar properties such as described below. That is, the liquid crystal shows phase transition between a liquid crystal phase and liquid phase across a certain phase-transition temperature. The refractive index in the liquid crystal phase can be represented by $n_e$ and $n_o$ since in this phase the liquid crystal is an anisotropic medium, while the refractive index in the liquid phase can be represented by $n_i$ since in this phase the liquid crystal is an isotropic medium. In fact, there exists such a liquid crystal that has a refractive index difference $\Delta n$ $(n_e - n_i)$ or $\Delta n$ $(n_o - n_i)$ of not less than 0.1. Thus, the liquid crystal is preferable as a medium to be used in the liquid layer 2. However, where the liquid crystal is used, it is necessary to pay attention to the polarization state of the light flux and the directionality of the molecular axis of the liquid crystal, in view of the anisotropy in the liquid crystal phase.

As the liquid forming the liquid layer 2, a liquid having a smaller specific heat is more advantageous in that the heated area of the liquid layer is easy to form for low electric power consumption. For example, where the liquid layer 2 is formed by one or a mixture of liquids such as methyl alcohol (boiling point 65° C., specific heat 0.599 cal/g. deg at 20° C.), ethyl alcohol (boiling point 78° C., specific heat 0.58 cal/g. deg at 25° C.), n-propyl alcohol (boiling point 97° C., specific heat 0.586 cal/g. deg at 25° C.), isopropyl alcohol (boiling point 82° C., specific heat 0.569 cal/g. deg at 20° C.), n-butyl alcohol (boiling point 118° C., specific heat 0.563 cal/g. deg at 25° C.), hexane (boiling point 126° C., specific heat 0.505 cal/g. deg at 25° C.), benzene (boiling point 80° C., specific heat 0.25 cal/g. deg at 25° C.), toluene (boiling point 110° C., specific heat 0.269 cal/g. deg at 25° C.), xylene (boiling point 144° C., specific heat 0.387 cal/g. deg at 30° C.), carbon tetrachloride (boiling point 77° C., specific heat 0.207 cal/g. deg at 20° C.), ethylene glycol (boiling point 198° C., specific heat 0.5619 cal/g. deg) and glycerol (boiling point 290° C. specific heat 0.569 cal/g. deg), a much better contrast is obtained than in a case where the liquid layer 2 is formed by water (boiling point 100° C., specific heat 1 cal/g. deg). Accordingly, a suitable specific heat condition is 0.7 cal/g. deg or less for temperatures of 20°–25° C. In the same liquid, the contrast becomes higher as the temperature of the heated area of the liquid layer is made higher than the temperature of the surrounding portion.

However, in the case of a solvent having a low boiling point such as methyl alcohol, ethyl alcohol or carbon tetrachloride, attention must be paid to the temperature used because vapor bubbles are created if these solvents are brought to a high temperature. On the other hand, in the case of a liquid having a high boiling point such as ethylene glycol or glycerol, no vapor bubble is created even if these liquids are heated to a high temperature and therefore, the temperature gradient of the liquid heated can be secured greatly and it is possible to enhance the contrast. According to the experiment, a good contrast was obtained in the case of liquids having a boiling point of 80° C. or higher. For example, isopropyl alcohol is one of suitable examples.

Besides these liquids, the present invention can use a liquid layer which comprises a dye dissolved in one of the above-mentioned liquids and presents various colors. For example, dyes used with a liquid which presents magenta include C.I. Direct Reds 3, 16, 20, 44, 54, 55, 75, 77, 81, 83, 101, 110 and 152, C.I. Acid Reds 1, 3, 5, 8, 12, 17, 19, 22, 31, 32, 37, 41, 47, 56, 60, 71, 112, 115, 154, 155, 160, 171 and 187, C.I. Acid Violets 5, 7 and 11 and C.I. Direct Violets 6, 7 and 16. Dyes used with a liquid which presents yellow include C.I. Direct Yellows 18, 22 and 27 and C.I. Acid Yellows 1, 13, 18, 106 and 186. Dyes used with a liquid which presents cyan include C.I. Direct Blues 1, 37, 83, 127, 149, 215 and 231 and C.I. Acid Blue 15.

However, even if the liquid layer is caused to present a color by suitably selecting the above-mentioned dyes for use with the liquid forming the liquid layer, the principle of operation of the modulating device as previously described with respect to FIG. 1 will not be changed.

Thus, where the modulating device according to the present invention is used, for example, in a display apparatus, display of a single colored image is obtained when the liquid layer is caused to present a color.

Also, when the heated area has been formed in the liquid layer (if the modulating device is looked at with the observing eyes brought close thereto, the light passed through the heated area and the non-heated are enters the observing eyes and therefore these areas can be seen at a time), the non-heated area of the liquid layer presents a color more intensely than the heated area of the liquid layer and therefore, image display can also be provided by the degree of color presentation.

Accordingly, a modulating device in which such a dye is used in the liquid layer may be used with a light valve type projecting apparatus as later described to project the image from the modulating device onto a screen. Alternatively, image display can also be accomplished by using an imaging optical system to directly project an image onto a screen.

The heating section 1a of the heat-generating means 1 generates heat and the liquid of the liquid layer 2 is heated to such a degree that it does not boil and its physical properties change as previously described, whereby the heated area 10 of the liquid layer is formed. The other section of the heat-generating means 1 is not generating heat and therefore, the physical properties of the lower temperature region of the liquid layer 2 which corresponds thereto hardly change and the physical properties thereof are approximately uniform. Actually, the lower temperature region would also be heated by the heat conduction from the heated area or the like and the optical physical properties thereof would change, but such change could be relatively neglected as compared with the change of the heated area. The incident light flux 20 which has entered the other area than the heated area 10 of the liquid layer 2 rectilinearly travels through the liquid layer 2 and emerges from the modulating device 100 in a parallel-ray state. Of course, in the case of the transmitting type modulating device 100, the then path of travel of the incident light flux 20 enters from the back side of the modulating device 100 and then exits to the front side of the modulating device 100. That is, the incident light flux 20 emerges via the substrate 5→the heat-generating means 1→the liquid layer 2 (lower temperature region)→the transparent protective plate 3. In the case of the reflecting type modulating device 100, the path of travel of the incident light flux 20 enters from the front side of the modulating device 100 and exits from the front side thereof. That is, the incident light flux 20 emerges from the modulating device 100 via the transparent protective plate 3→the liquid layer 2 (lower temperature region)→the reflection by the surface of the heat-generating means 1 (in case the heat-generating means 1 is of the non-reflecting type, the reflection by a reflecting film, not shown)→the liquid layer 2 (lower temperature region)→the transparent protective plate 3. On the other hand, the path of travel of the incident light flux 20 passing through the heated area 10 of the liquid layer which is a higher temperature region is entirely the same as the path of travel in the modulating device 100 of the incident light flux 20 which does not pass through the heated area 10 of the liquid layer, with the exception that it passes through the heated area 10 of the liquid layer 2. However, the incident light flux 20 passing through the heated are 10 of the liquid layer does not rectilinearly travel through the liquid layer 2 due to the refraction, scattering, diffraction, etc. by a gradient index of refraction (gradient index) thermally created in this area, but is refracted to change its optical path. Therefore, the incident light flux 20 which passes through the heated area 10 of the liquid layer and the incident light flux 20 which does not pass through the heated area 10 of the liquid layer do not become parallel rays when they emerge from the modulating device 100, and the directions of emergence of these light fluxes differ from each other. When the heating section 1a of the heat-generating means 1 stops heating, the heated area 10 of the liquid layer is cooled and disappears and the directions of the incident light fluxes 20 emerging from the modulating device 100 all become the same as the light passed through the other area than the heated area 10 of the liquid layer.

By the above-described construction, the incident light flux 20 passing through the higher temperature region of the heated area 10 of the liquid layer and the incident light flux 20 passing through the lower temperature region of the other area than the heated area 10 of the liquid layer can be optically distinguished from each other.

If the modulating device 100 according to the present invention is used, for example, as a display element, direct viewing display will also be possible under a predetermined illuminating condition (for example, illumination by a parallel light), but if the modulating device 100 is combined with an imaging optical system to be described, the usage and utility as a display apparatus will be further increased. In the case of the direct viewing display, the display picture element can be identified on the basis of the difference between the quantities of light when the light passed through the heated area 10 of the liquid layer is observed by the observing eyes, not shown. In the case of the combination of the modulating device 100 and the imaging optical system, the imaged position of the heated area 10 of the liquid layer 2 by the imaging optical system differs from the imaged position, by the imaging optical system, of the lower temperature region (hereinafter referred to as the non-heated area of the liquid layer) of the area not heated by the heat-generating means 1 (in case where the liquid layer 2 is preheated by the heat-generating means 1, including the preheated area) and therefore, identification of the display point is effected more clearly. Accordingly, display can be accomplished with a light point changed to a dark point. Where the imaging optical system is not employed, if a parallel light is used as the incident light flux 20 to increase the display effect of the modulating device 100 and a light-intercepting filter as later described is additionally provided, the display effect will be greatly improved. In FIG. 1, the heat-generating means 1 is in direct contact with the liquid layer 2 to heat the liquid layer 2, but alternatively, the heat-generating means 1 may be disposed near the liquid layer 2 to heat the liquid layer 2 by conduction heating. For example, in FIG. 1(B), where the heat-generating means 1 does not reflect light, a light-reflecting metal film or dielectric mirror may be interposed between the liquid layer 2 and the heat-generating means 1.

In the present embodiment, to facilitate understanding of the description, the light flux entering the modulating device 100 has been described as a parallel light, whereas the present invention is not limited to a parallel light, but essentially it utilizes the principle that by the heated area 10 of the liquid layer which is a higher temperature region being formed in the liquid layer 2 by the heat generation of the heating section 1a of the heat-generating means 1, the optical path of the light entering the modulating device 100 is varied as compared with the optical path before the heated area 10 of the liquid layer is formed.

Figure 2:
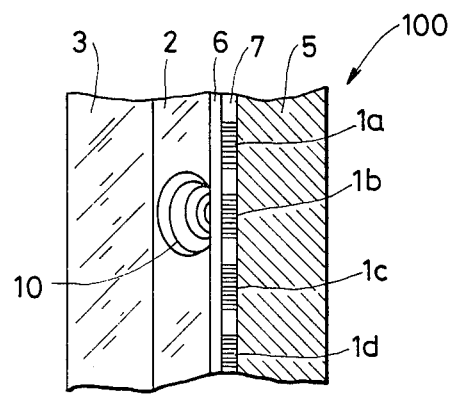
FIGS. 2, 3, 4 and 5 (A) and (B) illustrate the structure and the principle of operation of the light modulating device according to the present invention.

FIG. 2 shows an embodiment of the modulating device according to the present invention. The feature of the present embodiment is that a heat-generating resistance member is used as the heat-generating means. An example in which a plurality of such heat-generating resistance members are arranged is shown in FIG. 2. In FIG. 2, reference numeral 3 designates a transparent protective plate, reference numeral 2 denotes a thin liquid layer, reference numeral 6 designates an insulating layer having heat conductivity, reference numeral 7 denotes a heat-generating resistance layer in which heat-generating resistance members 1a, 1b, 1c, 1d, . . . are arranged, and reference numeral 5 designates the substrate of the insulating layer 6 and heat-generating resistance members 1a, 1b, 1c, 1d, . . . When the heat-generating resistance members generate heat, this heat is transferred through the insulating layer 3 to the thin liquid layer 2 to create a distribution of temperature in the thin liquid layer and form a distribution of refractive index. For example, when the heat-generating resistance member 1b selectively generates heat as shown in FIG. 2, this heat is transferred to the thin liquid layer 2 through the insulating layer 6 adjacent to the resistance member 1b to heat the liquid in the area of the thin liquid layer 2 opposed to the resistance member 1b and form a distribution of refractive index 10 in this area. This distribution of refractive index 10 disappears as the liquid in this area is cooled when a predetermined time elapses. The one cycle from the formation of this distribution of refractive index till the disappearance thereof is a very short time. Accordingly, driving of the modulating device can be effected on the order of KHz. The aforementioned heat-generating resistance members are formed on the substrate 5 by the I.C. manufacturing technique, and the spacing between adjacent heat-generating resistance members is on the order of $\mu m$. Where the modulating device shown in FIG. 2 is used as the reflecting type, it is possible to provide a reflecting layer, for example, on the surface of the insulating layer 6 which is in contact with the thin liquid layer 2.

Figure 3:
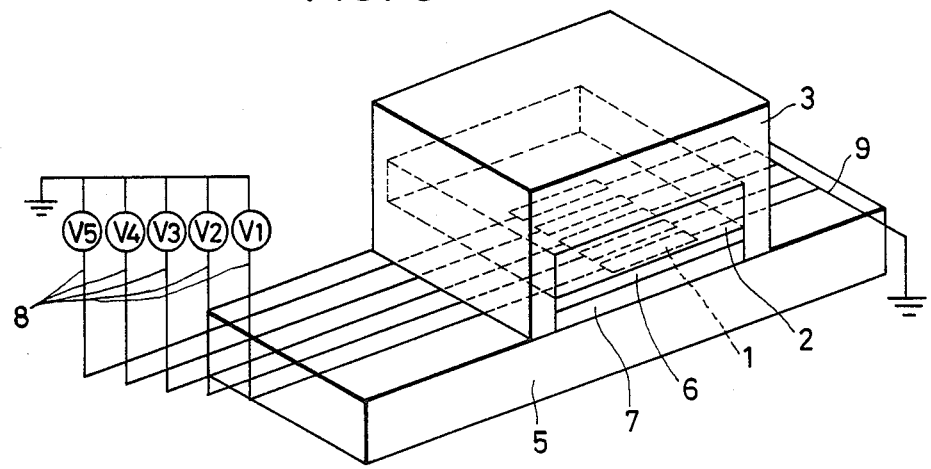

FIG. 3 is a schematic perspective view showing the construction of the modulating device shown in FIG. 2. In FIG. 3, reference numeral 8 designates conductors. The conductors 8 are connected to individual driving power sources so as to be capable of driving the heat-generating resistance members 1a, 1b, . . . independently of one another while, on the other hand, the other end of each heat-generating resistance member is grounded or set to a common voltage. When a voltage signal is applied to heat-generating resistance members 1a, 1b, . . . from the conductors 8, a distribution of refractive index is created in the thin liquid layer near each heat-generating resistance member. This distribution of refractive index is cooled when the voltage signal is made into zero, and the original state in which no distribution of refractive index exists is restored.

Figure 4:
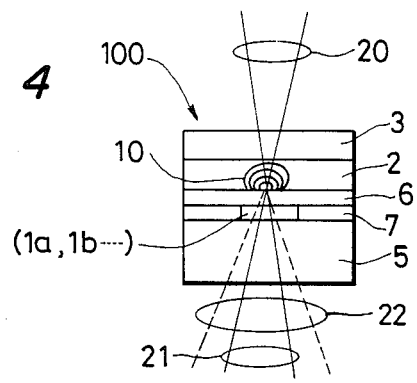

FIG. 4 shows an example of the case where both the modulated light flux and the non-modulated light flux pass through the modulating device according to the present invention. The construction itself of the modulating device shown in FIG. 4 is the same as that shown in FIG. 2. The substrate 5, the heat-generating resistance members 1 (1a, 1b, . . . ) and the insulating layer 6 are formed of a transparent medium. With such construction, the incident light flux 20 passes through the modulating device 100 as a non-modulated light flux 21 or a modulated light flux 22.

In FIGS. 2 and 4, when the heat-generating resistance members 1 are energized, a temperature gradient is formed in the thermal effect medium 2 adjacent thereto. Generally, refractive index n is a function n(T) of temperature T and refractive index differs depending on temperature. Accordingly, the fact that a temperature gradient is formed means that a gradient index of refraction 10 is formed. When light passes through such a thermal effect medium, the optical path length thereof assumes a value obtained by integrating the refractive index along the optical path, and the phase 4 of the wavefront or wave surface of the incident light flux assumes a value obtained by multiplying said value by a propagation constant $$k\left(=\frac{2\pi}{\lambda}\right),$$

namely, $$\phi = k\int n(T)dl \tag{1}$$

where $\int dl$ represents the integration along the optical path and $\lambda$ is the wavelength of the incident light. As a rough approximation of the degree of temperature dependence of refractive index, it may be deemed that n(T) is expressed by a primary function of temperature T. If the refractive index of the thermal effect medium at normal temperature $T_o$ is $n_o$, n(T) is expressed as $$n(T) = n_o + \frac{\Delta n}{\Delta T} \cdot (T - T_o), \tag{2}$$

where $\Delta n/\leftarrow T$ is the temperature coefficient of the refractive index and here, it is to be understood that $\Delta n/\Delta T$ is constant.

If equation (2) is substituted into equation (1), the following equation is obtained:

$$\phi = kn_o l + k\frac{\Delta n}{\Delta T} \cdot \int (T - T_o)dl, \tag{3}$$

where l is the length along the optical path. Since the first term in the right side of the above equation is the phase $\phi_o$ at normal temperature, $\phi$ may be written thus:

$$\phi = \phi_o + k\frac{\Delta n}{\Delta T} \int (T - T_o)dl \tag{4}$$

Accordingly, when a temperature gradient is formed in the thermal effect medium near the heating section, as can be seen from equation (4), the incident light emerges with its phase varied by an amount proportional to a value obtained by integrating the temperature difference $(T-T_o)$ from the normal temperature along the optical path. This is the principle of the light modulation by this device.

Figure 5A:
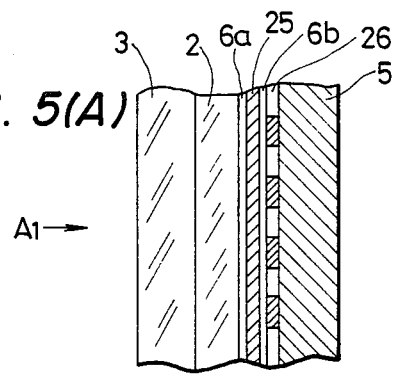
Figure 5B:
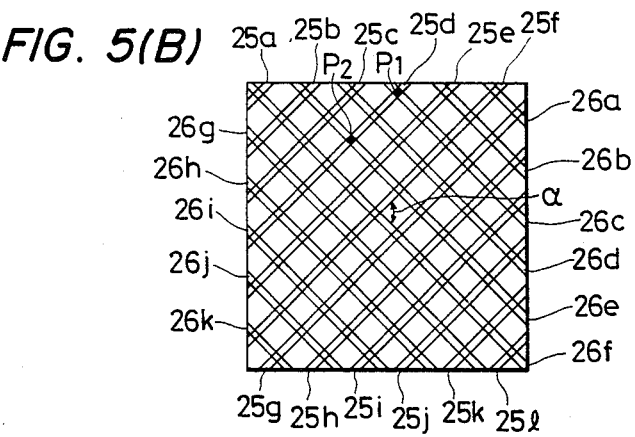

FIGS. 5(A) and 5(B) show an embodiment of the modulating device in which creation of a distribution of refractive index can be accomplished in a matrix form. FIG. 5(A) is a side view of the modulating device, and FIG. 5(B) is a view of the modulating device as seen from the front thereof, namely, a view showing the manner of arrangement of the heat-generating resistance layers when viewed from the direction $A_1$ in FIG. 5(A). In FIG. 5(A), a transparent protective plate 3, a thin liquid layer 2 and a substrate 5 are the same as those in the modulating device shown in FIG. 2. Reference characters 6a and 6b designate insulating layers having heat conductivity, and reference numerals 25 and 26 denote heat-generating resistance layers in each of which a plurality of linear heat-generating resistance members are disposed at equal intervals and parallel to one another. As shown in FIG. 5(B), the resistance members 25a–25l of the heat-generating resistance layer 25 and the resistance members 26a–26k of the heat-generating resistance layer 26 are provided so as to form an angle α. The modulating device shown in FIG. 5 is designed such that when a voltage is applied to the two heat-generating resistance members intersecting each other, a distribution of refractive index is created in the intersecting areas. Assuming, for example, that a voltage is applied to the resistance members 25d, 26c and 26e, a desired distribution of refractive index is created in the intersecting areas $P_1$ and $P_2$ illustrated in black. Accordingly, if it is desired to obtain a pattern by a two-dimensional distribution of refractive index, a voltage is first applied, for example, only to one, 25a, of the heat-generating resistance members 25a–25l, and then a voltage is applied to desired one or ones of the heat-generating resistance members intersecting the resistance member 25a, whereafter a voltage is applied only to the heat-generating resistance member 25b, and a voltage is applied to desired one or ones of the heat-generating resistance members intersecting the resistance member 25b. If such an operation is effected with respect to the resistance members 25a–25l in succession, there will be obtained a two-dimensional pattern.

Figure 6A:
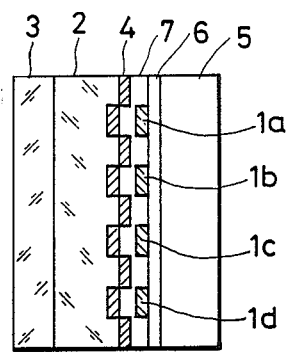
FIGS. 6(A) and (B) 7(A)–(F) and 8(A)–(F) illustrate the light modulating device of the present invention having a structure in which occurrence of noise light is prevented.
Figure 6B:
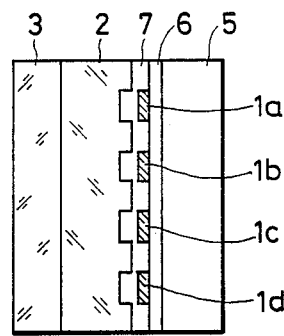

FIGS. 6(A) and 6(B) are views for explaining the points to be considered when heat-generating resistance members having a great thickness are used as the means for imparting heat to the thermal effect medium. FIG. 6(A) shows a reflecting type modulating device, and FIG. 6(B) shows a transmitting type modulating device. In FIGS. 6(A) and 6(B), reference numeral 5 designates a substrate, reference numeral 6 denotes an insulating layer, reference characters 1a, 1b, 1c and 1d designate heat-generating resistance members, reference numeral 7 denotes an insulating layer, reference numeral 4 designates a light-reflecting layer of a substance having good heat conductivity such as Ta, reference numeral 2 denotes a light-transmitting thermal effect medium whose refractive index is variable by heat, and reference numeral 3 designates a transparent protective plate. The substrate 5 and the heat-generating resistance members 1 shown in FIG. 6(B) are formed bf a light-transmitting substance. When such a modulating device is to be formed, the insulating layer 6 is first provided at a uniform thickness on the substrate 5, and then the heat-generating resistance members 1a, 1b, 1c and 1d are provided on the insulating layer 6 by patterning, and the insulating layer 7 is further provided thereon as by vapor deposition. At this time, due to the thickness of the heat-generating resistance members, the surface of the insulating layer 7 is liable topproduce an uneven surface contour coincident with the pattern of the heat-generating resistance members. Accordingly, the surface contour of the light-reflecting layer 4 provided on the surface of the insulating layer 7 as by vapor deposition is also liable to become uneven. If the surface contour of the light-reflecting layer 4 or the insulating layer 7 is thus uneven, the light flux reflected by the surface 4 or transmitted through the surface 7 is diffracted correspondingly to the uneven contour thereof. This diffracted light provides a noise light which provides various adverse effects.

Figure 9:
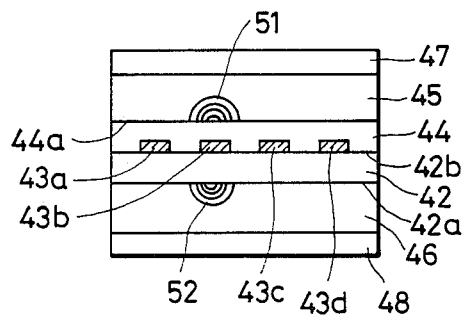
FIGS. 9, 10 and 11 illustrate modified embodiment of the light modulating device of the present invention.

Reference is now had to FIGS. 7 to 9 to describe some embodiments of the modulating device which is made free from the noise light by making the surface of the light-reflecting layer in contact with the thermal effect medium flat or even in the case of the reflecting type, and by making the surface of the insulating layer in contact with the thermal effect medium flat or even in the case of the transmitting type.

Figure 7A:
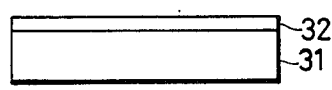
Figure 7B:
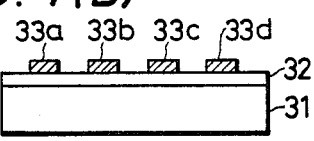
Figure 7C:
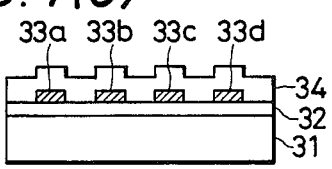
Figure 8C:
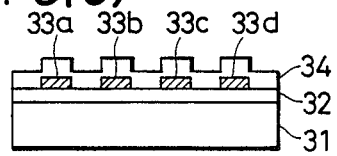
Figure 7D:
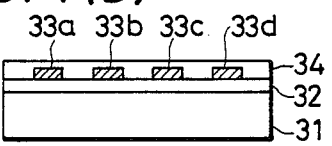
Figure 7E:
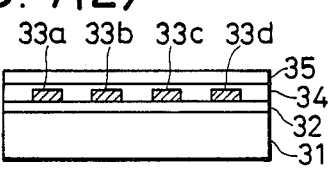
Figure 7F:
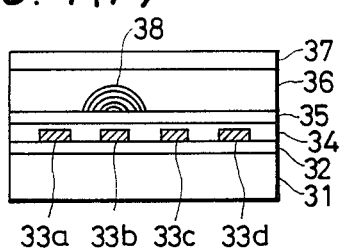
Figure 8F:
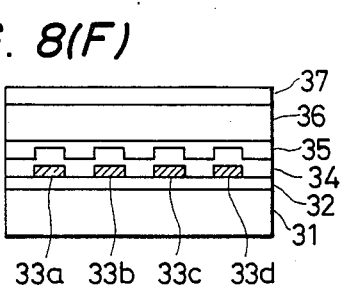

FIGS. 7(A)–7(F) show the process in which an embodiment of the reflecting type modulating device according to the present invention is formed. As shown in FIG. 7(A), an insulating layer 32 is first provided on a substrate 31. Then, as shown in FIG. 7(B), heat-generating resistance members 33 (33a, 33b, 33c, 33d) are provided on the insulating layer 32 by vapor deposition, whereafter as shown in FIG. 7(C), an insulating layer 34 is vapor-deposited on the resistance members. The surface of the insulating layer 34 has an uneven contour corresponding to the pattern of the heat-generating resistance members due to the thickness thereof. By polishing the surface of the insulating layer 34 shown in FIG. 7(C) until it becomes flat, there can be obtained a surface contour as shown in FIG. 7(D). Further, as shown in FIG. 7(E), a reflecting layer 35 of a substance excellent in heat conductivity such as Ta is provided on the insulating layer 34 flattened by said polishing. Further, the thermal effect medium 36 and transparent protective plate 37 are provided on the reflecting layer 35 to thereby obtain a modulating device as shown in FIG. 7(F).

Although not shown, means are required for well sealing the liquid which is the thermal effect medium 36 between the transparent protective plate 37 and the reflecting layer 35.

Figure 8A:
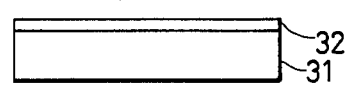
Figure 8B:
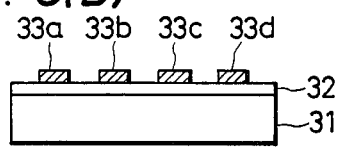
Figure 8D:
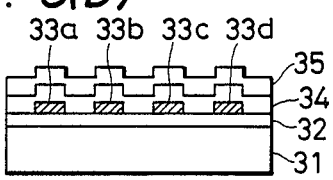
Figure 8E:
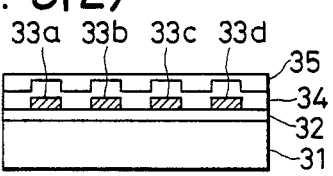

FIGS. 8(A)–8(B) show the process in which another embodiment of the reflecting type modulating device according to the present invention is formed. Of the reference numerals shown in FIG. 8, those similar to the reference numerals appearing in FIG. 7 designate similar members and therefore, these members need not be described. The difference of the process of formation of the modulating device shown in FIG. 8 from the process of formation shown in FIG. 7 is that, as shown in FIG. 8(D), the reflecting layer 35 is provided on the insulating layer 34 having an uneven surface contour and this reflecting layer 35 is polished into a flat-surfaced reflecting layer 35 as shown in FIG. 8(E).

In the case of the reflecting type modulating devices shown in FIGS. 7 and 8, the substrate 31 may be transparent or non-transparent and, where the substrate 31 is an insulative substance, the insulating layer 32 may be omitted and the heat-generating resistance members 33 (33a–33d) may be provided directly on the substrate 31.

On the other hand, in the case of a transmitting type modulating device, the thermal effect medium 36 and transparent protective plate 37 may be provided on the insulating layer 34 having the construction as shown in FIG. 7(D). Accordingly, the construction of the transmitting type modulating device finally obtained is the same as the construction in which the reflecting layer 35 is eliminated from the modulating device having the construction as shown in FIG. 7(F). In the case of the transmitting type, it is necessary that the heat-generating resistance members be also formed of a light-transmitting substance.

In the modulating devices according to the present invention described above by reference to FIGS. 6 to 8, occurrence of diffracted light of a complicated pattern can be suppressed by making the surface of the layer in contact with the thermal effect medium flat or even. Accordingly, in an apparatus using such device, not only the construction of light-intercepting means or the like can be simplified, but also it is possible to effect a modulating operation of high contrast.

FIG. 9 shows further embodiment of the transmitting type modulating device according to the present invention in which thermal effect mediums are disposed on the opposite sides of heat-generating resistance members. Reference numeral 42 designates a transparent insulative substrate having flat opposite surfaces 42a and 42b. Reference characters 43a, 43b, 43c and 43d denote heat-generating resistance members formed of a transparent substance and provided on the substrate as by vapor deposition. Reference numeral 44 designates a transparent insulating layer, one surface of which is made flat by polishing after the insulating layer 44 has been provided by vapor deposition. Reference numerals 45 and 46 denote thermal effect mediums, and reference numerals 47 and 48 designate transparent protective plates. With such a construction, when, for example, the heat-generating resistance member 43b generates heat, distributions of refractive index 51 and 52 are created in the thermal effect mediums 45 and 46 disposed on the opposite sides thereof and therefore, it is possible to make the amount of conversion of wavefront of the incident light flux greater.

If one of the thermal effect mediums 45 and 46 shown in FIG. 9 is a solid, the manufacture of the device will become easier.

Figure 10:
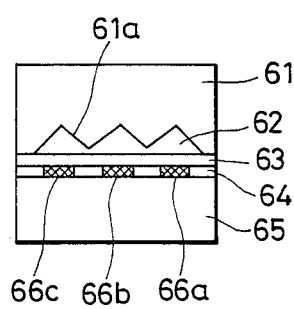
Figure 11:
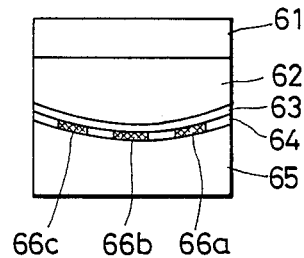

FIGS. 10 and 11 show further modified embodiments of the modulating device according to the present invention. The embodiment of FIG. 10 is designed such that a distribution of refractive index created by a certain heat-generating resistance member stays near that heat-generating resistance member by providing on the inner surface of a transparent protective plate 61 means 61a for controlling or regulating the shape of a distribution of refractive index formed in the liquid layer by the heat from heat-generating resistance members 66 (66a, 66b, . . . ). By such designing, it is possible that the distributions of refractive index created by the respective heat-generating resistance members do not interfere with one another and an image of good contrast is formed on the surface of a light-receiving medium. Also, the liquid layer can be formed into a desired shape by selecting the shape of the inner surface of the transparent protective plate. By this, it is possible to vary the curve of the distribution of refractive index created in the liquid layer in accordance with the shape of the inner surface of the transparent protective plate. Further, by choosing a transparent protective plate in which the variation in refractive index by heat is small, the difference in refractive index created between the liquid layer and the transparent protective plate when heat is applied to the liquid layer can be made great. This means that an interface in which the difference in refractive index is great on the opposite sides is created and accordingly, it is possible to obtain greater divergence of light in this interface. In this case, by choosing materials so that the value of the refractive index of the material of the transparent protective plate 61 and the value of the refractive index of the liquid i the thin liquid layer 62 when no heat is applied are approximate to each other, it is possible to prevent the scattering of light caused by the internal shape 61a of the transparent protective plate. The internal shape 61a may be one of various shapes such as spherical, cylindrical, etc.

FIG. 11 shows that the heat-generating resistance layer 64 is formed by a spherical surface or a cylindrical surface. By such a construction, it is made possible for the light flux not subjected to the divergence by the distribution of refractive index to converge after reflected by the heat-generating resistance members, and a light-intercepting member is provided at the imaged position of such light flux. By using such a modulating device, it is possible to eliminate an imaging lens shown in an embodiment to be described.

The principal objects of an embodiment which will hereinafter be described by reference to FIGS. 12 to 17 are as follows. A first object is to prevent cross talk of the distribution of refractive index created in the thermal effect medium when the spacing between adjacent heat-generating resistance members is made small. A second object is to make the temperature gradient in the thermal effect medium steep to thereby make the diverging angle of the modulated light flux great and well enable the separation of the modulated light flux and the non-modulated light flux, thereby improving the contrast.

Figure 12:
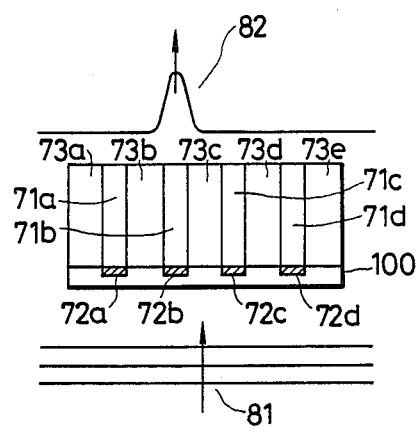
FIGS. 12, 13, 14, 15, 16 and 17(A)–(C) illustrate further modified embodiments of the light modulating device of the present invention.

In FIG. 12, the major components of the modulating device 100 according to the present invention are first transparent thermal effect mediums 71a–71d having high heat conductivity, transparent heat-generating resistance members 72a–72d disposed near the thermal effect mediums 71, and second transparent thermal effect mediums 73a–73e having relatively low heat conductivity which are in contact with the transparent thermal effect mediums 71. Reference numeral 81 designates the wavefront of the incident light flux incident on the modulating device 100, and reference numeral 82 denotes the wavefront of the emergent light flux. The transparent heat-generating resistance members 72 are independently drivable, and the lengths of the first and second thermal effect mediums 71 and 73 and transparent heat-generating resistance members 72 along the direction of transmission of the light flux and the refractive indices thereof are determined so that the wavefront 81 of the incident light flux is not subjected to the modulating action by the modulating device 100 when the transparent heat-generating resistance members 72 are not driven. Accordingly, when, for example, the transparent heat-generating resistance member 72b generates heat, sufficient heat is transferred to the first medium 71b, which thus assumes a high temperature. On the other hand, the second mediums 73b and 73c which are in contact with the first medium 71b have a adiabatic property which relatively prevents heat transfer and therefore, these remain at a low temperature.

As a result, even if the degrees of temperature dependence $\Delta n/\Delta T$ of refractive index of the first mediums 71 and the second mediums 73 are substantially equal to each other, a steep temperature gradient, namely, a steep gradient index of refraction, is formed near the boundary between the first and second mediums. Accordingly, the wavefront 81 of the incident light flux is converted into the wavefront 82 of the emergent light flux having a steep gradient.

Figure 13:
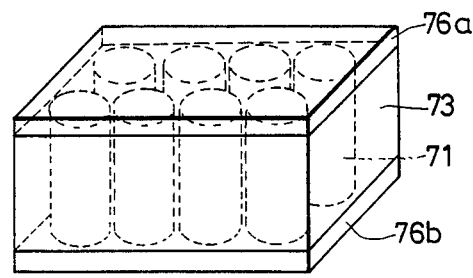
Figure 14:
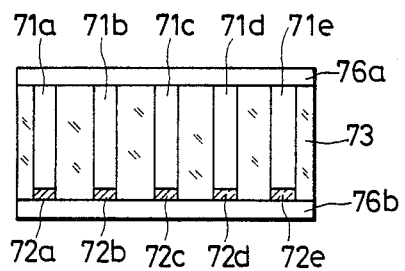

A modification of the embodiment of the modulating device described by reference to FIG. 12 is shown in perspective view in FIG. 13 and in cross-sectional view in FIG. 14. In these Figures, reference characters 71a–71e designate glass fibers such as optical fibers having relatively high heat conductivity, reference characters 72a–72e denote transparent heat-generating resistance members adhesively secured to the ends of the glass fibers 71a–71e, reference numeral 73 designates a transparent liquid of relatively low heat conductivity filling the gaps between the glass fibers, and reference characters 76a and 76b denote light-transmitting materials of relatively low heat conductivity for sealing the liquid 73. The lengths of the elements 71, 72 and 73 in the direction of light transmission and the refractive indices thereof are determined so that the shape of the incident wavefront does not change when the heaters 72 are not energized. When a particular heater is energized, a great temperature gradient is created near the boundary between the glass fibers 71 and the liquid 73, as previously described, with a result that a steep gradient can be formed in the emergent wavefront.

Figure 15:
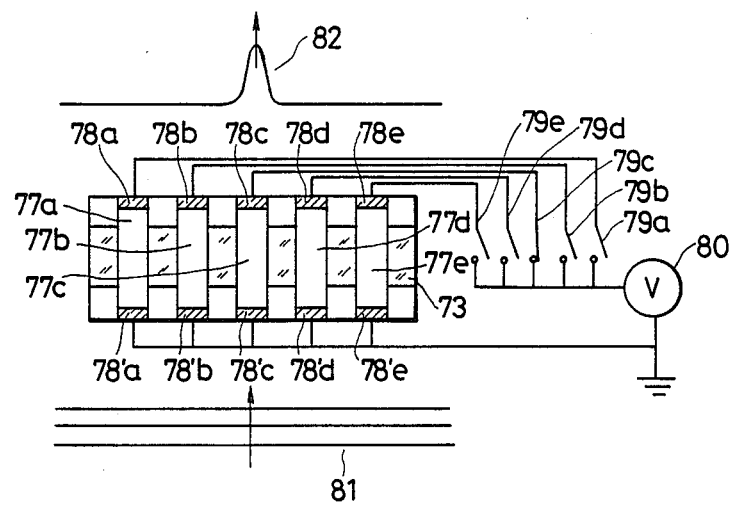

FIG. 15 is a cross-sectional view of a further embodiment. This embodiment is a modification of the embodiment shown in FIG. 12. In FIG. 15, reference characters 77a–77e designate electrically conductive thermal effect mediums having such a degree of resistance that they are moderately heated when a voltage is applied thereto. Reference characters 78a, 78a′–78e, 78e′ electrodes provided at the opposite ends of the electrically conductive thermal effect mediums 77a–77e, reference numeral 80 designates a power source for applying a voltage to the pairs of transparent electrodes 78a, 78a′–78e, 78e′, and reference characters 79a–79e denote switches for switching on and off the voltage. Reference numeral 73 designates a light-transmitting insulative thermal effect medium of low heat conductivity. The lengths of the elements 77, 78, 78′ and 73 in the direction of light transmission and the refractive indices thereof are determined so that the incident light flux emerges without the shape of its wavefront 81 being changed when no voltage is applied to the pair of transparent electrodes 78, 78′. In the present embodiment, when a voltage is applied to the pair of transparent electrodes 78, 78′, a current flows to the electrically conductive thermal effect mediums 77 sandwiched between the pair of transparent electrodes 78, 78′ and the mediums 77 are heated to a high temperature. Thereafter, on the basis of the same principle as that described in connection with FIG. 12, a steep gradient is formed in the wavefront 82 of the emergent light flux.

Figure 16:
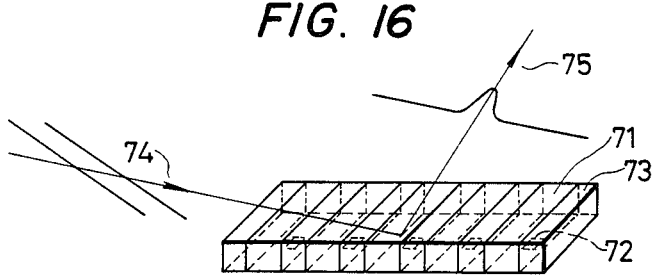

In the embodiments described above by reference to FIGS. 12 to 15, the present invention has been described with respect to the transmitting type modulating device, but the reflecting type modulating device as shown in perspective view in FIG. 16 is also possible. In this case, a reflecting surface can be provided in the interface between the first and second mediums 71, 73 and the layer in which the heat-generating resistance members 72 are embedded. In the embodiments shown in FIGS. 12 and 14, the heat-generating resistance members 72 are provided only near one side of the first mediums 71, but it is also possible to provide them on the opposite sides of the first mediums. Further, in the embodiments of FIGS. 12 and 14, the first and second mediums 71 and 73 are shown as having the same length with respect to the direction of transmission of the light flux, whereas this is not restrictive, but the lengths of these mediums may differ from each other under the condition that the optical path lengths are equal with respect to the same direction. In addition, the heat-generating means is not restricted to the transparent heat-generating resistance members 72, but a method by radiation absorption using a light-to-heat converting medium is also possible.

In the embodiments shown in FIGS. 12 to 16, there has been shown an example in which a plurality of thermal effect mediums having different heat conductivities are used to form an area of great temperature gradient near the boundary therebetween, thereby forming a steep gradient in the wavefront of the emergent light flux. An embodiment will now be shown in which a plurality of thermal effect mediums having different degrees of temperature dependence $\Delta n/\Delta T$ of refractive index are used to form a steep gradient in the wavefront of the emergent light flux near the boundary therebetween.

Figure 17A:
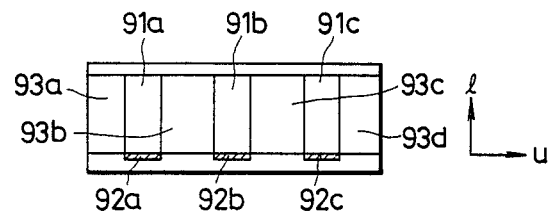
Figure 17B:
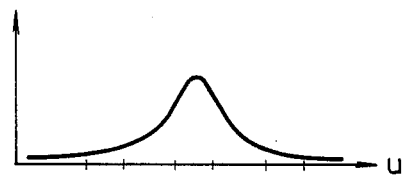

Referring to FIG. 17(A), reference characters 92a–92c designate transparent heat-generating resistance members, reference characters 91a–91c denote light-transmitting thermal effect mediums having a great absolute value of Δn/ΔT, and reference characters 93a–93d designate light-transmitting thermal effect mediums having a small absolute value of Δn/ΔT. The lengths of the elements 91, 92 and 93 in the direction of light transmission (the direction of axis l) and the refractive indices thereof (including the influence of temperature coefficient) are selected so that at normal temperature, the incident wavefront emerges without being changed. Now, consider a case where only the transparent heater 92b of these elements generates heat. The integrated value $S(\int(T-T_o)dl)$ of temperature in the aforementioned equation (4) is expressed by the shape as shown in FIG. 17(B) when the heat conductivities of the two thermal effect mediums 91 and 93 are substantially equal to each other. However, Δn/ΔT differs between the thermal effect mediums 91 and 93 and therefore, from equation (4), the amount of phase variation P caused by temperature change is expressed, in the thermal effect mediums 91, by $$P_{91} = k \cdot \frac{\Delta n_{91}}{\Delta T} \cdot S, \qquad (5)$$

and, in the thermal effect mediums 93, by $$P_{93} = k \cdot \frac{\Delta n_{93}}{\Delta T} \cdot S \qquad (6)$$

Figure 17C:
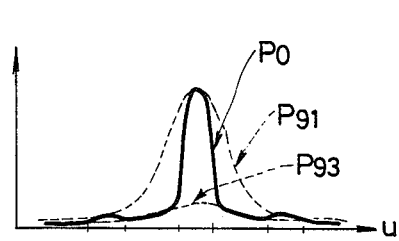

Accordingly, the actual amount of phase variation $P_o$ is expressed by a shape in which said values $P_{91}$ and $P_{93}$ are combined in accordance with the type of the thermal effect medium at a location through which the light ray passes. This state is shown in FIG. 17(C). Where $$\frac{\Delta n_{91}}{\Delta T}$$

and $$\frac{\Delta n_{93}}{\Delta T}$$

are of different signs, the variation in phase becomes greater and this is preferable.

As described above by reference to FIGS. 12 to 17, it is possible to endow the wavefront of the emergent light flux from the modulating device with a steep gradient by a technique using a plurality of thermal effect mediums having different heat conductivities, or a method using a plurality of thermal effect mediums in which Δn/ΔT differs, or a technique using both of said mediums. As a result, it becomes possible to achieve the aforementioned objects.

A further embodiment of the modulating device according to the present invention is shown in FIG. 18, and the principle of operation thereof will hereinafter be described. The feature of the embodiment shown in FIG. 18 is that a light-to-heat converting medium is provided in the modulating device and this light-to-heat converting medium absorbs the radiation from outside and generates heat, thereby imparting heat to a thermal effect medium.

Figure 18A:
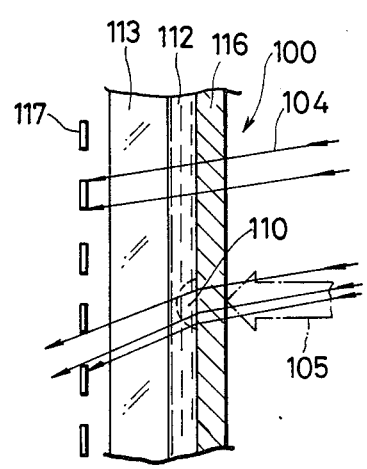
FIGS. 18(A) and (B) illustrate the structure and the principle of operation of the light modulating device according to the present invention provided with a light-to-heat converting medium.
Figure 18B:
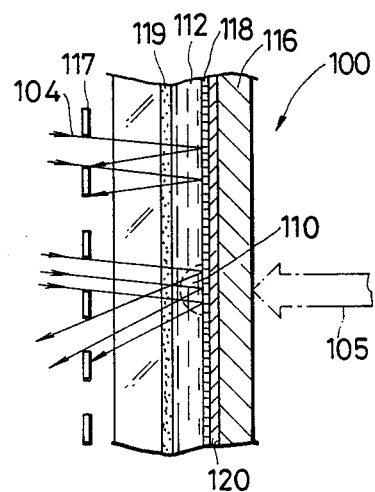

FIGS. 18(A) and 18(B) are schematic cross-sectional views for specifically illustrating the principle of operation of the modulating device according to the present invention. FIG. 18(A) shows a transmitting type modulating device 100, and FIG. 18(B) shows a reflecting type modulating device 100.

In FIGS. 18(A) and 18(B), reference numeral 116 designates a light-to-heat converting medium layer which absorbs radiation 105 and generates heat, reference numeral 112 denotes a liquid layer, and reference numeral 1]3 designates a transparent protective plate. Basically, the modulating device 100 is formed by these elements being layered. In the reflecting type modulating device 100 shown in FIG. 18(B), reference numeral 119 designates a pressure absorbing film which absorbs the increase in pressure when the liquid layer 112 is heated, reference numeral 118 denotes a reflecting film for reflecting an incident light flux 104 utilized for modulation, and reference numeral 120 designates a heat-generating layer for preheating the liquid layer 112. The reflecting film 118, the pressure absorbing film 119 and the heat-generating layer 120 are not always required in the modulating device 100, but may be used as required. For example, where the increase in the internal pressure of the liquid layer 112 does not become remarkably great when the liquid layer 112 is heated, the pressure absorbing film 119 is not employed, and where the light-to-heat converting medium 116 has a light-reflecting property, the reflecting film 118 is not employed, and where the boiling point of the liquid in the liquid layer 112 is low and the liquid layer 112 is heated with sufficiently good response only by the heat generation of the light-to-heat converting medium 116 caused only by the application of the radiation 105 and the heated area 110 of the liquid layer is formed, the heat-generating layer 120 is not employed. The heat-generating layer 120 will be described later and here, the construction of FIG. 18(B) is described as not including the heat-generating layer 120. The pressure absorbing film 119 and the heat-generating layer 120 may also be used in the transmitting type modulating device 100 shown in FIG. 18(A), as required. The light-to-heat converting medium layer 116 efficiently absorbs the radiation 105, particularly infrared ray, and generates heat, but it can hardly melt by generating heat. The light-to-heat converting medium layer 116 can be obtained with various inorganic or organic materials formed into a film (including a multi-layered film). The light-to-heat converting medium layer 116 itself has a thickness of the order of several μm and generally is poor in back-up function and usually, a radiation transmitting back-up substrate as a substrate, not shown, comprising glass or plastics is added thereto. The liquid forming the liquid layer 112 may be of any of the types as previously mentioned, and a light-transmitting liquid having a light-transmitting property for visible lights is usually used as such liquid, and whether this light-transmitting liquid has a light-transmitting property for the radiation 105 such as infrared ray is not important. Reference numeral 117 designates a light-intercepting filter which, when the liquid layer 112 is not heated, intercepts an incident light flux 104 entering the modulating device 100 and transmitted through the transmitting type modulating device 100 or reflected by the reflecting type modulating device 100 and emerging from the modulating device 100. When a radiation (particularly infrared ray) is applied to the so constructed modulating device 100 from the right of the drawing, the corresponding point of the light-to-heat converting medium layer 116 generates heat. When a part of the light-to-heat converting medium layer 116 generates heat in this manner, the liquid in the liquid layer 112 in contact therewith or proximate thereto is heated by heat conduction and thus, the temperature of the liquid rises and the physical properties thereof change, so that the heated area 110 of the liquid layer in the higher temperature region is formed in the liquid layer 112. The incident light flux 104 passing through this heated area 110 of the liquid layer has its optical path changed o bent by the mechanism already described in connection with FIG. 1 when it passes through the heated area 110. At least part of the incident light flux 104 having its optical path so bent passes through the openings of the light-intercepting filter 117 when it emerges from the modulating device 100. On the other hand, the incident light flux 104 which does not pass through the heated area 110 of the liquid layer is all intercepted by the light-intercepting filter 117 and therefore, when the modulating device 100 is seen through the light-intercepting filter 117, the incident light flux 104 passing through that part of the liquid layer 112 in which the heated area 110 is formed and the incident light flux 104 passing through the non-heated area of the liquid layer 112 are distinguished from each other.

Of course, if the device is designed such that the incident light flux 104 passing through the non-heated area of the liquid layer passes through the openings of the light-intercepting filter 117, when the heated area 110 of the liquid layer is formed, the incident light flux 104 passing through this part will be intercepted by the light-intercepting filter 117 and therefore, a modulating device in a form converse to the previously described embodiments will also become possible.

Eve when the light-intercepting filter 117 is absent, the incident light flux 104 passing through the heated area 110 of the liquid layer and the incident light flux 104 passing through the nonheated area of the liquid layer 112 differ from each other in the direction of travel after having emerged from the modulating device 100 and therefore, if the observing eyes are placed in the direction of travel of one of these light fluxes, these two light fluxes can be optically distinguished from each other.

When the radiation 105 is to be applied to the modulating device 100, the radiation can be applied in a pattern form so as to correspond to predetermined information or the radiation 105 can be made into a number of beams by utilization of a laser light source and these beams can be applied while being made into a bundle of dots, but a method of causing one beam or one line beam to scan over the light-to-heat converting medium layer 116 can also be adopted.

In the case of the transmitting type modulating device 100 shown in FIG. 18(A), the direction in which the radiation 105 is applied is not limited to the example shown. That is, where the radiation 105 is transmitted through the transparent protective plate 113 and the liquid layer 112, it is also possible to apply the radiation 105 from the left of the drawing. The elimination of the modulating action is naturally accomplished by cooling of the heated area 110 of the liquid layer. This differs from the thermo-optic effect of the heretofore known liquid crystal. That is, the thermo-optic effect of liquid crystal refers to the change from transparent state to non-transparent state by thermal change or vice versa, and the once changed state is memorized and does not restore its original state even if the temperature of the liquid crystal restores its original level (because the molecular orientation is confined). However, liquid crystal also is within the technical scope of the present invention as far as it is used within the principle of the present invention, that is, within a range in which optical physical properties have thermal reversibility. This is because such use of liquid crystal is not heretofore known.

In the present invention, in order to further enhance the distinguishing effect of modulating action, a reflecting film 118 for visible rays may be interposed between the light-to-heat converting medium layer 116 and the liquid layer 112, as previously described. Such reflecting film 118 must be formed of a metal material or a metal compound material having a high melting point which will not melt during heat conduction.

In order that effective modulating action may be obtained in the present invention, the liquid surface of the liquid layer 112 which is in contact with the light-to-heat converting medium layer 116 and the part of the liquid layer 112 which is near the liquid surface must be heated, but it is not necessary that the heating reach the liquid surface of the liquid layer 112 which is in contact with the transparent protective plate 113 and the part of the liquid layer which is near such liquid surface. However, the experiment shows that the contrast of the modulating device 100 is improved more if the temperature of the liquid surface of the liquid layer 112 which is in contact with the heating surface of the light-to-heat converting medium layer 116 and the part of the liquid layer 112 in the vicinity thereof is higher than the temperature of the marginal region of the liquid layer 112. Further, if this is positively utilized, it will become possible to realize half-tone by making the amount of heat for heating the liquid layer 112 different.

The contrast of the modulating device becomes better as the spot diameter with which the radiation 105 is applied to' the light-to-heat converting medium layer 116 is smaller, and the preferred spot diameter of the radiation 105 is in the range of 0.5 $\mu$m to 100 $\mu$m.

However, modulating action can be obtained even if radiation 105 in the form of a rectangular light flux having a width of 2 mm and a length of 10 mm is applied to the light-to-heat converting medium layer 116. The heated area 110 of the liquid layer often used in the description of the principle of the present invention includes the latter scope. Though, even if the heated area 110 of the liquid layer 112 is not minute, the distinguishing effect will be produced if the temperature of the heating surface is not uniform and therefore there occurs a difference between the direction of the optical path of light in the heated area 110 of the liquid layer and the direction of the optical path of light in the nonheated area of the liquid layer. Accordingly, in the present invention, the heated area 110 of the liquid layer is not limited to a minute range.

In the present invention, the liquid layer 112 is not heated to a temperature above the boiling point of the liquid forming it and therefore, vapor bubbles ar not created and no sharp increase in pressure occurs.

Accordingly, the aforementioned damage of the modulating device 100 due to pressure does not pose so serious a problem. However, although slightly, the pressure of the modulating device 100 may be increased also by heating of the liquid layer 112 and it would be necessary to presuppose a case where bubbles are created when a certain kind of accident beyond control is encountered.

Therefore, in preparation for such a case, it is desirable to connect the liquid layer 112 to an air chamber or an accumulator, not shown, to alleviate any increase in the pressure in the liquid layer 112.

As an alternative, as shown in FIG. 18(B), a pressure absorbing film 119 may be interposed between the liquid layer 112 and the transparent protective plate 113 in the modulating device 100 to thereby absorb any pressure developed in the liquid layer 112.

Of course, a greater effect will be obtained if the two methods mentioned just above are employed at a time. The pressure absorbing film 119 may be formed of a light-transmitting elastic or highly viscoelastic material or may be formed of so-called sponge including cells therein or having pores therein.

Further, when vapor consisting of normal temperature gases is created in or mixes with the liquid layer 112, means for removing such vapor will be necessary, but the aforementioned unshown air chamber or accumulator may be endowed with the function of removing such vapor.

As a further alternative, a pump or an injector, not shown, may be used to remove said vapor by pressing or suction.

In the present embodiment, to greatly enhance the speed of formation of the heated area 110 of the liquid layer, it is desirable that, as shown in FIG. 18(B), a heat-generating layer 120 which generates heat by Joule's heat be provided between the light-to-heat converting medium layer 116 and the liquid layer 112 of the modulating device 100 in a case where the reflecting film 118 is not employed, or between the light-to-heat converting medium layer 116 and the reflecting film 118 in a case where the reflecting film 118 is employed, to thereby preheat the predetermined liquid layer 112. If the light-to-heat converting medium layer 116 or the reflecting film 118 is a conductor, an insulating layer, not shown, should desirably be provided between these and the heat-generating layer 120.

As the shape of such heat-generating layer 120, a linear shape or a grating-like shape (neither of which is shown) provided substantially correspondingly to the position of the light-to-heat converting medium scanned by the radiation beam is preferred. Where the heat-generating layer 120 is a linear heat-generating member, the heated area is minute in the widthwise direction thereof and therefore, it seems that a good result of modulation is obtained. At this time, it is preferable to synchronize the application of the radiation 105 to the light-to-heat converting medium layer 116 with the heating of the liquid layer 112 by the heat-generating layer 120. As the material of such heat-generating layer 120, mention may be made of a metal compound such as hafnium boride or tantalum nitride, or an alloy such as nichrome.

The construction of the modulating device 100 in which a corrosive component is in direct contact with the liquid layer 112 should be avoided because it reduces the life of the device 100. That is, in the construction wherein a corrosive component is in contact with the liquid layer 112, chemical corrosion, heat oxidation or the like may often occur to damage or deteriorate the modulating device 100.

Accordingly, in such a case, it is desirable to form a protective film of corrosion-resistance (not shown) in the interface between the liquid layer 112 and the corrosive component. As the material of such protective film, mention may be made of a dielectric material such as silicon oxide or titanium oxide, or heat-resistance plastics. In the present invention, of course, the reflecting film 118 may sometimes serve also as this protective film depending on the function thereof.

Where a metal or the like is used as the light-to-heat converting medium layer 116, it is usually formed into a film on a radiation-transmitting member as a substrate and therefore, there is no possibility that the light-to-heat converting medium layer 116 is oxidized by extraneous air when the converting medium layer is heated. If the radiation absorption rate of the light-to-heat converting medium layer 116 is not perfect, an antireflection film (not shown) may be provided on that side of the converting medium to which the radiation 150 is applied, whereby the radiation absorption rate of the light-to-heat converting medium layer 116 can be remarkably enhanced.

The principle of operation, the basic structure and various modifications of the structure of the modulating device according to the present invention have been described above by reference to the embodiments shown in FIGS. 1 to 18. Some embodiments in which the above-described modulating device is applied to various apparatuses will hereinafter be described by reference to the drawings.

Description will firs be made of several embodiments in which an optical system is provided for separating and distinguishing a modulated light flux and a non-modulated light flux created by operating the modulating device according to the present invention.

Figure 19A:
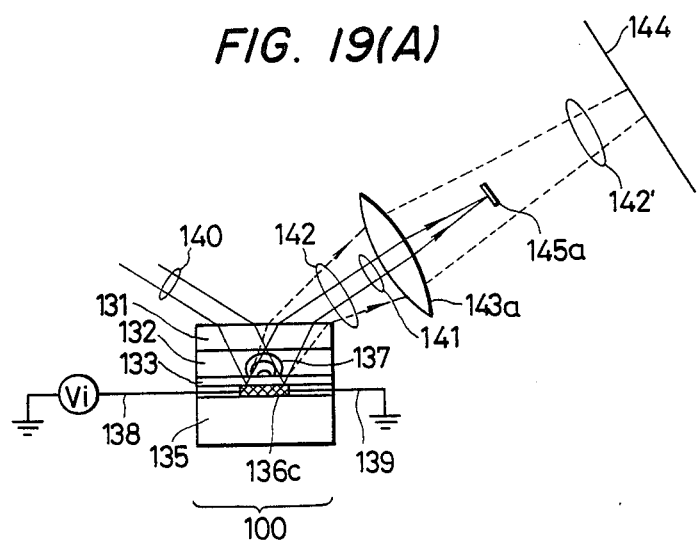
FIGS. 19(A) and (B) 20, 21(A) and (B), 22, 23, 24, 25, 26 and 27 illustrate the light modulation apparatus according to the present invention using a Schlieren optical system as the optical system for separating and identifying the modulated light flux and the non-modulated light flux.

FIG. 19(A) shows an embodiment of the light modulation apparatus using the modulating device 100 utilizing the aforementioned distribution of refractive index. This Figure shows an example of the case where the modulated light flux whose wavefront is converted by the distribution of refractive index is used as information light. In the modulating device 100, reference numeral 131 designates a transparent protective plate, reference numeral 132 denotes a liquid layer, reference numeral 133 designates an insulating member having a reflecting layer provided on that side thereof which is in contact with the liquid layer, reference numeral 135 denotes a substrate, and reference numeral 136 designates heat-generating resistance members. When a light flux 140 enters the modulating device 100 and one of several heat-generating generating resistance members 136c is driven by a voltage Vi, there is created a distribution of refractive index 137 and the light flux having entered the heat-generating resistance member 136c emerges therefrom as a light flux 142 whose wavefront has been transformed. The light flux 141 which has been regularly reflected by the reflecting layer and whose wavefront is not transformed by the distribution of refractive index 137 is imaged by a lens 143a and intercepted by a light-intercepting filter 145a disposed at the imaging position thereof. The light flux 142 whose wavefront has been transformed is partly intercepted by the light-intercepting filter 145a, but by making the size of the light-intercepting filter 145a into a minimum one sufficient to intercept the imaged spot of the light flux 141 whose wavefront is not transformed, it is possible to most of the wavefront-converted light flux 142′ onto a light-receiving medium 144.

Also, the present invention permits a material in which the gradient of the distribution of refractive index is sharp to be freely selected as the thermal effect medium. The diverging angle of the light flux by the distribution of refractive index is great as compared with the diffraction angle using the electrooptic crystal already described with respect to the prior art and therefore, in the present invention, the rate of the diverging light intercepted is very small even if the light-intercepting filter 145a of the same size is used.

As described above, by applying a voltage pulse Vi corresponding to an information signal to the heat-generating resistance member 136c through a conducting line 138 or making this voltage pulse into zero, creation or disappearance of the distribution of refractive index 137 is repeated correspondingly. In that case, turn on and off of the light spot occurs on the light-receiving medium 144. By rendering the point on the heat-generating resistance member and the point on the light-receiving medium 144 conjugate by means of the lens 143a, the image of the portion in which the distribution of refractive index has been created and which is near the heat-generating resistance members 136a, 136b, ... can be formed as a spot on the light-receiving medium 144.

Figure 19B:
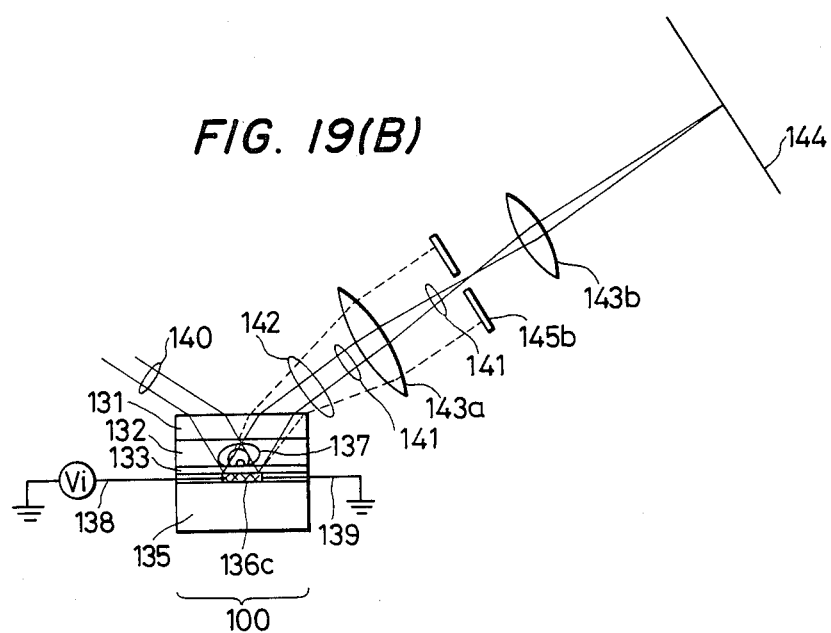

FIG. 19(B) shows another embodiment of the light modulation apparatus using the modulating device 100. This Figure shows an example of the case where a non-modulated light not scattered by the distribution of refractive index is used as information light. In FIG. 19(B), a light-intercepting plate 145b is provided at a position whereat a light flux 141 not subjected to the modulation by the modulating device 100 is condensed by a lens 143a. This light-intercepting plate has an aperture formed centrally thereof so as to pass the light flux 141 therethrough and intercept a light flux 142 indicated by broken lines which is caused to diverge by the modulating device 100.

In the manner described above, most of the diverging light by the distribution of refractive index is intercepted by the light-intercepting filter 145b and chiefly only the light flux 141 not subjected to the transformation of wavefront passes through the light-intercepting filter 145b. By disposing the lens 143b for rendering the imaged spot by the lens 143b or the light-intercepting filter 145b and the light-receiving medium surface 144 conjugate, turn on and off of a light spot occurs on the light-receiving medium surface 144.

In FIG. 19, examples which use a reflecting type modulating device have been shown, add an example which uses a transmitting type modulating device will be shown below.

Figure 20:
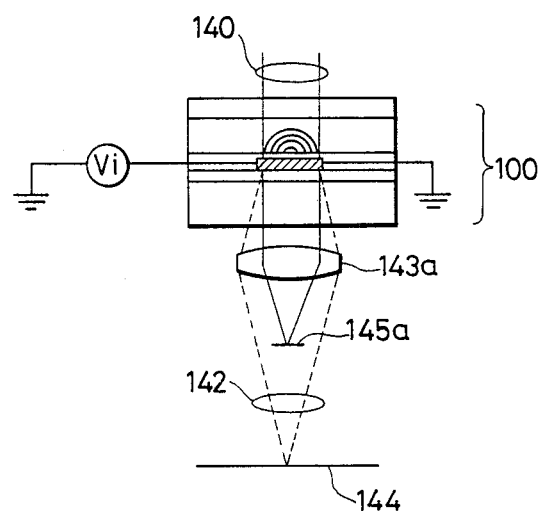

FIG. 20 shows an embodiment of the light modulation apparatus using the transmitting type modulating device 100. A light flux 140 entering the modulating device 100 is condensed on a light-intercepting plate 145a by a lens 143a and does not arrive at a light-receiving medium 144 when no voltage is applied to the heat-generating resistance members. On the other hand, a modulated light flux 142 subjected to wavefront conversion is imaged on the light-receiving medium 144 by the lens 143a.

Figure 21A:
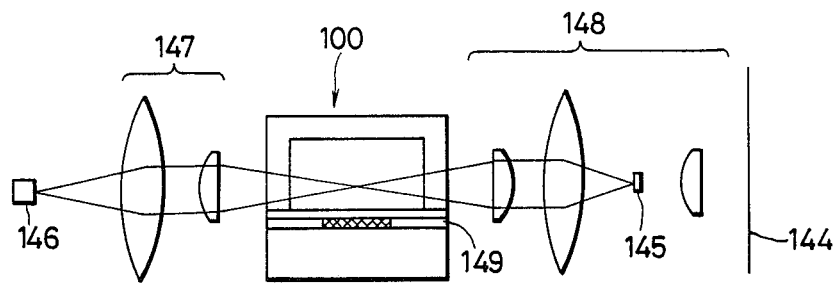
Figure 21B:
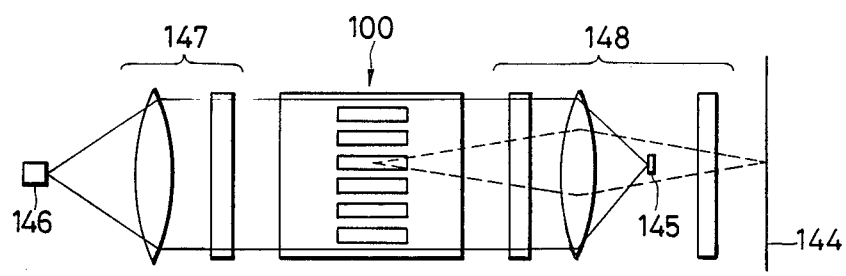

FIG. 21 shows a further embodiment of the light modulation apparatus to which the modulating device of the present invention is applied, and shows that there is no limitation in the direction of the light flux entering the modulating device. FIG. 21(A) is a view of the apparatus as seen from the direction of arrangement of the heat-generating resistance members, and FIG. 21(B) is a view of the FIG. 21(A) apparatus as seen from above it. The present embodiment has a feature in that it is of a construction in which the principal ray of a light flux entering the modulating device 100 from light flux generating means comprising a light source 146 and a linear image forming optical system 147 enters in parallelism to a heat-generating resistance member layer 149. Of the light fluxes passed through the modulating device 100, the non-modulated light flux is intercepted by an imaging optical system 148 having a light-intercepting filter 145 therein while, on the other hand, the modulated light flux arrives at the light-receiving medium surface 144.

The embodiments in which a Schlieren optical system is applied to separate and distinguish the modulated light flux and the non-modulated light flux have been shown in FIGS. 19 to 21. To show further embodiments, reference is now had to FIGS. 22 to 28 to describe a light valve type projection apparatus as an example of application. A light valve signifies a means for controlling or adjusting light and thus, apparatus of the type in which the light from an independent light source is controlled by a suitable medium (in the case of the present embodiment, the liquid layer of the modulating device) and projected onto a light-receiving medium are all covered by the light valve. Considering display as an example of the usage of the projection apparatus, this system is suitable particularly for large picture plane display which requires a quantity of light because, as compared with the self-emitting type display such as a Braum tube, it can theoretically increase the size and brightness of the display picture plane to any degree by intensifying the light source used.

Figure 22:
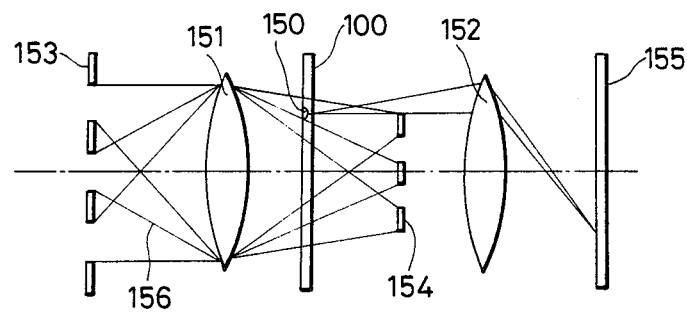

FIG. 22 shows what is called a Schlieren light valve. This is a system in which patterns different in angle of refraction, angle of diffraction or angle of reflection of light are made in a liquid layer which is a control medium in accordance with input signals and the variation therein is converted into a bright-to-dark image and projected onto a light-receiving medium.

FIG. 22 is a schematic view for illustrating the basic principle of the projection apparatus. The image of each slit of a first grating 153 is formed on each bar of a second grating 154 by an illuminating lens 151 so as to be intercepted by said bar. If the liquid layer as the medium of the transmitting type modulating device 100 disposed between the illuminating lens 151 and the second grating 154 is not heated and the physical properties (for example, the refractive index) thereof are uniform, the incident light flux passed through the first grating 153 is all intercepted by the second grating 154 and does not arrive at a light-receiving medium 155. However, when a part of the liquid layer of the modulating device 100 is heated to a high temperature by a heat-generating element and the heated area of the liquid layer is formed, the optical path of the light passing therethrough is changed as previously described and therefore, the incident light flux 156 passed therethrough is not intercepted by the second grating 154 but passes through the gap (opening) of the second grating 154 and arrives at the light-receiving medium 155. Accordingly, if an imaging lens 152 is disposed so that the heating surface heating the heated area 150 of the liquid layer of the modulating device 100 or the medium surface in the vicinity thereof is imaged on the light-receiving medium 155, a bright-to-dark image corresponding to the amount of variation in the temperature of the liquid layer of the modulating device 100 will be obtained on the light-receiving medium 155. The openings of the first and second gratings 153 and 154 may be in the form of a line or a point.

Figure 23:
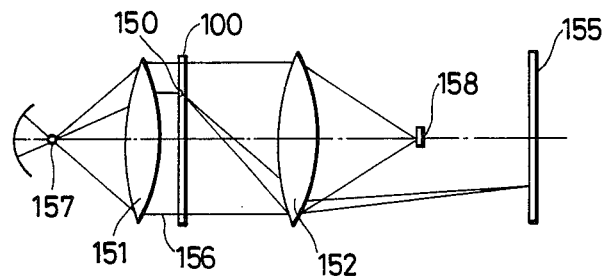
Figure 24:
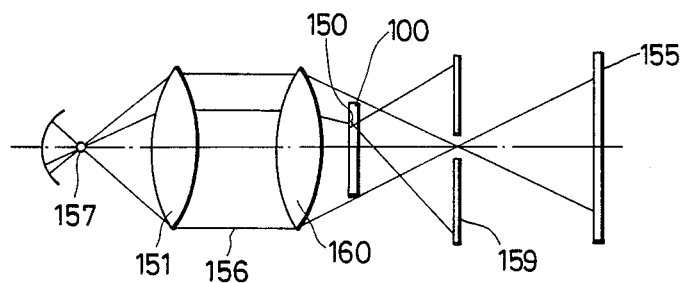

FIGS. 23 and 24 are schematic views of modified embodiments of the projection apparatus shown in FIG. 22. In FIG. 23, reference numeral 157 designates a light source. Since the light source 157 is disposed at the focus position of an illuminating lens 151, the light flux therefrom passes through the illuminating lens 151 and thereafter becomes a parallel light flux. This parallel light flux enters the transmitting type modulating device 100 from the back thereof as an incident light flux 156. Designated by 158 is a light-intercepting filter. The light-intercepting filter 158 is disposed at the condensing point of an imaging lens 152 and therefore, if the physical properties (for example, the refractive index) of the liquid layer of the modulating device 100 are uniform, the incident light flux 156 directly passes through the modulating device 100 and is condensed on the light-intercepting filter 158 through the imaging lens 152. Thus, the incident light flux 156 does not at all arrive at a light-receiving medium 55 disposed reawardly of the light-intercepting filter 158. However, when a part of the liquid layer of the modulating device 100 is heated to a high temperature and the heated area 150 of the liquid layer is formed, the optical path of the light passing through that area of the modulating device 100 is changed as previously described and therefore, th incident light flux 156 passed therethrough is not intercepted by the light-intercepting filter 158 but arrives at the light-receiving medium 155. Accordingly, if the imaging lens 152 is disposed so that the heating surface heating the heated area 150 of the liquid layer of the modulating device 100 or the medium surface in the vicinity thereof is imaged on the light-receiving medium 155, a bright-to-dark image corresponding to the amount of variation in the temperature of the liquid layer of the modulating device 100 will be obtained on the light-receiving medium 155.

FIG. 24 is a schematic view showing a modified embodiment of the projection apparatus of FIG. 23 for obtaining a inverted image. Reference numeral 157 designates a light source disposed at the focus position of a lens 151, and reference numeral 160 denotes a condensing lens for condensing the incident light flux 156 from the light source 157 collimated by the lens 151 at the focus position. A light-intercepting filter 159 passing therethrough only the light flux passing through the focus position, i.e., the condensing point, of the condensing lens 160 is disposed at the condensing point. The transmitting type modulating device 100 is disposed between the condensing lens 160 and the light-intercepting filter 159, and a light-receiving medium 155 is disposed rearwardly of the light-intercepting filter 159. When the heated area 150 of the liquid layer is not formed in the transmitting type modulating device 100, the incident light flux 156 is all condensed at the condensing point by the condensing lens 160 and passes through this condensing point t the light-receiving medium 155. However, when the heated area 150 of the liquid layer is formed in the modulating device 100, the light passing therethrough changes its optical path and becomes a modulated light flux and is intercepted by the light-intercepting filter 159, so that a point at which little or no light arrives appears on the light-receiving medium 155 and a bright-to-dark image is formed there.

Figure 25:
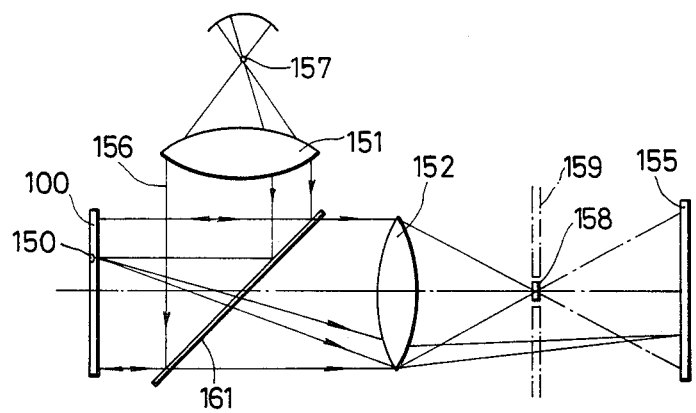

FIG. 25 is a schematic view of another modified embodiment of the projection apparatus of FIGS. 23 and 24. The light flux from a light source 157 is collimated by an illuminating lens 151 and enters the reflecting type modulating device 100 as an incident light flux 156 through a half-mirror 161. If the physical properties (for example, the refractive index) of the liquid layer of the modulating device 100 are uniform, the incident light flux 156 to the modulating device 100 is reflected by the modulating device 100. This reflected light is a parallel light flux like the incident light flux 156 and is condensed at the condensing point by an imaging lens 152. If a light-intercepting filter 158 (in this case, a light-intercepting filter 159 is not disposed) is disposed at the condensing point, the light condensed at this condensing point is intercepted by the light-intercepting filter 158 and does not arrive at a light-receiving medium 155.

However, when a part of the liquid layer of the modulating device 100 is heated and the heated area 150 of the liquid layer which is a higher temperature region is formed, the light flux having entered this part changes its optical path and is reflected and arrives at the light-receiving medium 155 through an imaging lens 152. If this imaging lens 152 is disposed at such a position that the heating surface heating the heated area 150 of the liquid layer or the medium surface in the vicinity thereof is imaged on the light-receiving medium 155, a bright-to-dark image corresponding to the amount of variation in the temperature of the liquid layer of the modulating device 100 will be obtained on the light-receiving medium 155.

To obtain an inverted image on the light-receiving medium 155, a light-intercepting filter 159 indicated by dot-and-dash lines which passes there-through the light passing only through the condensing point as also indicated by dot-and-dash lines may be disposed as shown, instead of the light-intercepting filter 158. In this case, most of the modulated light flux from the heated area 150 of the liquid layer of the modulating device 100 i intercepted by the light-intercepting filter 159 and the non-modulated light flux passes through the light-intercepting filter 159 to the light-receiving medium 155 and therefore, the aforementioned inverted image is obtained.

Figure 26:
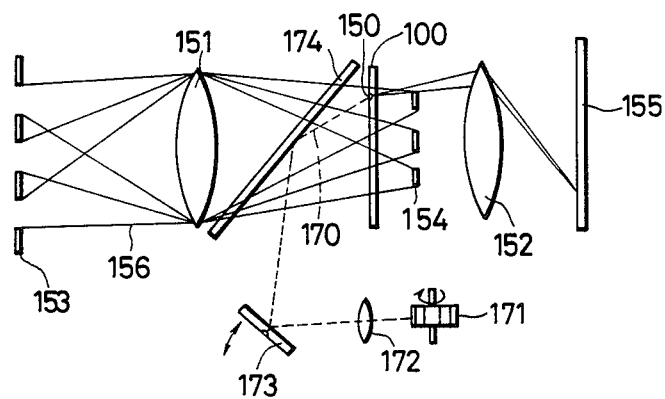

FIG. 26 is a schematic view of a transmitting type light valve projection apparatus and shows an embodiment of the arrangement of signal input means relative to the transmitting type modulation device 100. Reference numeral 153 designates a first grating, reference numeral 151 denotes an illuminating lens, reference numeral 154 designates a second grating, reference numeral 152 denotes an imaging lens, and reference numeral 155 designates a light-receiving medium, and the construction of these elements is similar to the construction of the projection apparatus of FIG. 22. A signal light comprising a modulated radiation (chiefly, infrared ray) 170 formed by a laser source and a light modulator, not shown, is horizontally scanned by a rotational polygonal mirror as a horizontal scanner 171, is vertically scanned by a rotational polygonal mirror or a galvano mirror as a vertical scanner 173 through a scanning lens 172, is reflected by a cold filter 174, is imaged on the light-to-heat converting medium layer of the transmitting type modulating device 100 shown in FIG. 18(A), heats the liquid layer in a dot matrix form and forms a two-dimensional image of the heated area 150 of the liquid layer. On the other hand, the incident light flux 156 passed through the first grating 153 passes through the cold filter 174 and therefore, by the mechanism already described in connection with FIG. 22, a two-dimensional visible image corresponding to the heated area 150 of the liquid layer of the modulating device 100 is formed on the light-receiving medium 155. The thermal effect medium layer of the modulating device 100 used in this Figure must of course be of a transmitting property for visible lights.

If a semiconductor laser array or a light-emitting diode array is used, the horizontal scanner 171 may be omitted. Also, the reflecting surface of the galvano mirror 173 may be used as the cold filter 174.

Where the transmitting type modulating device 100 shown in FIG. 18(A) is applied to the apparatuses of FIGS. 23 to 24, for example, the laser oscillator, the horizontal scanner 171, the scanning lens 172, the vertical scanner 173 and the cold filter 174 described in connection with FIG. 26 can be used as the system for causing the radiation 170 to enter. In this case, the cold filter 174 may be interposed, in the case of FIG. 23, between the modulating device 100 and the scanning lens 172 and, in the case of FIG. 24, between the modulating device 100 and the condensing lens 160.

Figure 27:
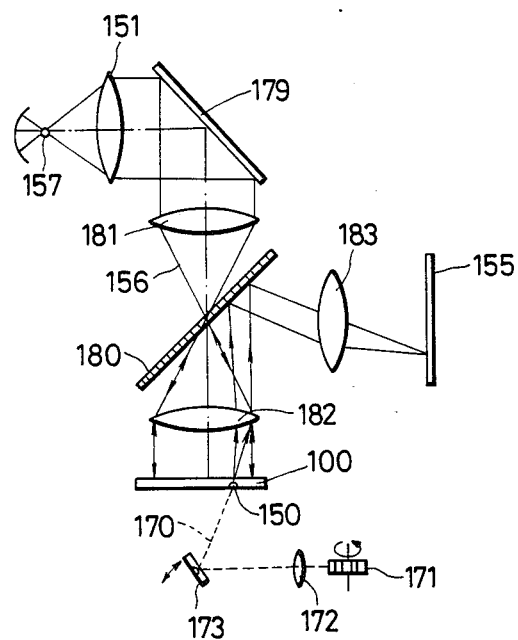

FIG. 27 is a schematic view of a reflecting type light valve projection apparatus. The light flux from a light source 157 is made into a parallel light through an illuminating lens 151, and this parallel light is reflected at right angles by a mirror 179 and enters a condensing lens 181. The incident light flux 156 for illumination condensed by the condensing lens 181 passes through a central opening formed at the center of a mirror 180 and is again made into a parallel light by a lens 182 and enters the reflecting type modulating device 100 (here, excepting the heat-generating layer) shown in FIG. 18(B). This incident light flux 156 is reflected by the reflecting film of the modulating device 100, but the reflected light (all or most thereof) at the other location than the modulating point (the heating surface imparting heat to the heated area 150 of the liquid layer or the vicinity thereof) again passes through the lens 182 and emerges outwardly through the central opening of the mirror 180. On the other hand, some of the light reflected at the modulating point on the modulating device 100 emerges outwardly through the central opening of the mirror 180, while most of such light is reflected by the mirror 180 and imaged on a light-receiving medium 155 by an imaging lens 183.

Also, a signal light comprising a modulated radiation (chiefly infrared ray) 170 formed by a laser light source and a light modulator, not shown, is horizontally scanned by a rotational polygonal mirror as a horizontal scanner 171, is vertically scanned by a galvano mirror as a vertical scanner 173 through a scanning lens 172 and is two-dimensionally scanned and enters the light-to-heat converting medium layer of the modulating device 100. Thereby, a number of modulating points are two-dimensionally formed in the modulating device 100 in accordance with the signal light, and these modulating points are imaged as projected images on the light-receiving medium 155 as previously described and thus, there is obtained a projected image.

Of course, the reflecting type modulating device 100 shown in FIG. 18(B) can be used in the projection apparatus of FIG. 25, as shown in FIG. 27.

In FIGS. 19 and so on, numerous embodiments have been shown in which a Schlieren optical system is used as the optical system for separating and distinguishing the modulated light flux and the non-modulated light flux, whereas the present invention is not always restricted thereto. In view of the problems such as the complexity and bulkiness of the Schlieren optical system, some embodiments for achieving the aforesaid objects by simpler means will hereinafter be described.

Figure 28:
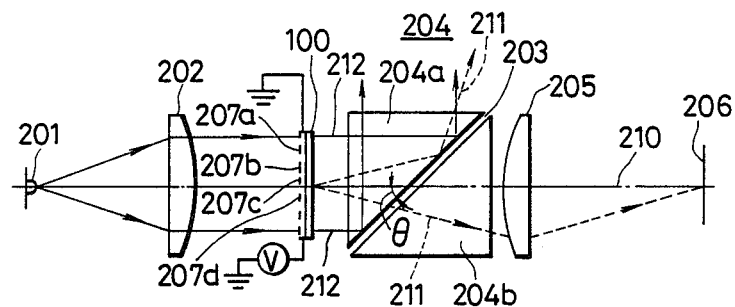
FIGS. 28, 29, 30(A) and (B), 31(A) and (B), 32 and 33(A) and (B) illustrate the light modulation apparatus of the present invention using an optical system which is not a Schlieren optical system for the same purpose as that described above.

FIG. 28 shows an embodiment of the light modulation apparatus of the present invention and is a view taken from a direction orthogonal to the direction of arrangement of the heat-generating resistance members of the modulating device In FIG. 28, reference numeral 201 designates a light source such as a semiconductor laser, reference numeral 202 denotes a collimater lens, and reference numeral 100 designates a modulating device having the construction as shown in FIG. 2. The modulating device 100 is schematically shown. Reference numeral 204 denotes an optical element for separating the modulated light flux and the non-modulated light flux, and it is formed by two trigonal prisms 204a and 204b. The two prisms 204a and 204b are installed so that a thin air layer 203 is present between the prisms. Reference numeral 205 designates an imaging lens, and reference numeral 206 denotes a light-receiving medium. In the modulating device 100 shown in FIG. 28, heat-generating resistance members 207a 207b, 207c, 207d, ... and other members constituting the modulating device are all formed of light-transmitting substances.

In the apparatus shown in FIG. 28, the light flux emitted from the light source 201 is collimated by the collimater lens 202 and enters the modulating device 100. A voltage based on a separate information signal such as a video signal or the like is applied to each of the heat-generating resistance members 207a, 207b 207c, 207d ... of the modulating device 100. The above-described distribution of refractive index is created near the heat-generating resistance members 207 to which this signal has been applied, and the incident light flux is subjected to wavefront conversion by this distribution of refractive index. On the other hand, the light flux entering the portion of the modulating device 100 to which the signal is not applied directly passes through the modulating device 100. Part of the light flux indicated by broken line 211 which has been subjected to modulation by the modulating device 100 passes through the prism 204a, the thin air layer 203 and the prism 204b in succession and is formed as a spot image on the light-receiving medium 206 by the imaging lens 205. Part of the modulated light flux 211 is totally reflected by the interface between the prism 204a and the thin air layer 203 and does not enter the imaging lens 205. On the other hand, the light flux indicated by solid line 212 which is not subjected to modulation by the modulating device 100 is totally reflected by the interface between the prism 204a and the thin air layer 203 and does not enter the imaging lens 205. Conversely speaking, the angle of inclination 8 of the thin air layer 203 with respect to the optical axis 210 of the optical system and the refractive index of the prism 204a are set to such values that the non-modulated light flux 212 is totally reflected by the interface between the prism 204a and the thin air layer 203. Thus, by obliquely disposing a surface having a step difference in refractive index in the optical path from the modulating device, the modulated light flux and the non-modulated light flux can be separated by the use of the phenomenon of total reflection.

Figure 29:
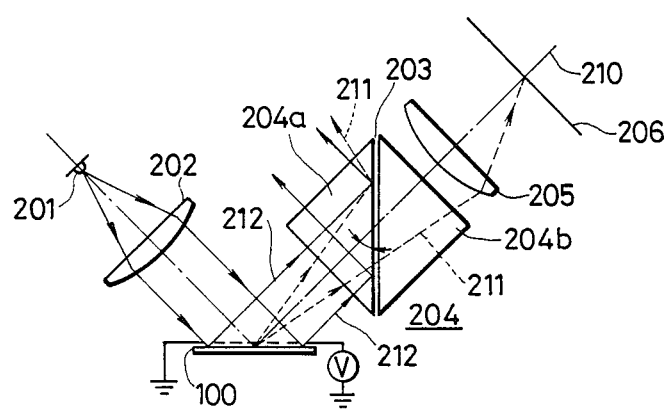

FIG. 29 shows another embodiment of the light modulation apparatus according to the present invention and shows an example of the case where the modulating device 100 is used as the reflecting type. FIG. 29 is a view in which the modulating device is seen from a direction orthogonal to the direction of arrangement of heat-generating resistance members. In FIG. 29, reference numerals similar to those in FIG. 28 designate similar members and these members need not be described. As is apparent from FIG. 29, even in a case where the reflecting type modulating device 100 is used, a similar optical system can be constituted by entirely the same components as those of the apparatus using the transmitting type modulating device shown in FIG. 28.

Figure 30A:
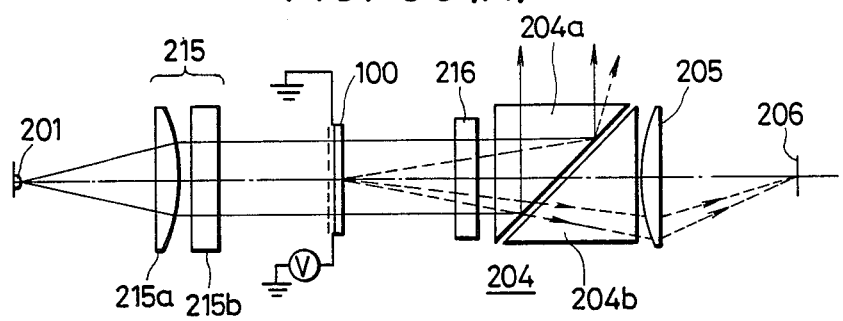
Figure 30B:
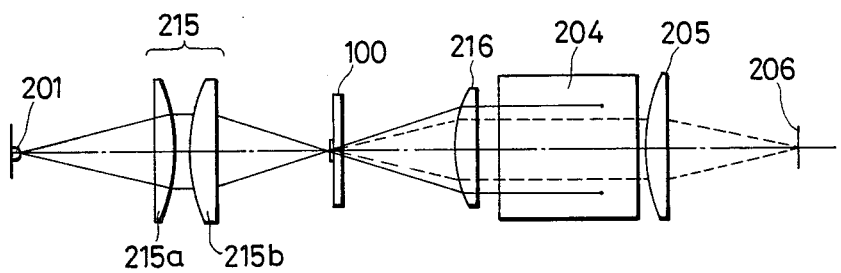

FIGS. 30(A) and 30(B) show another embodiment of the light modulation apparatus according to the present invention, FIG. 30(A) being a view taken from a direction orthogonal to the direction of arrangement of the heat-generating resistance members of the modulating device 100 and FIG. 30(B) being a view taken from the direction of arrangement of the heat-generating resistance members. In FIGS. 30(A) and 30(B), reference numerals similar to those in FIG. 29 designate similar members. In FIG. 30, reference numeral 215 designates an anamorphic lens system comprising a spherical lens 215a and a cylindrical lens 215b having a generatric line provided in the direction in which the heat-generating resistance members are arranged. Reference numeral 216 denotes a cylindrical lens also having a generating line in the direction in which the heat-generating resistance members are arranged, and the focal line thereof exists on the surface of the heat-generating resistance members. Of the light flux from a light source 201, the light flux in the direction of arrangement of the heat-generating resistance members is collimated by the anamorphic lens system 215 and the light flux in a direction orthogonal to the direction of arrangement of the heat-generating resistance members is condensed on the heat-generating resistance members of the modulating device 100. Of the light flux from the heat-generating resistance members, the light flux component in a direction orthogonal to the direction of arrangement is collimated by the cylindrical lens 216. By a linear light flux being thus imaged on the modulating device 100 along the arrangement of the heat-generating resistance members, the utilization efficiency of the light flux is improved. The anamorphic lens system 215 may be comprised of a lens including a toric surface, and the cylindrical lens 216 may be a toric lens.

In the embodiments described above by reference to FIGS. 28 to 30, the fact that the modulated light flux and the non-modulated light flux have different angles with respect to the optical axis of the optical system is utilized and a surface for creating a step difference of refractive index is provided in the optical path from the modulating device, whereby the modulated light flux and the non-modulated light flux are separated by utilization of the total reflection by said surface, and thus the modulated light flux and the non-modulated light flux can be efficiently separated by a simple and compact construction.

A further embodiment directed to the same objects as the embodiments shown in FIGS. 28 to 30 will be shown below.

Figure 31A:
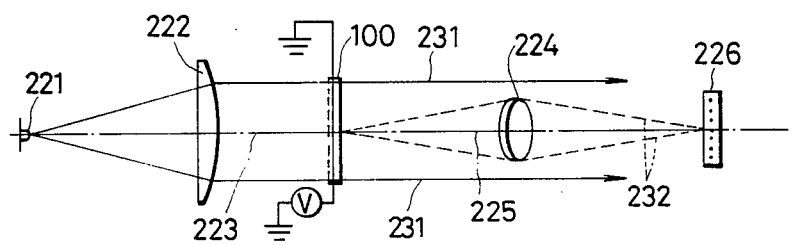
Figure 31B:
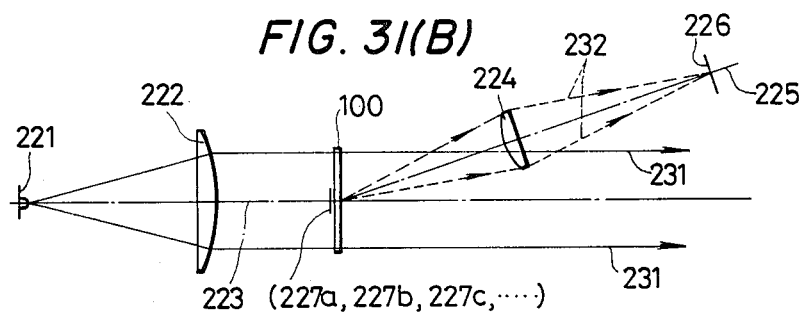

FIGS. 31(A) and 31(B) show an embodiment of the light modulation apparatus according to the present invention, FIG. 31(A) being a view taken from a direction orthogonal to the direction of arrangement of heat-generating resistance members 227a, 227b, 227c, ... and FIG. 31(B) being a view taken from the direction of arrangement. In FIGS. 31(A) and 31(B), reference numeral 221 designates a light source such as a semiconductor laser, reference numeral 222 denotes a collimator lens for collimating the light flux from the light source, and reference numeral 100 designates a modulating device according to the present invention. A separate information signal such as a video signal is applied to the heat-generating resistance members 227a, 227b, 227c, ... and the above-described distribution of refractive index is formed near the heat-generating resistance members to which this information signal is applied, and the light flux entering this portion becomes a modulated light flux subjected to wavefront conversion and passes through the modulating device 100. The light flux having entered the heat-generating resistance members to which the information signal is not applied passes through the modulating device while keeping its parallel light flux state. Accordingly, the light flux subjected to modulation by the modulating device 100 and the light flux not subjected to modulation differ from each other in the state of the diverging direction of each light flux after having passed through the modulating device 100. Reference numeral 224 designates an imaging lens system whose optical axis 225 is disposed at an angle with respect to the optical axis 223 of the collimater lens 222, as shown in FIG. 31(B). The state of deflection of the optical axis 225 with respect to the optical axis 223 is desirably such that the light flux not subjected to modulation by the modulating device 100 does not enter the imaging lens 224, and the optical axis 225 is disposed with respect to the optical axis 223 so that the non-modulated light flux 231 does not arrive at a predetermined light-receiving medium 226 even in a case where part of the light flux not subjected to modulation enters the imaging lens 224.

In FIGS. 31(A) and 31(B), the light flux from the light source 221 is made into a parallel light flux by the collimator lens 222 and enters the modulating device 100. The light flux not subjected to modulation by the modulating device 100 emerges from the modulating device 100 as indicated by solid line 231 while keeping its parallel light flux state. On the other hand, part of the light flux subjected to modulation by the modulating device 100 is converged by the imaging lens 224 as indicated by broken lines 232 and converged into a light spot on the light-receiving medium 226. Accordingly, a light spot corresponding to the heat-generating resistance member which imparts modulation to the incident light flux is formed on the light-receiving medium 226. Considering the utilization efficiency of the light flux, it is desirable to select the construction of the modulating device 100 so that the principal direction of travel of the light flux modulated while being subjected to wavefront conversion by the modulating device 100, namely, the direction in which the most modulated light flux travels, differs from the direction of the optical axis 223 of the collimater lens 222 and to make the optical axis 225 of the imaging lens coincide with the principal direction of travel.

Since the modulating device 100 shown in FIGS. 31(A) and 31(B) is of the transmitting type, the components of the modulating device 100, including the heat-generating resistance members, must all be formed of light-transmitting materials, but this is not always necessary when the modulating device 100 is used as the reflecting type.

Figure 32:
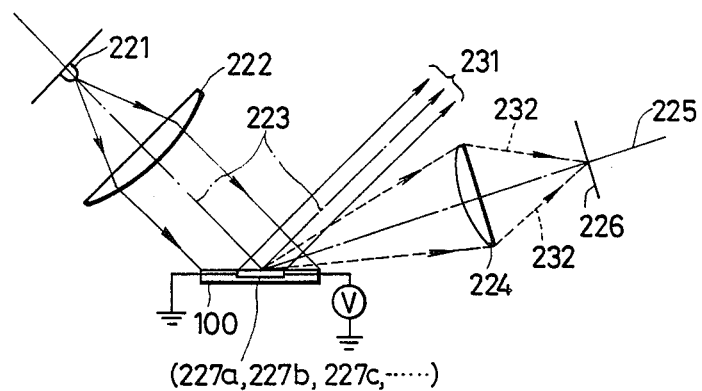

FIG. 32 shows an embodiment of the light modulation apparatus using a reflecting type modulating device, and is a view taken from the direction of arrangement of heat-generating resistance members 227a, 227b, 227c, ... In FIG. 32, reference numerals similar to those in FIGS. 31(A) and 31(B) designate similar members. As shown in FIG. 32, the light flux 231 from the collimater lens 222 which is not modulated by the modulating device 100 is regularly reflected. The optical axis 223 of the collimater lens 222 regularly reflected by the modulating device 100 and the optical axis 225 of the imaging lens 224 together form an angle in the plane of the drawing sheet and this angle is set so that the non-modulated light flux 231 does not enter the imaging lens 224 or that part of such light flux enters the imaging lens 224 but does not arrive at the light-receiving medium 226. Further, the imaging lens 224 receives part 232 of the light flux modulated by the modulating device 100 and images it on the light-receiving medium 226.

Figure 33A:
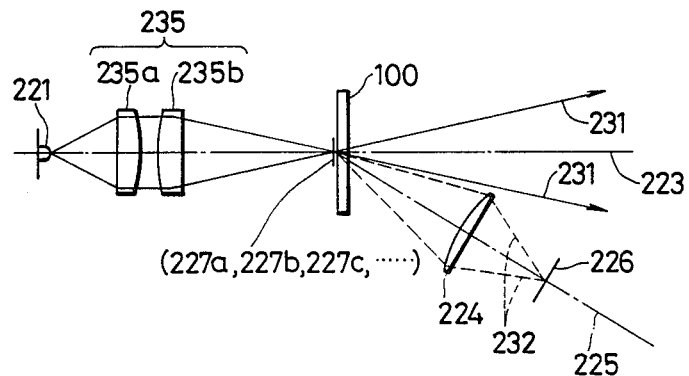
Figure 33B:
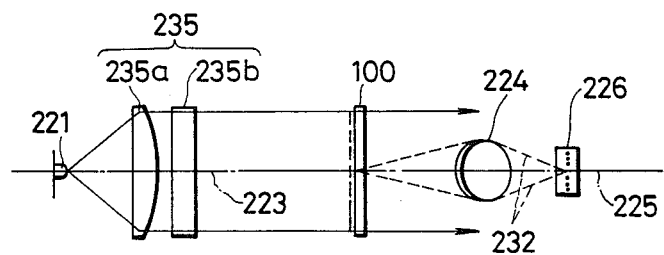

FIGS. 33(A) and 33(B) show another embodiment of the apparatus according to the present invention in which the illuminating optical system is modified. FIG. 33(A) is a view taken from the direction of arrangement of the heat-generating resistance members 227a, 227b, 227c, ... of the modulating device, and FIG. 33(B) is a view taken from a direction orthogonal to the direction of arrangement of the heat-generating resistance members. In FIGS. 33(A) and 33(B), reference numeral 221 designates a light source, and reference numeral 235 denotes an anamorphic lens system comprising a spherical lens system 235a and a cylindrical lens system 235b having a power in a plane orthogonal to the direction of arrangement of the heat-generating resistance members. A shown in FIG. 33(A), in the plane orthogonal to the direction of arrangement, the light flux from the light source 221 is made into a parallel light flux by the spherical lens system 235a, whereafter it is condensed on the surface of the heat-generating resistance members 227a, 227b, 227c, ... by the cylindrical lens 235b. On the other hand, in a plane containing the direction of arrangement, as shown in FIG. 33(B), the light flux from the light source 221 is made into a parallel light flux by the spherical lens system 235a, whereafter it is not subjected to refracting action in the cylindrical lens 235b but enters the modulating device 100 while keeping its parallel light flux state. Thus, by illuminating the portion in which the heat-generating resistance members are arranged with the light flux condensed in the form of a stripe, it becomes possible to effectively utilize the light flux from the light source. The anamorphic lens system 235 can obtain an illuminating light flux of the above-described shape even by a single toric lens. In FIGS. 33(A) and 33(B), reference numerals similar to those in FIGS. 31(A) and 31(B) designate similar members and these members need not be described.

As described above, in the light modulation apparatus according to the present invention, by utilizing the fact that the light flux subjected to modulation by the modulating device and the light flux not subjected to modulation by the modulating device differ in the state of distribution of the light flux from the modulating device, the optical axis of the imaging optical system is disposed so as not to be coincident with the optical axis of the illuminating optical system so that the modulated light flux can be received separately from the non-modulated light flux which is a regularly reflected light flux and thus, it is possible to efficiently take out the modulated light flux by a simple construction.

The embodiments using the other optical system than the Schlieren optical system to separate and distinguish the modulated light flux and the non-modulated light flux have been described above by reference to FIGS. 28 to 33.

A further embodiment of the light modulation apparatus according to the present invention which has other features than those described above will hereinafter be described by reference to the drawings.

Figure 34A:
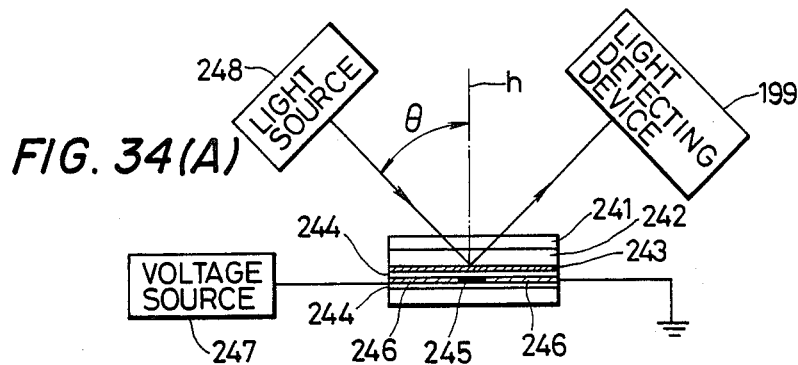
FIGS. 34(A)-(E), 35(A) and (B), 36, 37 and 38 illustrate further embodiments of the light modulation apparatus according to the present invention.

Reference is had to FIGS. 34(A), (B), (C), (D) and (E) to describe an embodiment in which the light modulation apparatus as shown, for example, in FIG. 19(A) is used to better the time response characteristic of the quantity of light of the modulated light flux arriving at a light-receiving medium 144 in a case where the modulated light flux 142' by the modulating device 100 according to the present invention is received by the light-receiving medium 144.

In FIG. 34(A), reference numeral 241 designates a transparent protective plate, reference numeral 242 denotes ethyl alcohol which is a thermal effect medium, reference numeral 243 designates a light-reflecting layer, reference numeral 244 denotes an insulating layer, reference numeral 245 designates a heat-generating resistance member, reference numeral 246 denotes electrodes for applying a voltage to the heat-generating resistance member 245, reference numeral 247 designates a voltage application device for applying a voltage to the heat-generating resistance member 245, reference numeral 248 denotes a light source unit such as a laser, and reference numeral 199 designates a light energy detecting device such as a photomultiplier. In FIG. 34(A), showing of the Schlieren optical system comprising the imaging lens and the light-intercepting filter shown in FIG. 19(A) is omitted. The light flux emitted from the light source unit 248 enters at an angle $\theta$ with respect to the plane normal h of the light-reflecting layer.

Figure 34B:
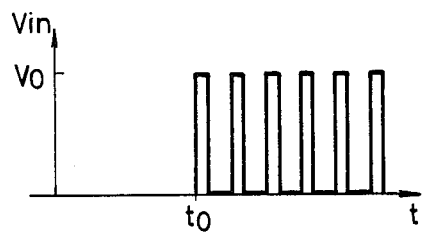

FIG. 34(B) shows a periodical voltage application pulse signal Vin applied from the voltage application device 247 to the heat-generating resistance member 245. The voltage value $V_o$ thereof must be selected to an appropriate value in accordance with said pulse width, and $V_o$ of 1-4 V is appropriate for the pulse width of 10 $\mu$sec-100 $\mu$sec. However, the size of the heat-generating resistance member 245 is of the order of 10 $\mu \times 50$ $\mu$ and the resistance value thereof is 100-200 $\Omega$.

Figure 34C:
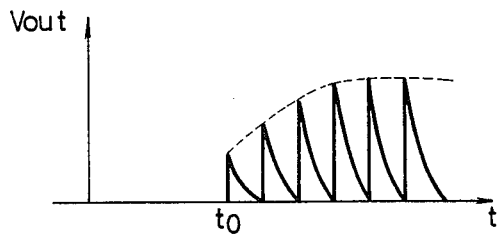
Figure 34D:
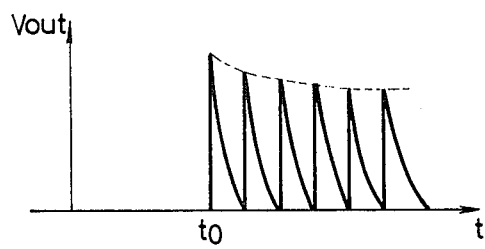
Figure 34E:
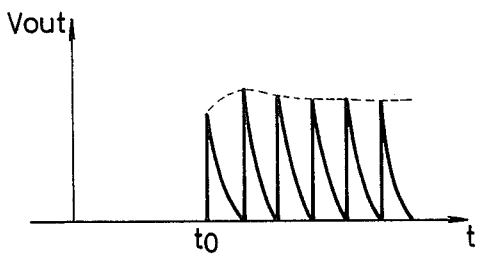

FIG. 34(C) shows the detection signal Vout of the light modulated in accordance with the applied voltage signal shown in FIG. 34(B) which has been detected by the light energy detecting device 249, and refers to a case where the direction of the incident light flux of FIG. 34(A) is $\theta \approx 30°$. FIG. 34(D) shows the detection signal of the light when $\theta \approx 60°$, and FIG. 34(E) shows the detection signal of the light when $\theta \approx 80°$. In this manner, the time response characteristic of the light output varies when the angle of incidence $\theta$ is varied. This is because the time characteristic of the distribution of refractive index is varied by the angle of incidence of the light flux when the light flux passes through the area of the distribution of refractive index created in the thermal effect medium.

Figure 35A:
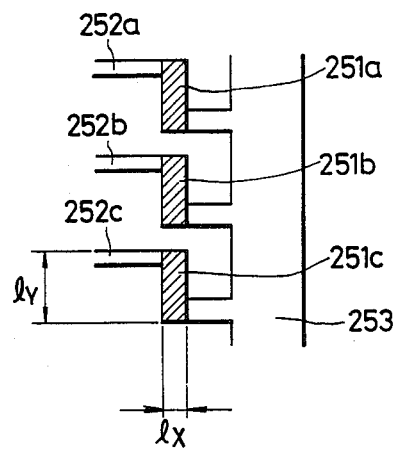

In the above-described embodiment, the time characteristic of the light output is good for the angle of incidence of $45° < \theta < 80°$, and the effect is greater as the periodical voltage application pulse signal produced after a certain time $t_o$ as shown in FIG. 35(A) is of a higher period, and a good light output characteristic has been obtained even at about 5 KHz.

In the above-described method of effecting light modulation by a distribution of refractive index created by heat, a light modulating method and light modulating device which enable betterment of the contrast will now be shown in the following embodiment.

The present embodiment intends to achieve the above-mentioned object by imparting heat to a thermal effect medium so that different gradients of refractive index of the distribution of refractive index are created in the thermal effect medium depending on the locations in the medium, and directly the light flux emerging while being modulated by the medium in a predetermined direction.

Figure 35B:
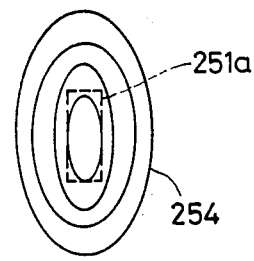

FIG. 35(A) shows an embodiment of the arrangement of the heat-generating resistance members of the modulating device according to the present invention, and more particularly an embodiment for efficiently taking out the modulated light flux in a predetermined direction in a plane substantially orthogonal t the direction of arrangement of the heat-generating resistance members. FIG. 35(A) is a view of the heat-generating resistance members as seen from the front thereof. In FIG. 35(A), reference characters 251a, 251b, 251c, ... designate the heat-generating resistance members, reference characters 252a, 252b, 252c, ... denote electrodes to which a voltage is applied from voltage application means (not shown), and reference numeral 253 designates a grounded electrode. The shape of the heat-generating resistance members is such that the length thereof in the direction of arrangement thereof is lY and the length thereof in the direction orthogonal to the direction of arrangement is lX, and satisfies the relation that lY>lX. Reference is now had to FIG. 35(B) to describe that by the relation that lY>lX being satisfied, the modulated light flux can be efficiently directed, in this case, in the direction orthogonal to the direction of arrangement of the heat-generating resistance members. FIG. 35(B) shows the curve of distribution of equal refractive index formed in the thermal effect medium when a voltage is applied to one of the heat-generating resistance members 251a, 251b, 251c, ... shown in FIG. 35(A). When, as shown in FIG. 35(A), the length lY of the heat-generating resistance members in the direction of arrangement thereof is greater than the length lX thereof in the direction orthogonal to the direction of arrangement (lY>lX), the curve of equal refractive index assumes an elliptical distribution having its major axis in the direction of lY, as indicated by 254. This means that the variation in refractive index assumes a steep gradient in the direction of lX, and the light flux having entered the portion of such distribution of refractive index is subjected to wavefront conversion action more intensely in the direction of lX than in the direction of lY. Accordingly, a great quantity of light flux is modulated in a predetermined direction in a plane orthogonal to the direction of arrangement of the heat-generating resistance members and therefore, if, as shown, for example, in FIG. 19(A), an optical system for separating the modulated light flux and the non-modulated lgiht flux is provided at this position, the light flux can be utilized efficiently.

Figure 36:
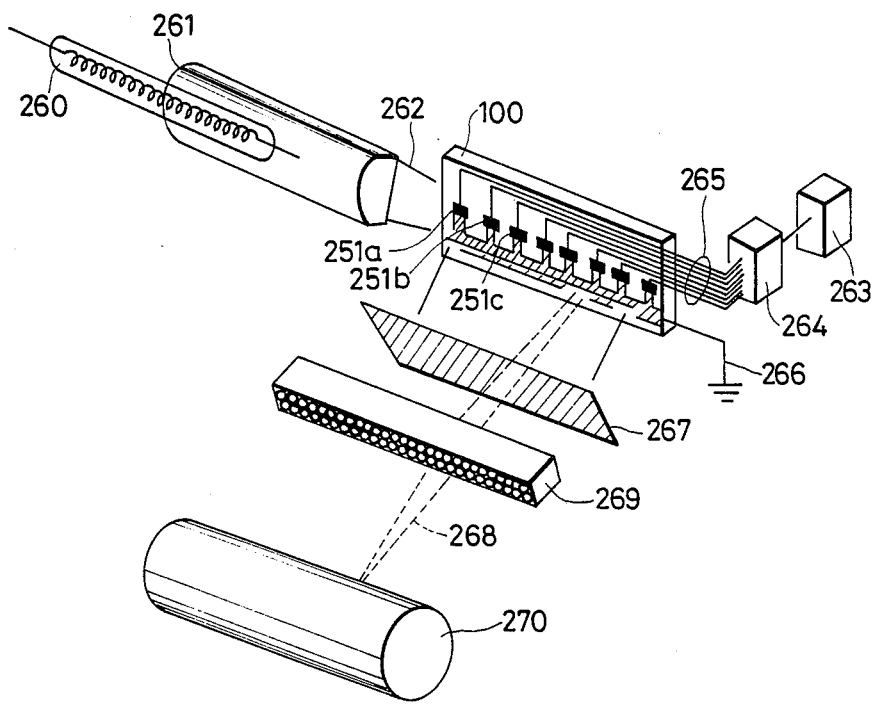

FIG. 36 is a perspective view showing an embodiment of the recording apparatus using a modulating device having the row of heat-generating resistance members as shown in FIG. 35(A). In FIG. 36, reference numeral 260 designates a light source such as a halogen lamp, reference numeral 261 denotes a condensing lens such as a cylindrical lens for linearly condensing the light flux emitted from the light source, reference numeral 262 designates the condensed light flux, and reference numeral 100 denotes a modulating device for modulating light in accordance with the aforedescribed principle. The modulating device 100 is provided with the heat-generating resistance members 251a, 251b, ... as shown in FIG. 35(A). Reference numeral 263 designates a video signal source, reference numeral 264 denotes voltage application means for converting the electrical signal from the video signal source into a voltage, reference numeral 265 designates a conductor for transmitting the voltage to the heat-generating resistance members 251a, 251b, 251c, ..., and reference numeral 266 denotes a conductor having one end connected to the heat-generating resistance members 251a, 251b, 251c, ... and the other end grounded. As previously described in connection with FIG. 35, a distribution of refractive index is formed only in the thermal effect medium of the heat-generating resistance member to which a voltage has been applied. Of the aforementioned condensed light flux 262, the light flux in the portion wherein the distribution of refractive index has been formed is subjected to wavefront conversion action. Reference numeral 267 designates a light-intercepting plate for passing therethrough the light flux 268 subjected to the wavelength conversion action and intercepting the light flux not subjected to the wavefront conversion. Designated by 269 is an imaging system such as a gradient index lens array for imaging the light flux subjected to the wavefront conversion action. The imaging system 269 is disposed at a position which satisfies the relation for rendering the points near the heat-generating resistance members 251a, 251b, 251c, ... and the point on a photosensitive medium 270 such as an electrophotographic photosensitive medium conjugate. As regards the modulating device 100, at least the heat-generating resistance members 251a, 251b, 251c, ... thereof are formed of a material having a reflecting characteristic for the condensed light flux 262, for example, HfB$_2$.

Figure 37:
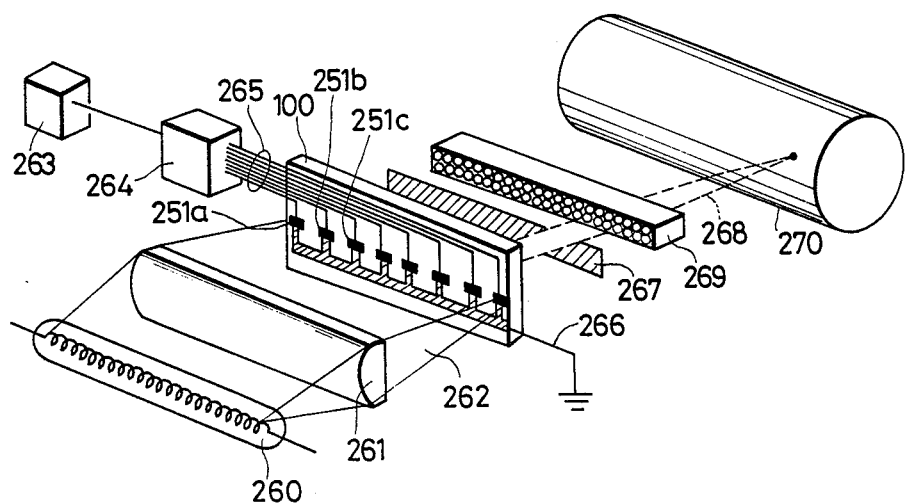
Figure 38:
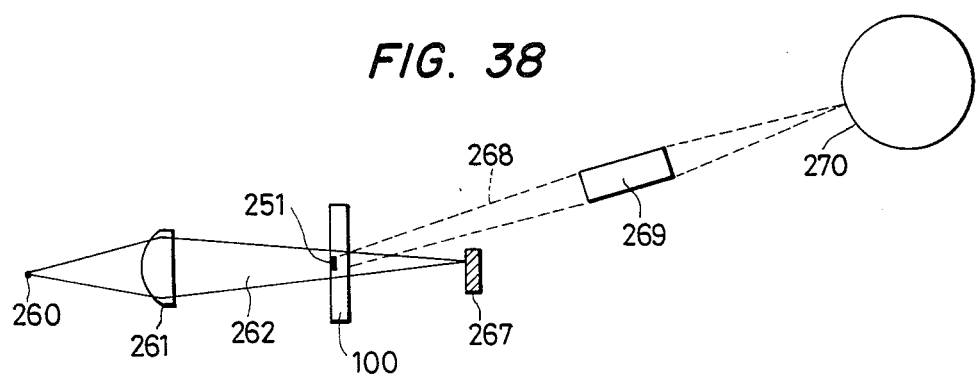

FIG. 37 is a perspective view showing an embodiment of the recording apparatus using a transmitting-type modulating device. The modulating device 100 in this recording apparatus has the row of heat-generating resistance members as shown in FIG. 35(A). FIG. 38 is a schematic side view of the recording apparatus shown in FIG. 37. In FIGS. 37 and 38, reference numerals similar to those in FIG. 36 designate similar members. Of course, the portions of the modulating device 100 which transmit the light flux therethrough are formed of a transparent substance, and the portions of the conductor 265 and grounded conductor 266 which are connected to the heat-generating resistance members may desirably be formed into transparent electrodes. In FIGS. 37 and 38, the light flux emitted from a light source 260 is condensed by a cylindrical lens 261 and the modulating device 100 is irradiated with the condensed light flux 262 so as to cover the heat-generating resistance members 251a, 251b, 251c, ... thereof. When no voltage is applied to the heat-generating resistance members 251a, 251b, 251c, ..., the condensed light flux intactly passes through the modulating device 100 and is intercepted by a light-intercepting plate 267. When a voltage is applied to the heat-generating resistance members 251a, 251b, 251c, ..., the condensed light flux having entered the vicinity thereof is subjected to the action by the distribution of refractive index and the wavefront thereof is converted, and most of the quantity of incident light is modulated in a direction orthogonal to the direction of arrangement of the heat-generating resistance members. As a result, there is produced a light flux 268 which is not intercepted by the light-intercepting plate 267, and this light flux is imaged on a photosensitive medium 270 by a gradient index lens array 269. In the manner described above, turn on and off of a light spot can be obtained on the surface of the photosensitive medium in accordance with ON-OFF of the applied voltage.

In the embodiments of FIGS. 36 and 37, the light-intercepting plate 267 is disposed so that the light flux 268 whose wavefront has been subjected to conversion action by the distribution of refractive index passes therethrough, but alternatively, the light-intercepting plate may be disposed so that the light flux 268 whose wavefront has been subjected to conversion action by the distribution of refractive index is intercepted thereby and the light flux whose wavefront is not converted arrives at the surface of the photosensitive medium.

Also, in the previous embodiments, there has been shown a case where more of the incident light flux emerges in a certain direction in the plane orthogonal to the direction of arrangement of the heat-generating resistance members, but it can be easily accomplished to vary the shape of the heat-generating resistance members and control the distribution of refractive index and the gradient of refractive index to thereby cause the light flux to emerge in a desired direction.

In the embodiments shown in FIGS. 35 to 38, it is possible to direct the light flux modulated by the modulating device in a predetermined direction by varying the gradient of refractive index created in the thermal effect medium depending on the locations in the medium and thus, a great quantity of light of the modulated light flux can be secured and a good contrast can be obtained.

In the light modulating method according to the present invention, a further light modulating method and light modulation apparatus which can better the contrast will now be shown in the following embodiment.

Figure 39:
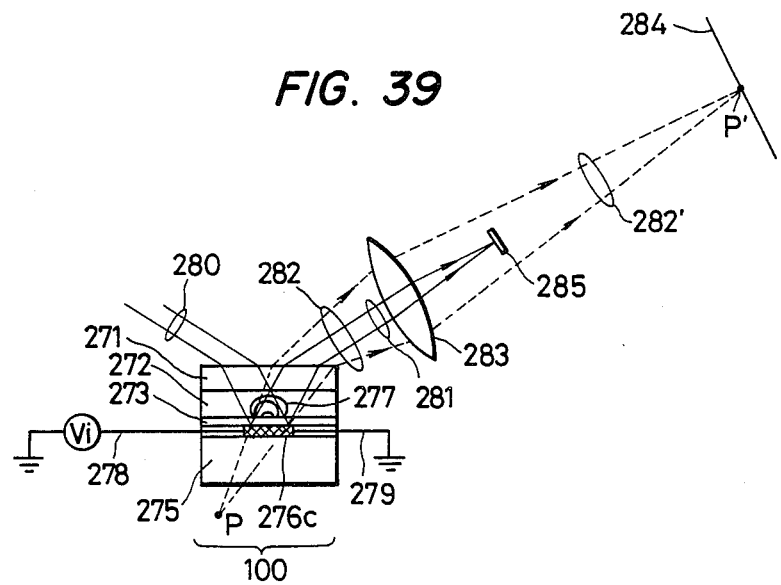
FIGS. 39, 40(A) and (B), 41, 42 and 43(A) and (B) illustrate the light modulation apparatus of the present invention for rendering the origin of divergence of the modulated light flux and a light-receiving medium optically conjugate and obtaining a good contrast.

The light modulation apparatus shown in FIG. 39 basically is of the same construction as that shown in FIG. 19(A), but it has a feature in that a light-receiving medium 284 is disposed in view of the following points. That is, in FIG. 39, a point P can also be regarded as the diversive origin of a light flux 282 having a converted wavefront which is created by the incident light flux 280 passing through the distribution of refractive index 277. Accordingly, by adapting an arrangement for causing the conjugate image P' of the point P created by an imaging lens 283 to be formed on a light-receiving medium 284, it becomes possible to receive an imaged spot of the greatest brightness on the light-receiving medium 284. That is, when a voltage is applied to a heat-generating resistance member 276c an optical image having the greatest contrast is obtained as compared with a case where no voltage is applied to the heat-generating resistance member.

Figure 40A:
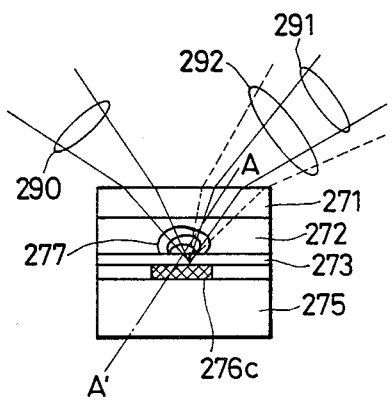
Figure 40B:
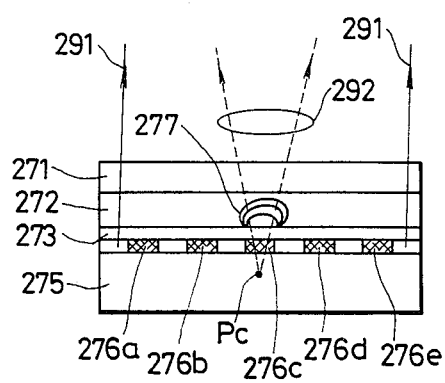

FIG. 40 shows the state of a light flux entering a modulating device 100 for bettering the contrast of turn on and off of light on a light-receiving medium that is, for providing the best light utilization efficiency, FIG. 40(A) being a view of the modulating device as seen from the direction of arrangement of the heat-generating resistance members and FIG. 40(B) being a view taken from a direction orthogonal to the direction of arrangement of the heat-generating resistance members.

The distribution of refractive index is steeper in gradient of refractive index as it is nearer to the heat-generating resistance members, and the modulation efficiency becomes highest when a light flux 290 is caused to concentratedly enter there. Also, depending on the planarity or coarseness of the surface of a support member 275 or heat-generating resistance members 276a, 276b, . . . or an insulating layer 273, the light-intercepting efficiency by a light-intercepting filter 285 shown in FIG. 39 is aggravated with respect to the other light fluxes than the modulated light flux by the distribution of refractive index, and such light fluxes are applied as noise light to a light-receiving medium 284. This noise light is applied to the light-receiving medium 284 independently of an input signal voltage pulse Vi applied from a conductor 278 and therefore, the contrast is reduced. To eliminate such an inconvenience, it is desirable to linearly converge the incident light flux 290 near the heat-generating resistance members, as shown in FIG. 40(A). Reference numeral 291 designates the regularly reflected light flux (the non-modulated light flux not subjected to modulation by the distribution of refractive index) of the incident light flux 290, and broken lines 292 indicates the modulated light flux by the distribution of refractive index. In FIG. 40(B) which is a cross-sectional view taken along the line A—A' of FIG. 40(A), reference numeral 291 designates the regularly reflected light flux of the incident light flux 290, and reference numeral 292 denotes the modulated light flux by the distribution of refractive index created near the heat-generating resistance member 276c to which an information signal has been applied as an input. As previously described, with the point Pc as the diversive origin, the modulated light flux 292 is caused to diverge in a different direction with respect to the regularly reflected flux 291.

Figure 41:
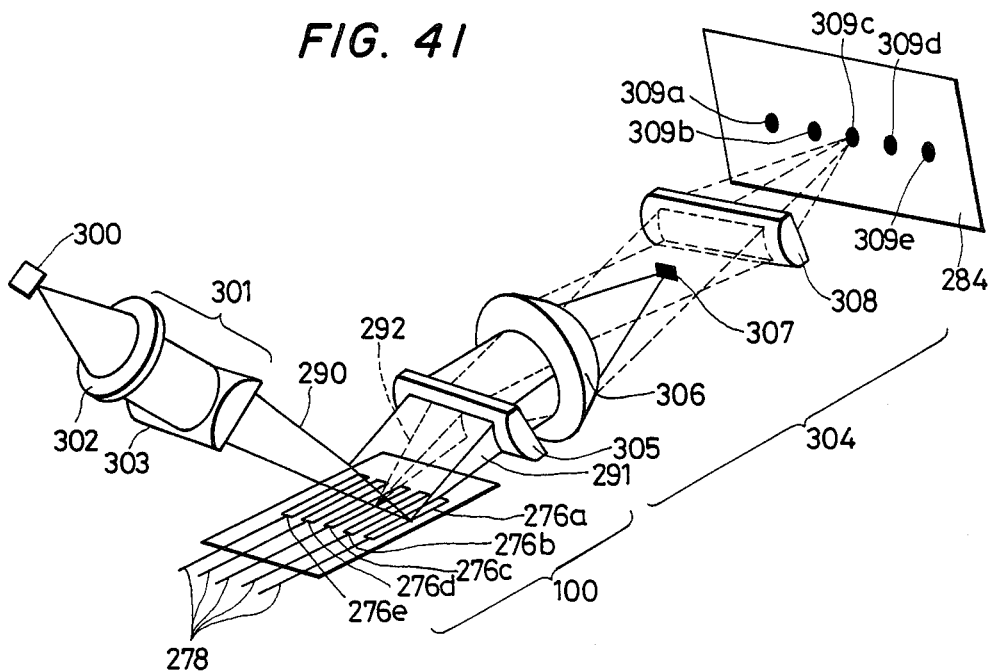

FIG. 41 shows the arrangement of an embodiment of the light modulation apparatus in which the light utilization efficiency described in connection with FIG. 40 is enhanced and the contrast of turn on and off of light on the light-receiving medium 284 is bettered. The light flux emitted from a light source 300 such as a semiconductor laser or a light-emitting diode is linearly imaged in the direction of arrangement of the heat-generating resistance members 276a, 276b, . . . of the modulating device 100 by a linear image forming optical system 301 comprising a spherical lens 302 and an anamorphic lens 303. The component of this linearly formed light flux which is in a plane orthogonal to the direction of arrangement of the heat-generating resistance members converges on the heat-generating resistance members, while the component of the linearly formed light flux which is in a plane determined by the direction of arrangement and the optical axis of the linear image forming optical system 301 is in the state of a parallel light flux. Accordingly, the light flux 291 not modulated by the heat-generating resistance members assumes a trigonal optical path and enters a positive cylindrical lens 305. The cylindrical lens 305 has its generating line in the direction of arrangement of the heat-generating resistance members and is disposed so that the focal line thereof is coincident with the position of the heat-generating resistance members. Accordingly, the light flux 291, after having passed through the cylindrical lens 305, becomes an afocal light flux and enters a spherical lens 306. The light flux 291 is condensed on the focal plane of the spherical lens 306 by this lens 306. A light-intercepting filter 307 having a sufficient size to intercept the light flux 291 is provided on said focal plane and accordingly, the light flux not subjected to modulation by the heat-generating resistance members is intercepted by the light-intercepting filter 307. On the other hand, as regards the light flux 292 modulated by the heat-generating resistance members, only the light flux in a plane orthogonal to the direction of arrangement of the heat-generating resistance members is made into a parallel light flux by the cylindrical lens 305 and is linearly imaged near the light-intercepting filter 307 by the spherical lens 306. Accordingly, part of the modulated light flux 292 is intercepted by the light-intercepting filter 307, while most of this light flux is not intercepted by the light-intercepting filter but enters a positive cylindrical lens 308 having its generating line in the same direction as the cylindrical lens 305 and is formed as point images 309a, 309b, . . . on the light-receiving medium 284. The light-intercepting filter 307 and the light-receiving medium 284 lie in the optically conjugate planes of the cylindrical lens 308. Further, as the heat-generating resistance members 276a, 276b, . . . generate heat, diversive origins Pa, Pb, Pc, . . . corresponding to the heat-generating resistance members 276a, 276b, . . . are created in the direction of arrangement of the heat-generating resistance members 276, and this diversive origin row and the light-receiving medium 284 lie at positions optically conjugate with respect to the spherical lens system 306. In FIG. 41, the modulating device 100 is shown so that only the heat-generating resistance members thereof can be seen.

Figure 42:
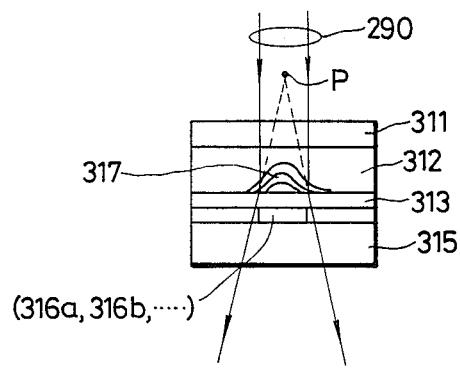

In the above-described embodiment, the heat-generating resistance members have been described as being formed of a reflecting material and both the modulated light flux and the non-modulated light flux have been shown as being reflected by the resistance members, and a case where both of the light fluxes pass through the modulating device is shown in FIG. 42. The construction itself of the modulating device shown in FIG. 42 is the same as that shown in FIG. 4, and a substrate 315, heat-generating resistance members 316a, 316b, . . . , and an insulating layer 313 are formed of transparent mediums. Again in this case, the aforementioned optical system may be used to obtain a sufficient practical effect.

That is, in FIG. 42, a point P can be regarded as the diversive origin created by the incident light flux 290 passing through the distribution of refractive index 317 and, if, as described in connection with FIG. 39, the lens and light-receiving medium are disposed so as to assume a conjugate imaging relation with the point P, it will be possible to obtain the same effect as that obtained by the construction of FIG. 39.

Figure 43A:
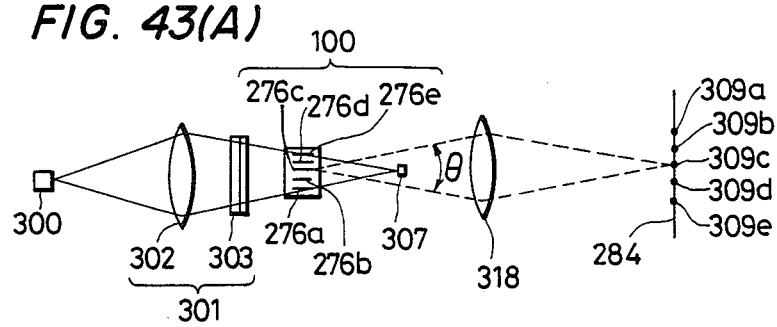
Figure 43B:
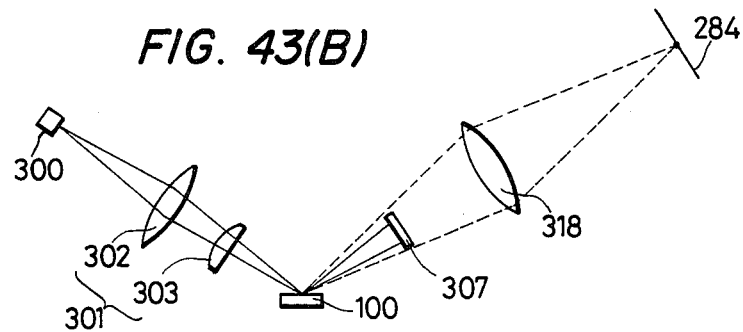

FIGS. 43(A) and 43(B) show another embodiment of the light modulation apparatus using the light modulating device 100 according to the present invention and, as in the optical system shown in FIG. 41, a linear image is formed in the direction of arrangement of the heat-generating resistance members 276a, 276b, . . . in the modulating device 100. FIG. 43(A) is a developed view taken from a direction orthogonal to the linear image. FIG. 43(B) is a view taken from a side of FIG. 43(A). The difference of this optical system from the optical system shown in FIG. 41 is that the light flux emitted from a light source is condensed by a lens 302 and, as shown in FIG. 43(A), a conjugate image of the light source is formed between the modulating device 100 and an imaging lens 318 and, as shown in FIG. 43(B), a linear image is formed near the heat-generating resistance members of the modulating device 100 by a linear image forming optical system 301 comprising the lens 302 and an anamorphic lens 303. In FIG. 43(A), a rectangular light-intercepting filter 307 having its longer sides in a direction orthogonal to the direction of arrangement of the heat-generating resistance members 276a, 276b, . . . is disposed at the conjugate image position of the light source, whereby the non-modulated light flux is intercepted and the light flux modulated by the distribution of refractive index passes through the circumference of the light-intercepting filter 307 to a lens 318 for keeping a row of diversive origins Pa, Pb, Pc, ... and a light-receiving medium 284 at conjugate positions and forms imaged spots 309a, 309b, . . . on the light-receiving medium 284. By doing so, the construction of the optical system as shown in FIG. 41 can be simplified.

In the embodiments shown in FIGS. 39 to 43, description has been made of a light modulation apparatus in which the diversive origin of the modulated light flux by the modulating device of the present invention and the light-receiving medium are made optically conjugate to thereby obtain a good contrast.

Figure 44:
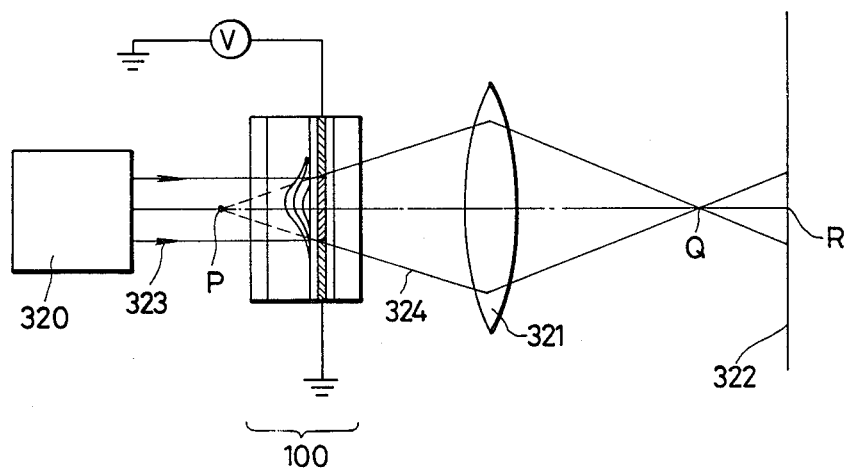
FIGS. 44, 45(A) and (B), 46, 47, 48, 49, 50, 51, 52, 53(A) and (B), 54, 55, 56, 57, 58, 59, 60, 61, 62, 63, 64, 65, 66 and 67 illustrate the light modulation apparatuses according to the present invention which employ a centrally shaded image.

A further embodiment of the light modulation apparatus which has numerous effects in the viewpoints of the effective utilization of the incident light flux, the improvement of the contrast, and the compaction, simplification, etc. of the apparatus. FIG. 44 is a view for illustrating the principle of the present embodiment. In FIG. 44, reference numeral 100 designates the modulating device according to the present invention. The modulating device 100 is shown in a state in which the distribution of refractive index is formed. When a light flux 323 emitted from light flux incidence means 320 enters the portion of the distribution of refractive index of the modulating device 100, a modulated light flux 324 emerges therefrom so that a point P different from said portion of the distribution of refractive index provides the diversive origin. When this modulated light flux 324 is imaged by an imaging lens 321, an imaged spot is formed at a point Q conjugate with the diversive origin P. In the embodiments shown in FIGS. 39 to 43, a construction has been adopted in which the light-receiving medium is disposed on a plane containing the point Q to obtain a good contrast and a Schlieren optical system is used to intercept the non-modulated light flux. In contrast, in the present embodiment, the means for intercepting the non-modulated light flux as described previously is not used and further, as shown in FIG. 44, a light-receiving medium 322 is disposed on a plane containing a point R different from the aforementioned imaging point Q and a predetermined amount of heat is generated by the heat-generating means, whereby a centrally shaded image is formed on the light-receiving medium 322. This centrally shaded image has its intensity varied if the applied voltage is controlled by heat generation control means for controlling the heat generated by the heat-generating means, such as, for example, a voltage application device.

Figure 45A:
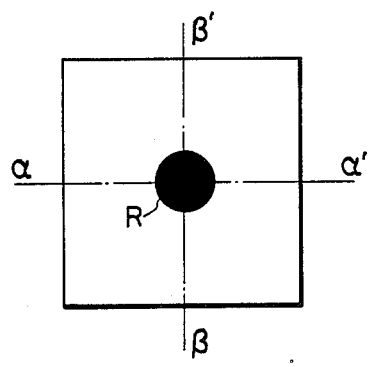
Figure 45B:
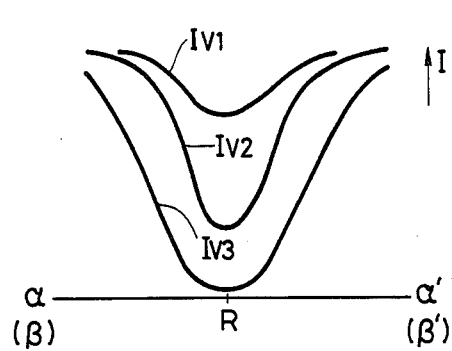

FIG. 45(A) shows the centrally shaded image on the light-receiving medium 322. When the intensity of light of the centrally shaded image is observed in a cross-section containing the axis $\alpha\alpha'$ or $\beta\beta'$ thereof and perpendicular to the plane of the drawing sheet, it is as shown in FIG. 45(B). In FIG. 45(B), I indicates the intensity of light, and curves $Iv_1$, $Iv_2$ and $Iv_3$ show the distributions of cross-sectional intensity of the centrally shaded images for voltages $V_1$, $V_2$ and $V_3$ ($|V_1| < |V_2| < |V_3|$)

applied by said control means. In this manner, if, for example, the value of the applied voltage is varied, it will be possible to vary the intensity of the centrally shaded image.

Figure 46:
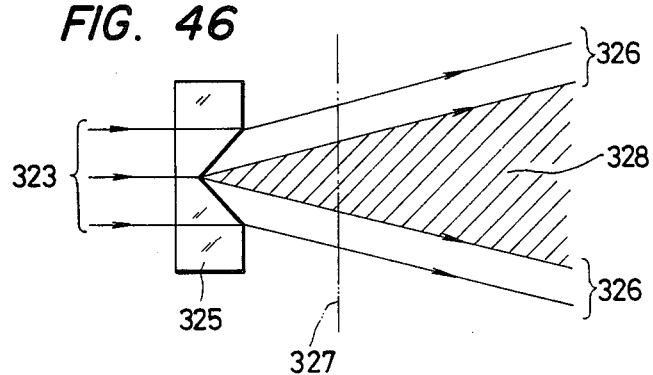

The fact that the centrally shaded image as described above is created will be understood from the model view of FIG. 46. In FIG. 46, reference numeral 325 designates glass having a conical surface at the center thereof and placed in the air, and reference numeral 323 denotes a light flux which enters the conical surface of the glass. The light flux having entered the conical surface is refracted and emerges while having a hollow portion 328, as indicated at 326. If an observation surface 327 is disposed at any position whereat the light flux has emerged, a distribution of intensity of light in which the central portion is dark and the marginal portion is light can be observed. This embodiment of the present invention utilizes this principle, and the distribution of refractive index formed by the heat generated in the heat-generating means corresponds to said conical surface. Actually, the distribution of refractive index varied while continuously having a gradient in the direction in which the light flux travels, and the light flux having passed through such distribution of refractive index does not exhibit a light-and-dark pattern in which the central portion and the marginal portion are discontinuous as shown in FIG. 46. However, as shown in FIG. 45(B), a continuous variation in light and dark occurs and can be observed as the centrally shaded image as previously described.

Figure 47:
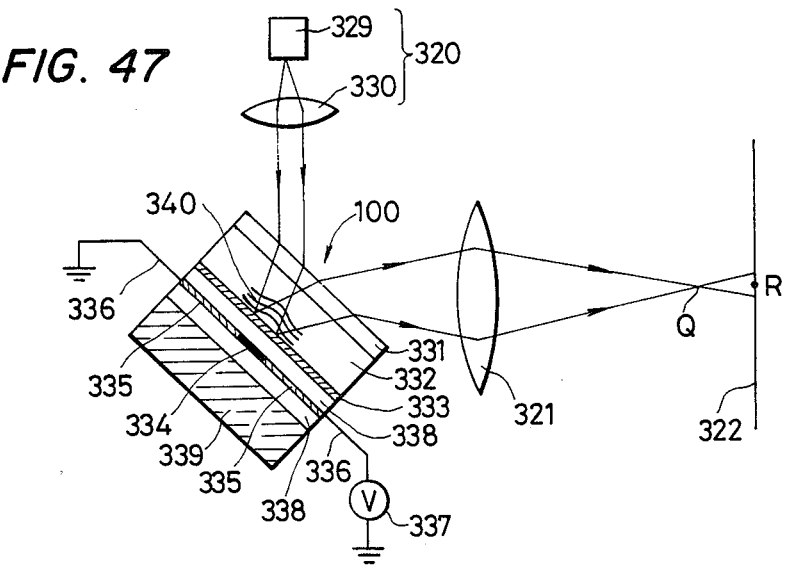

FIG. 47 shows a specific embodiment of the present invention. In FIG. 47, reference numeral 329 designates a light source unit such as a semiconductor laser, a light-emitting diode or a halogen lamp, reference numeral 330 denotes an illuminating optical system, and reference numeral 320 designates light flux incidence means comprising the light source unit 329 and the illuminating optical system 330. Reference numeral 100 denotes the modulating device according to the present invention, reference numeral 331 designates a transparent protective plate, reference numeral 332 denotes a thermal effect medium, reference numeral 333 designates a light-reflecting layer such as Al or Ta, reference numeral 334 denotes a heat-generating resistance member such as $HfB_2$, and reference numeral 335 designates electrodes connected to the heat-generating resistance member. One of the electrodes 335 has an end grounded or set to a predetermined potential and the other of the electrodes 335 has an end connected to heat generation control means 337 for controlling the amount of heat generated in the heat-generating resistance member, by a conductor 336. Reference numeral 338 designates an insulating layer such as $SiO_2$ for protecting the heat-generating resistance member 334 and electrodes 335, and reference numeral 339 denotes a substrate of heat conductivity such as Si for supporting said various members and preventing generation of heat accumulated in the insulating layer 338 around the heat-generating resistance member 304 or in the thermal effect medium. When a voltage is applied to the heat-generating resistance member 334 by the heat generation control means 337, the light flux from the illuminating optical system 330 which has entered a portion of the distribution of refractive index 340 formed in the thermal effect medium is imaged by an imaging lens 321. A light-receiving element 322 such as a screen or a photosensitive medium is disposed at a position different from the imaging point Q, i.e., a defocused position R. In FIG. 44, an example of the modulating device using a light-transmitting member is shown, but in FIG. 47, the light flux is reflected by the light-reflecting layer 333 and passes through the portion of the distribution of refractive index while being turned back thereat. By the light flux being thus caused to pass through said portion while being turned back, the refractive index for the light flux is intensified. In the light modulation apparatus as described above, the light flux passed through the portion 340 of the distribution of refractive index appears as a centrally shaded image on the light-receiving medium 322. When a voltage is not applied to the heat-generating resistance member 334 by the heat generation control means, no distribution of refractive index is formed in the thermal effect medium 332 and accordingly, a light optical image appears at the point R on the light-receiving medium 322. Thus, a centrally shaded image and a light image are controlled and appear on the light-receiving medium 322 in accordance with the applied voltage switched on or off by the heat generation control means 337. Also, by the applied voltage being step-wisely or continuously controlled by the heat generation control means 337, an optical image whose intensity of light varies stepwisely or continuously can be modulated on the light-receiving medium 322 and creation of half-tone is possible.

The numerical data of the various members in the above-described embodiment are as follows. Reference numeral 331 designates glass having a thickness of about 1 mm, reference numeral 332 denotes ethyl alcohol having a liquid layer thickness of 0.1–0.5 mm, and reference numeral 333 designates a film of Ta having a film thickness of 0.2–1 $\mu$m. Reference numeral 334 denotes a heat-generating resistance member which is $HfB_2$ having a film thickness of 0.1–0.5 $\mu$m and a shape of 10 $\mu$m × 50 $\mu$m and having a resistance value of 100–150 $\Omega$, and reference numeral 335 designates an Al electrode layer connected to the shorter side of the heat-generating resistance member and having a film thickness of 0.1–1 $\mu$m. An insulating layer 338 is a layer of $SiO_2$ having a film thickness of 1–5 $\mu$m. The light source unit 329 used is an He - Ne laser. The voltage applied by the heat generation control means is of the order of 2 V to 5 V. When an experiment was carried out by setting such a pulse voltage of 10 $\mu$sec. or more which will not creat the bubbles by phase transfer in the thermal effect medium in accordance with the value of the applied voltage, spacing the position of a screen 322 apart from the point Q by several millimeters or more, and setting the lateral magnification of an imaging lens 321 to about three times, creation of a centrally shaded image was observed on the screen 322 in accordance with the application of said pulse voltage.

Figure 48:
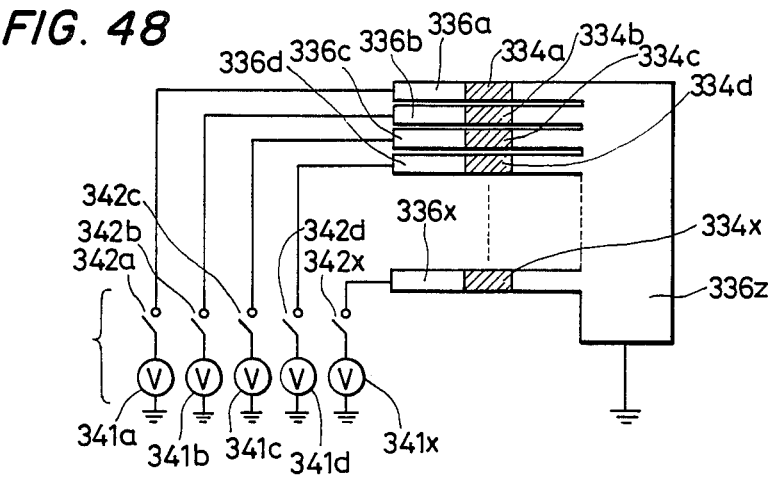

FIG. 48 shows the arrangement of heat-generating resistance members 334a, 334b, . . . , 334x and electrodes 336z, 336a, 336b, . . . 336x and each heat generating control means 341 in an embodiment in which a plurality of heat-generating resistance members as described above are arranged linearly. One end of an electrode 336z is grounded or set to a predetermined potential and the other end thereof is connected to the heat-generating resistance members 334. Electrodes 336a, 336b, . . . , 336x are independently connected to the heat-generating resistance members 334a, 334b, . . . , 334x, respectively, and the other ends thereof are independently connected to switching devices 342a, 342b, . . . , 342x for switching on or off the voltages applied from heat generating control means 341a, 341b, . . . , 341x. A plurality of such heat-generating means and heat generating control means can be used to construct the light modulation apparatus as shown in FIG. 47 and as a result, it becomes possible to independently modulate a plurality of centrally shaded images on the light-receiving medium and the use thereof as an optical shutter array becomes possible.

Figure 49:
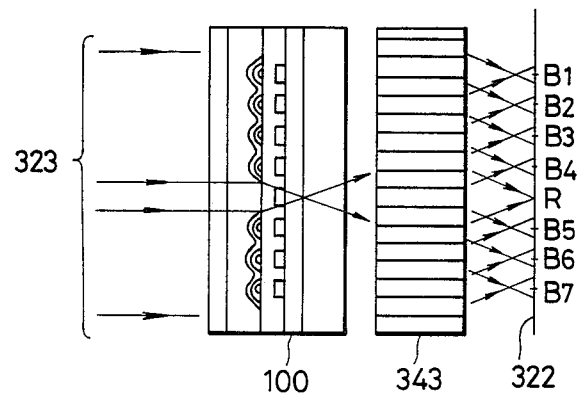
Figure 50:
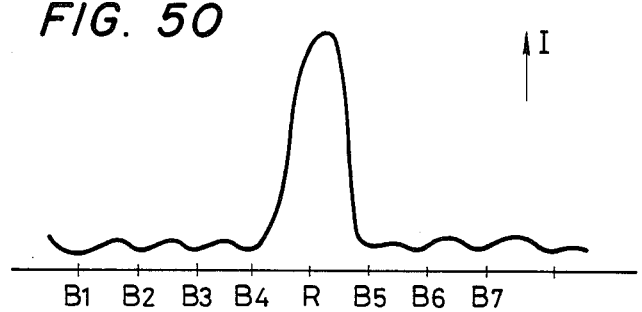

FIG. 49 illustrates a case where, conversely to FIG. 44, all the heat-generating resistance members except one are caused to generate heat. An erect imaging system using a gradient index type multi-lens array is used as an imaging lens 343. As regards the light flux 323 which has entered the entire device, the intensity of light thereof is low at the other points $B_1$, $B_2$, ..., $B_7$ than the point R on the light-receiving medium 322 and appears intensely only at the point R. The distribution of intensity on the light-receiving medium 322 is shown in FIG. 50.

FIG. 51 illustrates heat-generating resistance members 334a, 334b, ..., 334h and a system for controlling the heat generation thereof. As in FIG. 48, the electrode 336z is connected to each heat-generating resistance member and the other end thereof is grounded or set to a predetermined voltage. On the other hand, electrodes 336a, 336b, ..., 336h have one end thereof connected to the respective heat-generating resistance members and the other ends connected to a driving device 344 so that, for example, a voltage signal from heat generation control means 345 is applied to the heat-generating resistance members by the driving device.

Now, for simplicity of description, it is assumed that the driving device is a switch and such a switch is provided for each heat-generating resistance member. Assume an operation in which all of these switches except one are in ON position and when said one switch is closed, the switch adjacent thereto is opened. By repeating such operation periodically, the distribution of refractive index (FIG. 49) in the thermal effect medium shifts by an amount corresponding to one heat-generating resistance member and as a result, scanning of a light spot can be observed on the surface of the light-receiving medium.

FIG. 52 shows an arrangement in which, by making the shape of the heat-generating resistance members so as to have their longer sides in the direction of arrangement thereof, the distribution of refractive index in the thermal effect medium when the heat-generating resistance members have been caused to generate heat is greater in degree of variation in a direction orthogonal to the direction of arrangement of the heat-generating resistance members, as shown in FIG. 35. FIG. 53(A) shows the distribution of refractive index in the thermal effect medium in the direction orthogonal to the direction of arrangement of the heat-generating resistance members. FIG. 53(B) shows the distribution of refractive index in the direction of arrangement of the heat-generating resistance members.

Figure 54:
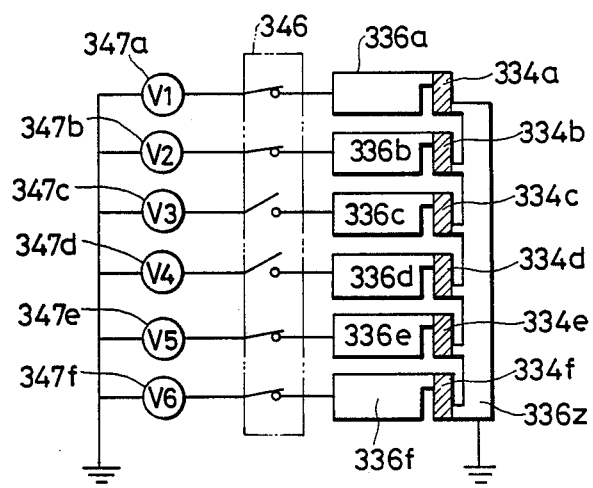

FIG. 54 shows an arrangement having the same heat-generating resistance members 334a–334f and electrodes 336z, 336a–336f as those in FIG. 52, but in this arrangement, a driving system 346 can apply a voltage to two or more heat-generating resistance members at a time and heat generation control devices 347a–347f are provided for the respective heat-generating resistance members. This, for example, in a reading apparatus, is effective to convert the density of the image to be read or the size of the picture element. Also, in an optical printer, this enables half-tone recording or the like.

Figure 55:
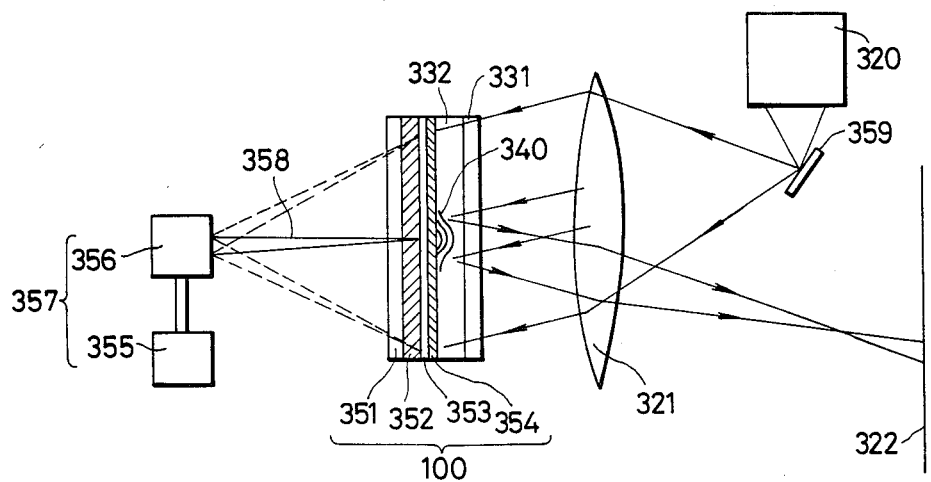

FIG. 55 shows an embodiment of the light modulation apparatus in which a modulating device 100 having a light-to-heat converting medium layer 352 for converting light energy into heat energy is used as heat-generating means and a light scanning device 357 constituted by a radiation modulating device 355 comprising a radiation source and a modulator and a light deflecting device 356 is used as heat generation control means. The modulating device 100 is provided with a light-transmitting substrate 351, a light-to-heat converting medium layer 352, a near-infrared ray reflecting film layer 353, a visible ray reflecting film layer 354, a thermal effect medium 332 and a transparent protective plate 331. A visible light flux is caused to enter the modulating device 100 via a mirror 359 by light flux incidence means 320, and the wavefront of the incident light flux is converted at the place of the distribution of refractive index created in the thermal effect medium near the light-to-heat converting medium layer 352 to which a near-infrared light flux 358 has been applied by the light scanning device 357. In the present embodiment, as in the aforedescribed embodiment, a light-receiving medium 322 is disposed at a position different from the imaged position of the wavefront converted light flux by an imaging lens 321. In the present embodiment, by using a light scanning device capable of two-dimensional light deflection and a light-to-heat converting medium layer 352 extending over the light scanning area thereof, a two-dimensional light modulated image can be formed on the surface of the light-receiving medium 322.

Figure 56:
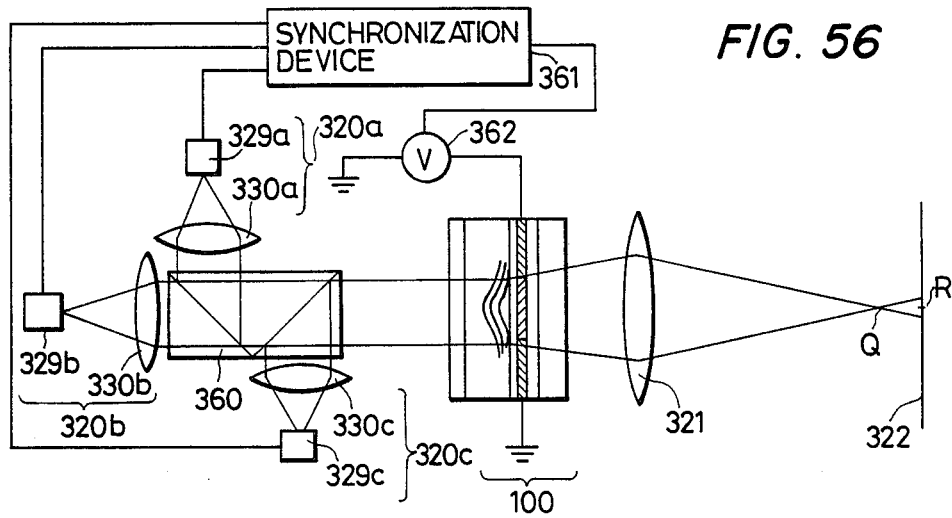
Figure 57:
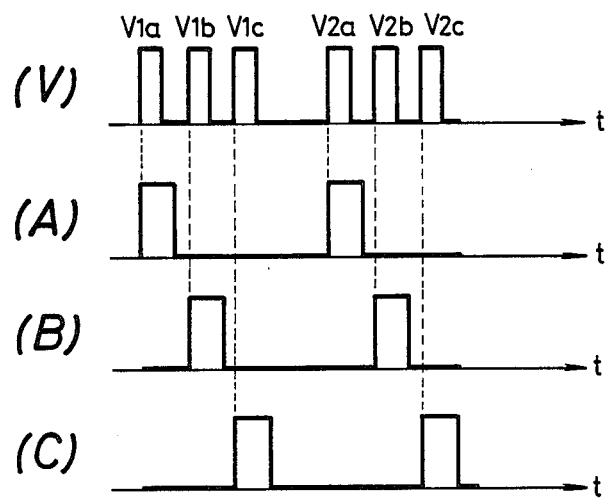

FIG. 56 illustrates the principle of the light modulation of a colored optical image accomplished by using the same modulating device 100 having a light-transmitting property, imaging lens 321 and light-receiving medium 322 as those shown in FIG. 44 and using light sources capable of light modulation such as light-emitting diodes. Reference characters 329a, 329b and 329c designates light-emitting diodes which emit, for example, red, green and blue lights, respectively, and reference characters 330a, 330b and 330c denote collimater lenses for the respective light-emitting diodes. Respective pairs of light-emitting diodes and collimater lenses constitute light flux incidence means 320a, 320b and 320c. Reference numeral 360 designates colored light flux synthesizing means having dichroic mirrors or the like for transmitting or reflecting the light flux from each light flux incidence means and directing it to the modulating device 100. Designated by 361 is a synchronizing device producing command signals for causing the light-emitting diodes 329a, 329b and 329c to emit light time-serially in synchronism with, for example, an applied voltage pulse generated by heat generation control means 362. FIG. 57 shows the manner in which respective signals are produced by the synchronizing device.

Figure 58:
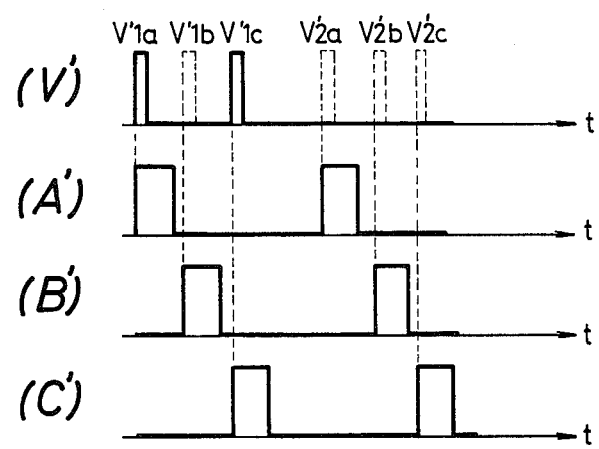

FIG. 57(V) shows clock signal pulses for causing the heat generation control means to produce an applied voltage, and FIGS. 57(A) to 57(C) show signals for causing the light-emitting diodes 329a–329c to emit light. In these FIG. s, the horizontal axis t represents the lapse of time. In FIG. 57(V), Via, Vib and Vic are clock signal pulses for causing a colored image signal to be produced and the applied voltage is controlled by the heat generation control means in synchronism with these signals. FIG. 58 illustrates a case where each member is controlled in accordance with said synchronizing signal. FIG. 58(V)' shows applied voltage pulses produced by the heat generation control means and refers to a case where $V_{1a'}\neq 0$, $V_{1c'}\neq 0$ and $V_{1b'} = V_{2a'} = V_{2b'}, = V_{2c'} = 0$. When time-divisional control of the applied voltage is effected, the red, green and blue light-emitting diodes 329a, 329b and 329c emit light in synchronism with the times during which the applied voltages $V_{1a'}$, $V_{1b'}$ and $V_{1c'}$ are to be produced. FIGS. 58(A)', 58(B)' and 58(C)' show the state of time-divisional light emission of the respective light-emitting diodes.

Since $V_{1a'}\neq 0$, $V_{1b'}=0$ and $V_{1c'}\neq 0$, the first red light of a first colored image signal becomes a centrally shaded image on the light-receiving medium due to the distribution of refractive index produced in the modulating device of FIG. 56 in accordance with $V_{1a'}\neq 0$, and then the second green light is not subjected to the influence of the distribution of refractive index because $V_{1b'}=0$ and accordingly, a green optical image is produced on the surface of the light-receiving medium. Since $V_{1c'}\neq 0$, the third blue light, like the red light, becomes a centrally shaded image on the light-receiving medium. Thus, for the applied voltages of the first colored image signals $V_{1a'}\neq 0$, $V_{1b'}=0$ and $V_{1c'}\neq 0$, a green optical image is observed on the surface of the light-receiving medium. Next, for the second colored image signals $V_{2a'}=V_{2b'}=V_{2c'}=0$, red, green and blue optical images are likewise produced on the surface of the light-receiving medium with a time lag. If the periods of the clock signals $V_{2a}$, $V_{2b}$ and $V_{2c}$ are made sufficiently short, the above-mentioned optical images can be observed as white optical images.

Description will now be made of the fact that again in the light modulation apparatus shown in FIG. 55, colored light modulation similar to what has been described in connection with FIG. 56 is possible. In FIG. 55, the light flux incidence means 320a, 320b, 320c and 360 of FIG. 56 are used instead of the light flux incidence means 320 and a synchronizing device similar to that shown in FIG. 56 is used. The signal applied to the heat generation control means 362 is applied as an input to the light modulation apparatus of FIG. 55, whereby a colored optical image similar to that of FIG. 56 is formed on the light-receiving medium 322. In this case, however, each colored optical image is produced with not only a time lag but also a space lag. However, as in the previous embodiment, this does not offer any problem where the period of the clock signal of FIG. 57(V) is short.

Figure 59:
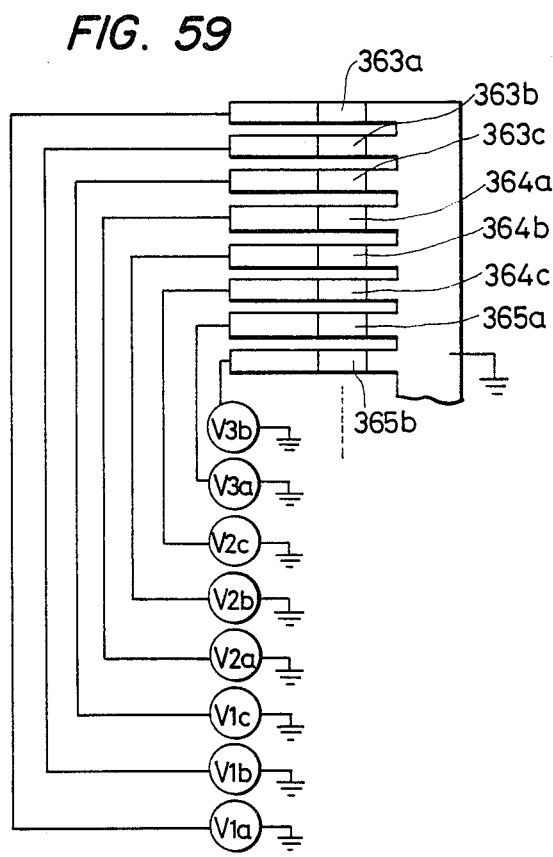

FIG. 59 shows an example of the formation method using a linear arrangement of a plurality of colored optical images. Reference numerals 363a, 363b, . . . designate heat-generating resistance members connected to heat generation control means $V_{1a}$, $V_{1b}$, . . . respectively. A colored light modulation is produced by three pairs of heat-generating resistance members and heat generation control means connected to each of the resistance members, and thus, a plurality of colored light modulations are effected as by heat-generating resistance members 363a–363c and heat generation control means $V_{1a}$–$V_{1c'}$ heat-generating resistance members 364a–364c and heat generation control means $V_{2a}$–$V_{2c'}$ and so on. In FIG. 59, $V_{ix}$, $V_{i+1,x}$ and $V_{i+2,x}$ (x=a, b, . . .) may produce signals at a time, whereas $V_{ia}$, $V_{ib}$ and $V_{ic}$ (i=1, 2, 3, . . .) may produce signals time-serially instead of producing signals at a time. This is to avoid that depending on the thermal effect medium, the distribution of refractive index formed therein is adversely affected by accumulation of heat. Where, as in the example shown, for example, in FIG. 56, a colored light modulation is effected by a heat-generating resistance member, if the periods of the applied voltages $V_{1a'}$, $V_{1b}$ and $1_{1c'}$ shown in FIG. 58 are shortened, the distributions of refractive index created correspondingly to the applied voltages $V_{1a'}$, $V_{1b'}$ and $V_{1c'}$ are varied by the accumulation of heat in the medium depending on the thermal effect medium and in some cases, the balance of the intensities of the respective colored optical images on the light-receiving medium becomes unpreferable. FIG. 59 shows an example for avoiding such a disadvantage. In this example, a colored light modulation is effected by three heat-generating resistance members 363a, 363b, 363c or 364a, 364b, 364c, whereby the balance of the intensities of the respective colored optical images is made proper. In this case, modulatable red, green and blue light-emitting diodes as shown in FIG. 56 and a synchronizing device similar to that shown in FIG. 56 are used as the light flux incidence means and synchronization and control similar to those shown in FIGS. 57 and 58 are carried out.

Figure 60:
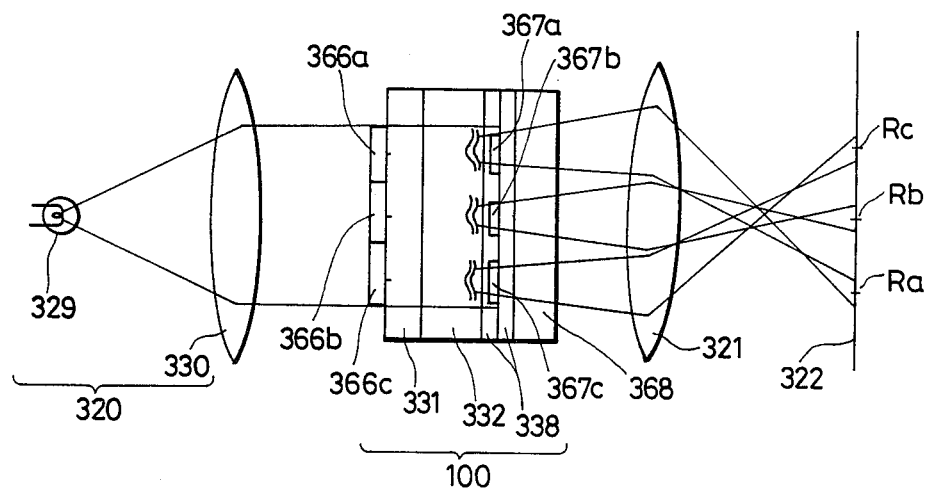

FIG. 60 illustrates an embodiment of the colored light modulation apparatus using light wavelength band selecting means. Heat-generating resistance members 367a, 367b and 367c are provided in the modulating device correspondingly to the light flux which has emerged from light flux incidence means 320 comprising a white light source 329 such as a halogen lamp and an illuminating lens system 330 and has passed through interference filters or absorption filters 366a, 366b and 366c. Reference numeral 331 designates a transparent protective plate, reference numeral 332 designates a thermal effect medium, reference numeral 338 denotes an insulating layer, and reference numeral 368 designates a transparent substrate. The heat-generating resistance members 367a, 367b and 367c are connected to independent heat generation control means, respectively, although not shown, and respectively form independent distributions of refractive index in the thermal effect medium as in the previously described embodiment. The light flux passed through each distribution of refractive index is imaged on the surface of a light-receiving medium 322 by an imaging lens 321 to form each colored optical image thereon in accordance with the principle shown in FIG. 44. Where the filters 366a, 366b and 366c are ones which transmit therethrough lights of red, green and blue wavelength bands, respectively, centrally shaded images of respective colors are formed at points Ra, Rb and Rc on the light-receiving medium in accordance with the signal production by the heat generation control means. By setting the optical system so that the points Ra, Rb and Rc are proximate to one another, any desired colored light modulation is made possible as a colored picture element.

Figure 61:
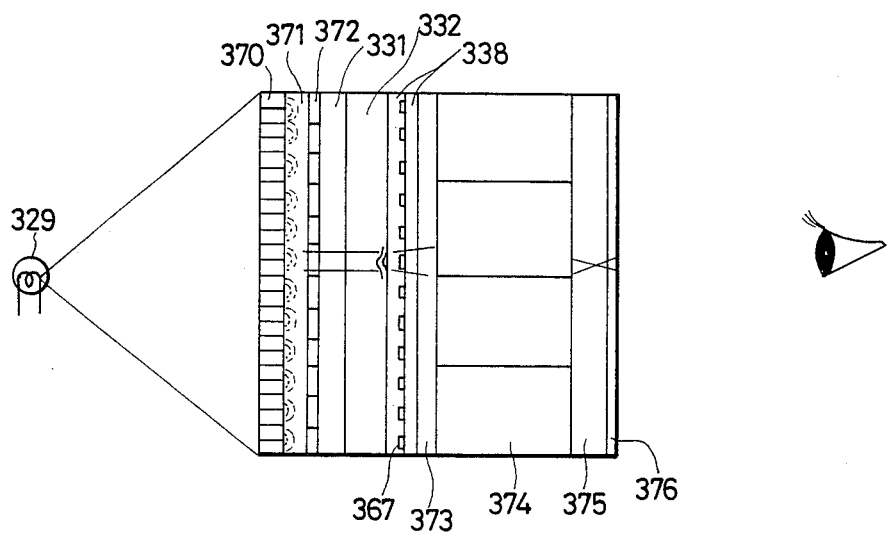

FIG. 61 shows a colored image display device as an example of the application of the present invention. Reference numeral 329 designates a light source such as a halogen lamp or a fluorescent lamp, reference numeral 370 denotes a fiber plate, reference numeral 371 designates a multi-lens array or a planar gradient index type lens array, reference numeral 372 denotes a filter array layer which transmits red, green and blue lights therethrough, reference numeral 331 designates a transparent protective plate, and reference numeral 332 denotes a thermal effect medium. Reference numeral 338 designates an insulating layer, and reference numeral 367 denotes a heat-generating resistance member array corresponding to the arrangement of the color filters 372 as shown in FIG. 60. A color signal voltage is applied to the heat-generating resistance member array 367 by heat generation control means, not shown. Reference numeral 373 designates a transparent plate, reference numeral 374 denotes a gradient index type lens array, reference numeral 375 designates a transparent plate, and reference numeral 376 denotes a display layer. The above-mentioned members, except the light source, are all made integral with one another and can thus realize a thin display apparatus.

In the above-described embodiment, red, blue and green light-emitting diode arrays as light sources may also be installed in proximity to the fiber plate 370.

Two-dimensional formation of colored image in accordance with the previously described light modulating method can be observed on the display layer of the display device as described above.

If the principle of the present embodiment is followed, realization of a thin display device which has been impossible in the prior art example using the Schlieren optical system as previously described will become possible.

Figure 62:
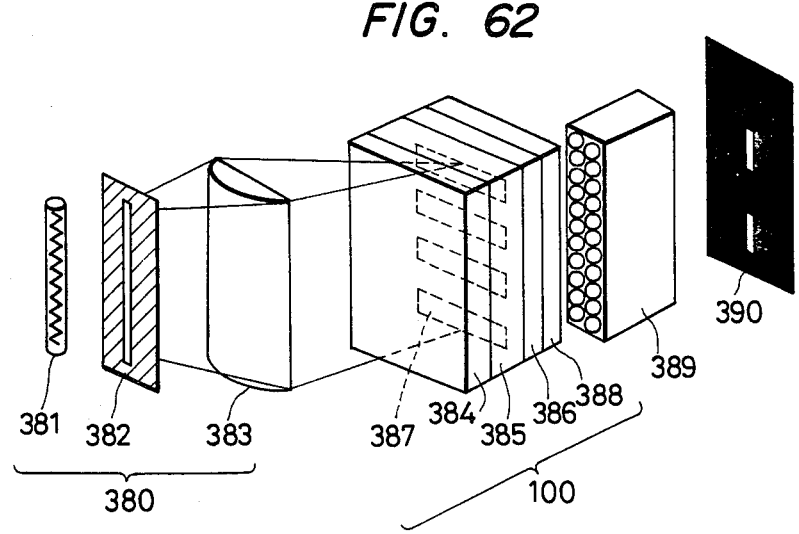

FIG. 62 shows another embodiment of the present invention in which a linear light flux is caused by light flux incident means 380 to enter a modulating device 100, having a plurality of heat-generating resistance members 387 as shown in FIG. 48 linearly arranged in the direction of arrangement of the heat-generating resistance members. In FIG. 62, reference numeral 381 designates a light source for illuminating a slit plate 382, and reference numeral 383 denotes a cylindrical lens. Reference numeral 384 designates a transparent protective plate, reference numeral 385 denotes a thermal effect medium, and reference numeral 386 designates an insulating layer in which the linear array of heat-generating resistance members 387 and electrodes, not shown, are provided. Each electrode is provided with heat generation control means, not shown, which is capable of independently controlling heat generation. Reference numeral 388 designates a transparent substrate, reference numeral 389 denotes an imaging lens such as a distribution of refractive index type lens array, and reference numeral 390 designates a light-receiving medium. This embodiment effectively utilizes the light flux from the light flux incidence means 380 to obtain linearly arranged bright optical images on the light-receiving medium 390 as a result of light modulation. By making the expanse of the incident linear light flux from the light flux incidence means 380 in a direction orthogonal to the direction of line thereof narrower than the length of the heat-generating resistance members in a direction orthogonal to the direction of arrangement of the heat-generating resistance members, it is possible to effectively modulate almost all of the incident light flux. Also, by making the length of the heat-generating resistance members 387 in a direction orthogonal to the direction of arrangement thereof greater than the length of the heat-generating resistance members in the direction of arrangement thereof, the degree of variation in refractive index of the distribution of refractive index formed in the thermal effect medium when the heat-generating resistance members generate heat can be made greater in the direction of arrangement of the heat-generating resistance members than in the direction orthogonal to the direction of arrangement of the heat-generating resistance members. As a result, the creation of bright optical images can be reduced in the direction orthogonal to the direction of arrangement of the heat-generating resistance members. Accordingly, the arrangement of bright optical images can be formed linearly on the light-receiving medium 390. This has the effect of enhancing the contrast of the optical image in the direction of movement when the light-receiving medium 390 and the light modulation apparatus are moved relative to each other in the direction orthogonal to the direction of arrangement of the heat-generating resistance members, and it is effective in practice. Further, the present embodiment has the effect of facilitating the alignment of the light flux incidence means 380 and the modulating device 100.

By disposing a plurality of cylindrical lenses such as lenticular plates having their focus position substantially at the slit plate 382 so that the generating lines of the lenticular plates are oriented in a direction orthogonal to the generating line of the cylindrical lens 383 in order to make the present embodiment more effective in practice, it becomes possible to obtain a good optical image on the light-receiving medium 390. That is, if the light flux entering the distribution of refractive index enters it at various angles in the direction of arrangement of the heat-generating resistance members 387, the degree of central shading on the light-receiving medium 390 as shown in FIG. 45 will become smaller to cause reduced contrast and for this reason, the present embodiment uses the lenticular plates as previously described so that the light flux entering the distribution of refractive index does not have a great angle in the direction of arrangement of the heat-generating resistance members. The means for achieving the above object need not always be lenticular plates, but may be any means which has a refractive power in a cross section orthogonal to the cross section having a refractive power of the cylindrical lens for forming the linear light flux, for example, a rotation-symmetrical multi-lens array.

Figure 63:
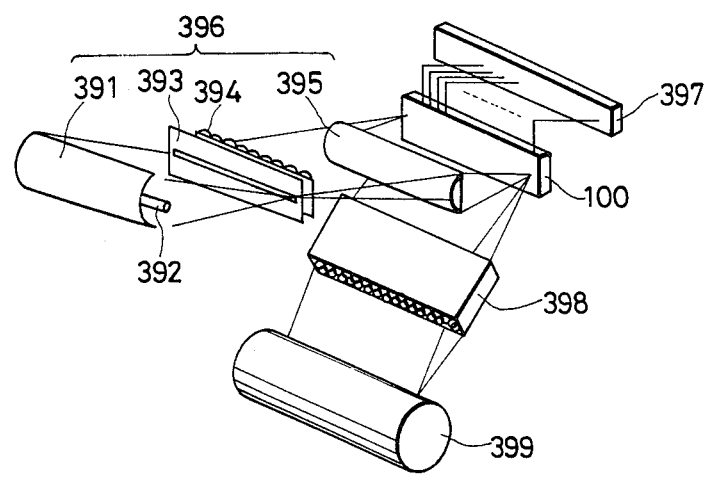

FIG. 63 shows an example of the application of the embodiment shown in FIG. 62. Reference numeral 391 designates a condensing mirror for the light flux emitted from a light source 392, reference numeral 393 denotes a slit opening plate, reference numeral 395 designates a cylindrical lens having a generating line in a direction parallel to the slit opening, reference numeral 394 denotes a lenticular plate having a refractive power in a cross section orthogonal to the cross section of the cylindrical lens 395 having a refractive power, and reference numeral 100 designates a reflecting type modulating device in which the direction of arrangement of heat-generating resistance members is coincident with the lengthwise direction of the linear light flux formed by the light flux incidence means. Reference numeral 397 designates heat generation control means for applying a voltage which causes the heat-generating resistance members to generate heat independently of one another, reference numeral 398 denotes a distribution of refractive index type lens array, and reference numeral 399 designates an electrophotographic photosensitive medium which is a rotatable cylinder having its generating line substantially parallel to the direction of arrangement of the heat-generating resistance members.

Such an optical printer does not require a Schlieren optical system and accordingly is compact and eliminates the necessity of alignment adjustment or other cumbersome procedure.

Figure 64:
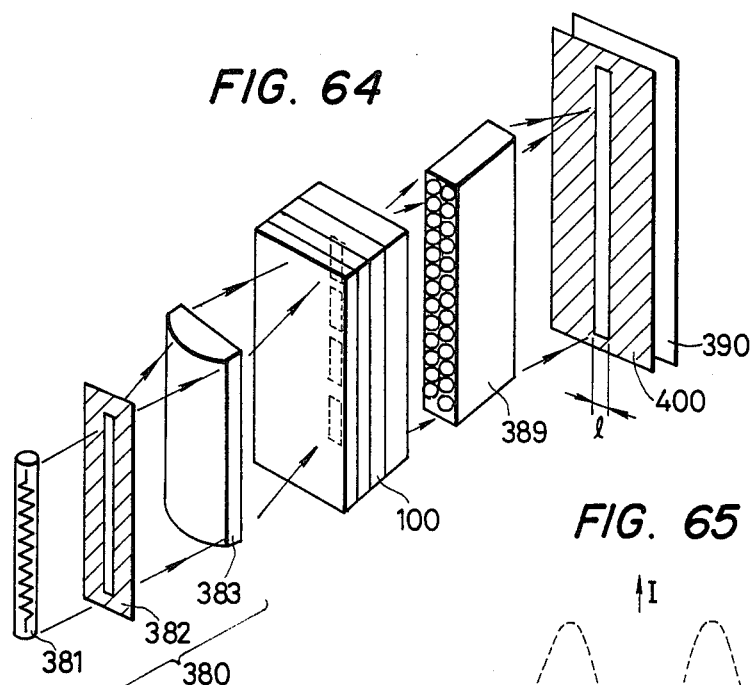

FIG. 64 illustrates a further embodiment of the present invention. The embodiment shown in FIG. 64 has a feature that, unlike the embodiment show in FIG. 62, use is made of a modulating device 100 with heating generating resistance members their longer sides disposed in the direction of arrangement of heat-generating resistance members as shown in FIG. 54 and that a second slit opening plate 400 is disposed near the light-receiving medium 390.

Figure 65:
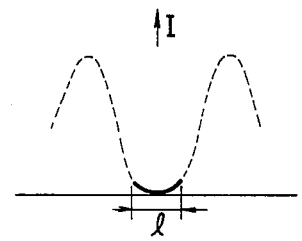

The second slit opening plate 400, as shown in FIG. 65, is for intercepting a light flux spreading in a direction orthogonal to the lengthwise direction of the slit. Such unwanted light comprises the light that has been caused to spread by the distribution of refractive index which is greater in degree of variation in the direction orthogonal to the direction of arrangement of the heat-generating resistance members as shown in FIG. 53(A) when heat is generated in the heat-generating resistance members, and the light that has emerged from the linear light flux forming means 380 but has not been affected by the distribution of refractive index in the direction orthogonal to the direction of arrangement of the heat-generating resistance members. These light fluxes are harmful lights and, therefore, they are intercepted by the second slit opening plate 400.

Figure 66:
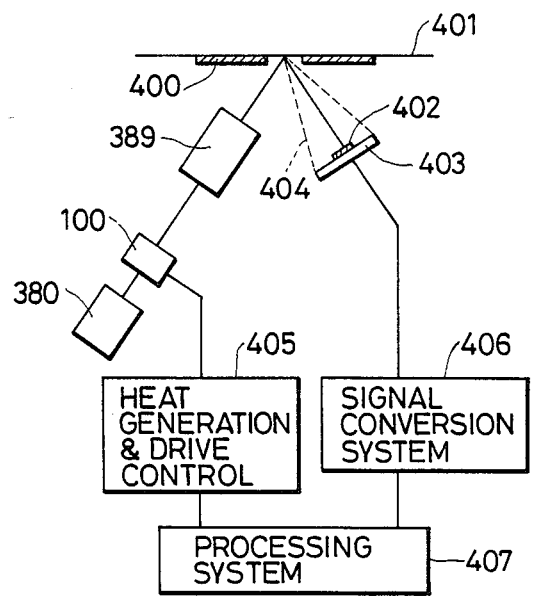

FIG. 66 shows an example of the application of the present invention which is an image reading apparatus. Reference numerals 380, 100, 389 and 400 designate the linear light flux forming means, the modulating device, the gradient index type lens array and the second slit opening plate, respectively, as shown in FIG. 64. Reference numeral 401 designates an original such as a document, reference numeral 402 denotes a light-intercepting plate for intercepting the regularly reflected light of the light flux applied to the original, reference numeral 403 designates a photoelectric conversion element, and reference numeral 404 denotes the scattered light flux of the light flux applied to the original 401. The heat generation driving and control of the heat-generating resistance members of the modulating device 100 are effected by a heat generation driving and control device 405 having a heat generation control device and a driving device, and the light signal received by the photoelectric conversion element is converted into an electrical signal by a signal converting system 406. The control signal of the heat generation driving and control device 405 and the electrical signal converted by the signal converting system are processed in synchronism with each other by a processing system 407 and the processed signals are supplied to a memory device (not shown) and a transmitter system (not shown). In this embodiment, the heat generation driving and control signals are time-serially produced as already described in connection with FIG. 51 and the light spot is scanned on the original 401.

The heat generation driving and control system need not input the time-serial signals to all of the heat-generating resistance members, but alternatively, it is possible that the photoelectric conversion element is divided into several elements so that the time-serial signals can be independently detected and correspondingly to said division, the signal produced by the heat generation driving and control system is divided to thereby produce respective time-serial signals.

Figure 67:
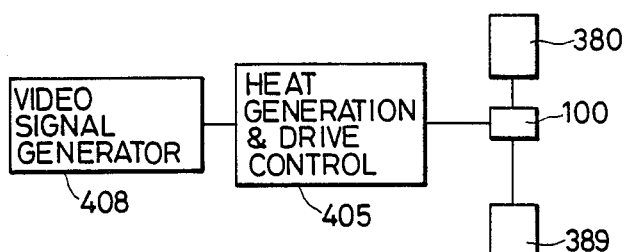

FIG. 67 shows another example of the application of the present invention which is an optical printer using an electrophotographic photosensitive medium 409 to record an image in accordance with the signal from a video signal producing device 408. Reference numerals 380, 100, 389, 400 and 405 designate members similar to those described previously and therefore these need not be described.

Numerous embodiments of the light modulation apparatus utilizing a centrally shaded image have been described above by reference to FIGS. 44 to 67. The light modulation apparatuses according to these embodiments do not use the Schlieren optical system and therefore has great advantages such as effective utilization of the incident light flux, improved contrast, etc. Further, these embodiments are effective to make the apparatus compact and simple to handle.

The light modulating device of the present invention is applicable as a colored light modulating device used in an apparatus such as a color display or a color printer. FIGS. 68 to 84 illustrate such embodiments. A light modulator is disclosed, for example, in U.S. Pat. No. 4,281,904 and, in this light modulator, it is necessary to use optical crystal to cause a polarized light to enter. Also, to better the diffracting efficiency, a limitation that the light is caused to enter as parallel as possible to the electrode is imposed. Further, a laser is often used as the light source of the light flux entering such a modulating device. Japanese Laid-open Patent Application No. 94377/1981 discloses a light valve using liquid crystal and again in this device, as in the device of the aforementioned U.S. Pat. No. 4,281,904, the incident light flux must be given a predetermined polarization characteristic. In this case, it is difficult to obtain a good elimination ratio. In contrast, the present invention does not require a special light source such as a laser, but uses a popular white light source such as a halogen lamp and does not require the light flux to be specially given a polarization characteristic and can realize modulation of colored light by a simple method.

The light modulating method according to the present invention intends to achieve the above objects by utilizing as the light modulating medium the distribution of refractive index due to the thermal effect. That is, part or all of the incident light flux has its wavefront converted by the distribution of refractive index due to the thermal effect and the direction of emergence of the light flux passed through the distribution of refractive index is changed or deflected to thereby accomplish light modulation. The present embodiment will hereinafter be described by reference to the drawings.

Figure 68:
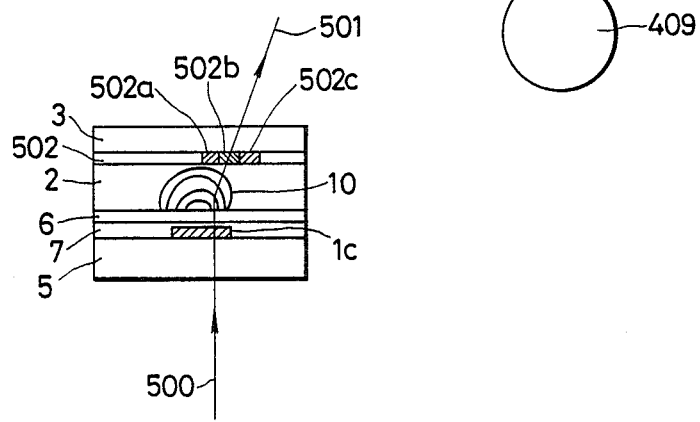
FIGS. 68, 69, 70, 71, 72, 73, 74, 75, 76, 77, 78, 79, 80, 81, 82(A)-(D), 83 and 84 illustrate embodiments in which the light modulating device of the present invention is applied to a colored light modulating device or an apparatus using it.

If, for example, the intensity of the voltage applied to the heat-generating resistance members in FIG. 2 is varied, the amount of heat generated in the heat-generating resistance members is varied and the distribution of refractive index in the thin liquid layer (hereinafter referred to as the thermal effect medium) in the vicinity thereof is varied and the wavefront of the light flux having entered there is also varied. FIG. 68 illustrates the manner in which the direction of travel of light is changed (namely, deflected) by the above-mentioned distribution of refractive index. In FIG. 68, reference numerals 1 to 7 designate the same members as those described in connection with FIG. 2, and it is to be understood that these members are all formed of light-transmitting materials. In FIG. 68, when the incident light flux 500 enters a portion of the distribution of refractive index 10 in which the gradient of the variation in refractive index is particularly great, the direction of emergence of the light ray changes and the light ray emerges while being deflected as indicated by 501. Reference numeral 502 designates a colored filter layer. By installing a predetermined colored filter, a desired colored light 501 can be chosen relative to white light 500.

When the voltage applied to the heat-generating resistance member 1c is varied, the distribution of refractive index is varied and the gradient of refractive index for the incident light flux 500 is also varied. Accordingly, the direction of the emergent light ray 12 changes and therefore, by using filters transmitting therethrough, for example, red, green and blue lights, respectively, as colored filters 502a, 502b and 502c different in type, there can be obtained an emergent light of any color.

Figure 69:
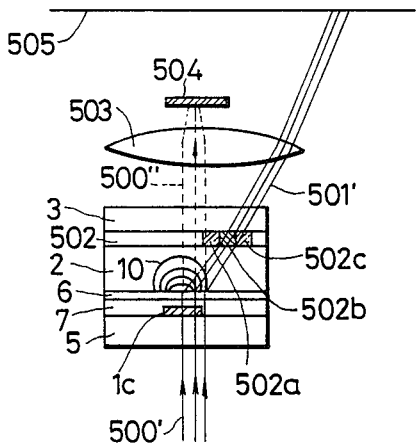

FIG. 69 shows another embodiment. In this embodiment, when no voltage is applied to the heat-generating resistance member 1c, the incident light flux 500' enters a lens system 503 as a light 500" not subjected to wavefront conversion. Thereafter, this light is intercepted by a light-intercepting filter 504. On the other hand, when a voltage is applied to the heat-generating resistance member 1c, the light passes through one of the colored filters 502a, 502b and 502c as previously described and is not intercepted by the light-intercepting filter 504 but arrives at a light-receiving medium 505. Accordingly, turn on and off of colored light is formed on the surface of the light-receiving medium 505 by ON-OFF of the applied voltage. In the above-described embodiment, the lens 503 is not requisite, but the meaning lies in that the modulated light and the non-modulated light are separated by the light-intercepting filter 504.

Figure 70:
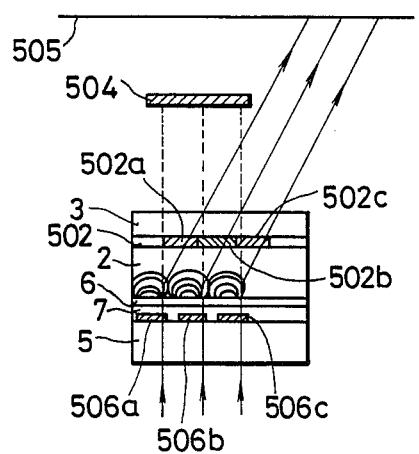

FIG. 70 shows another embodiment of the colored light modulating device. In FIG. 70, reference characters 506a, 506b and 506c designate heat-generating resistance members to which are applied predetermined voltages corresponding to different color video signals. Zero or a predetermined voltage is applied to each of the heat-generating resistance members. When no voltage is applied to the heat-generating resistance members, the light flux passed through the modulating device is intercepted by a light-intercepting filter 504 and, when a voltage is applied to any one or all of the heat-generating resistance members 506a, 506b and 506c, the light fluxes having entered the areas of the distribution of refractive index corresponding to heat-generating resistance members are deflected and pass through colored filters 502a, 502b and 502c installed at predetermined positions and arrive at a light-receiving medium 505. This embodiment uses a predetermined voltage without varying the voltage applied to each heat-generating resistance member as in the previous embodiment, and overcomes the disadvantage of the previous embodiment that a plurality of colored lights cannot be obtained at a time and thus, the present embodiment enables a plurality of colored lights, namely, mixed colored lights, to be obtained at a time.

Figure 71:
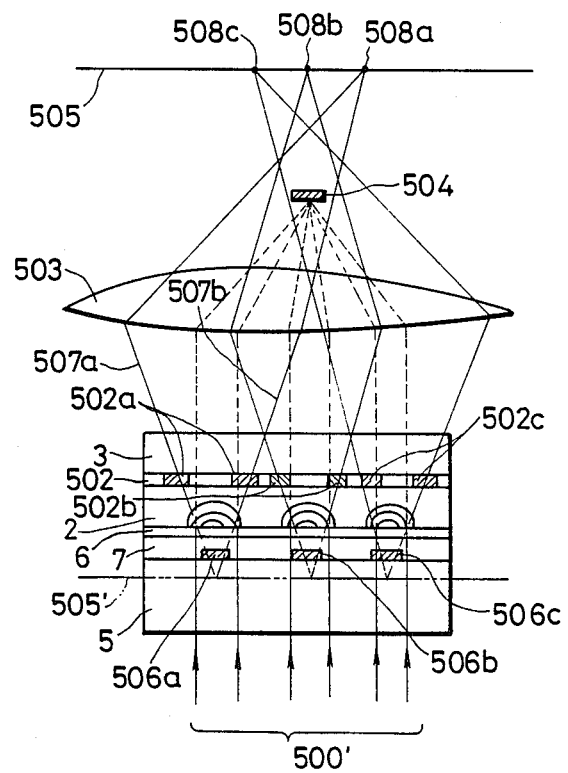

FIG. 71 shows a further embodiment of the colored light modulating device. Reference characters 506a, 506b and 506c designate heat-generating resistance members. When a predetermined voltage is applied to each of the heat-generating resistance members, a distribution of refractive index is created in the thermal effect medium 2 as previously described, and the light fluxes deflected thereby pass through colored filters 502a, 502b and 502c, respectively. For example, by disposing a lens system 503 for rendering a plane 505' containing the diversive orgins of light rays 507a and 507b passing through the colored filter 502a and the surface of a light-receiving medium 505 conjugate, and providing a light-intercepting filter 504 at the imaged point position of the incident light flux 500' by the lens 503, the light rays 507a and 507b arrive at the surface of the light-receiving medium 505 and form an imaged spot 508a. Imaged spots 508b and 508c are likewise formed for the other heat-generating resistance members as well.

Figure 72:
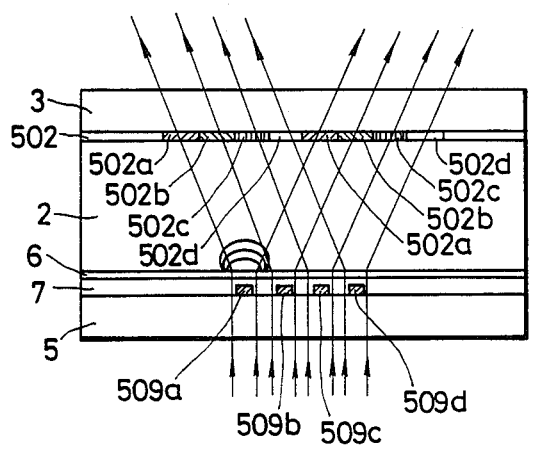
Figure 73:
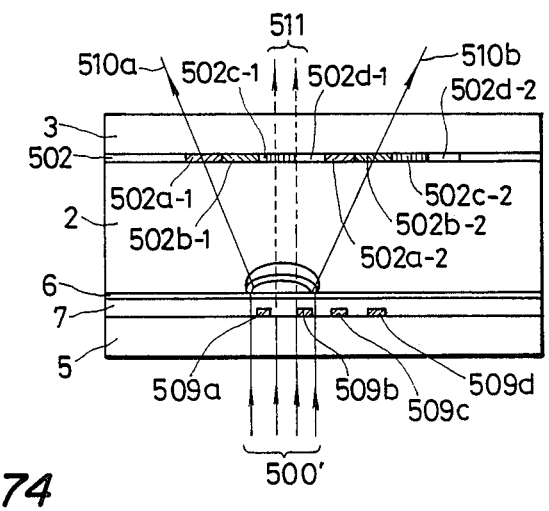

FIG. 72 shows still a further embodiment of the colored light modulating device, and illustrates the state of the emergent light when a voltage is applied to heat-generating resistance members 509a-509d non-simultaneously. When a voltage is applied to the heat-generating resistance members 509a-509d non-simultaneously, light rays passed through respective distributions of refractive index may pass through colored filters 502a, 502b, 502c and 502d. Now, in FIG. 72, when a voltage is applied to adjacent heat-generating resistance members 509a and 509b simultaneously, independent distributions of refractive index disappear and a distribution of refractive index is formed by the two heat-generating resistance members, as shown in FIG. 73. This can be realized by shortening the spacing between the heat-generating resistance members 509a and 509b. When the light flux 500' enters the area of such a distribution of refractive index, the light flux is deflected only at the end portion of the distribution of refractive index and the light flux 511 at the center thereof is not deflected but passes intactly. In this case, as regards the modulated flux, two different colors 510a and 510b passed through colored filters 502a-1 and 502b-2 emerge.

Next, when a voltage is applied to the heat-generating resistance members 509b and 509c simultaneously, a distribution of refractive index similar to that described above is created and as regards the emergent light, two different colored lights corresponding to colored filters 502b-1 and 502c-2 emerge. Further, when a voltage is applied to the heat-generating resistance members 509c and 509d simultaneously, two different colored lights corresponding to colored filters 502c-1 and 502d-2 likewise emerge. When a voltage is applied to the heat-generating resistance members 509a, 509b and 509c simultaneously, the gradient of refractive index becomes great only in the portions corresponding to the opposite ends of the heat-generating resistance members 509a and 509c on the basis of a principle similar to that previously described and only the lights having entered those portions are deflected and pass through the colored filters 502a-1 and 502c-2. The light flux having entered the central portion thereof is not deflected but emerges as a light flux 511.

Figure 74:
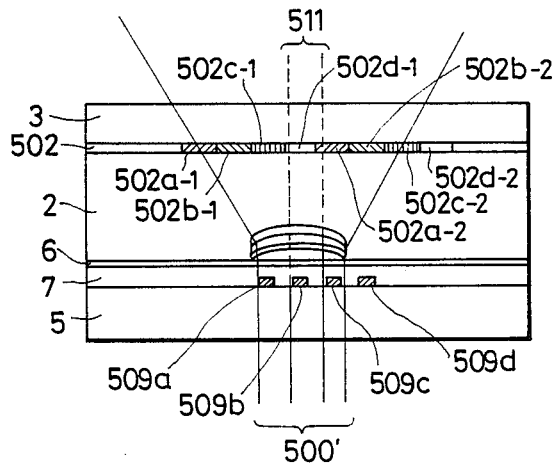

In contrast with the embodiments shown in FIGS. 72 to 74, by using a lens system and a light-intercepting filter similar to those shown in FIG. 71, any colors or a combination thereof can be observed on the surface of the light-receiving medium. Assuming that colored filters 502a-1 (502a-2), 502b-1 (502b-2), 502c-1 (502c-2) and 502d-1 (502d-2) are red (R), green (G), blue (B) and white (W), respectively, there are obtained combinations of colors as shown in Table 1 below by the combination of the voltages applied to the heat-generating resistance members.

TABLE 1

| Combinations | 509a | 509b | 590c | 509d | Colors |
|---|---|---|---|---|---|
| 1 | o | | | | R |
| 2 | | o | | | G |
| 3 | | | o | | B |
| 4 | | | | o | W |
| 5 | o | o | | | R + G |
| 6 | | o | o | | G + B |

TABLE 1-continued

| Combinations | 509a | 509b | 590c | 509d | Colors |
|---|---|---|---|---|---|
| 7 | o | o | o | | R + B |

By periodically arranging the heat-generating resistance members 509a–509d in the above-described embodiment with these heat-generating members as a color signal source for a picture element, a color signal source of a plurality of one-dimensional picture elements or a plurality of two-dimensional picture elements can be realized.

Figure 75:
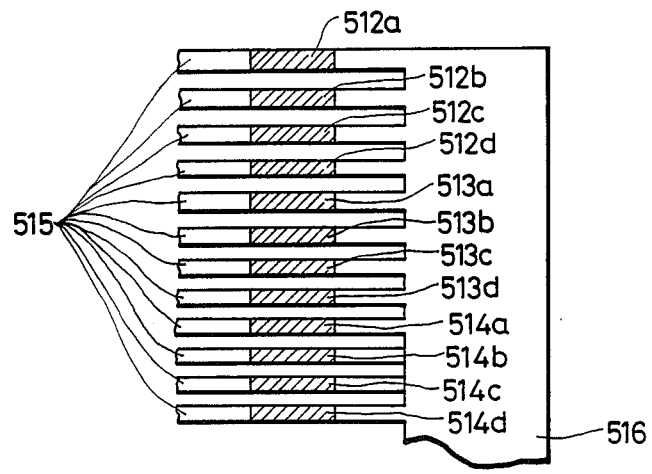

An embodiment of the plurality of one-dimensional picture elements is shown in FIG. 75. Reference characters 512a–512d, 513a–513d, 514a 514d, . . . designate arrays in which the heat-generating resistance members 509a–509d as the color signal source for a picture element in the previously described embodiment are periodically arranged, reference numeral 515 denotes electrodes connected to the voltage application means, and reference numeral 516 designates a grounded electrode. The heat-generating resistance members are arranged in proximity to one another so that when a voltage is applied to adjacent heat-generating resistance members simultaneously, the distribution of refractive index thereof is the same as that described in connection with FIG. 73 or 74.

Figure 76:
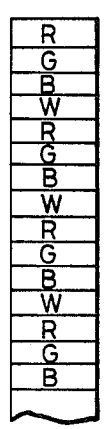

FIG. 76 shows colored filters corresponding to the heat-generating resistance members shown in FIG. 75. R, G, B and W designate red, green, blue and white colored filters periodically arranged.

In the examples described above, liquid has been described as a medium for forming a distribution of refractive index by heat-generating resistance members, and for example, water, ethyl alcohol or the like is used such liquid. Also, in the present invention, a structure having a light-transmitting property has been described as the means for creating a distribution of refractive index, and for example, by adopting an insulating layer as the member 7 and a light-reflecting layer as the member 6 in FIG. 72, the modulating device can also be used as the reflecting type and the same effect can be obtained.

Figure 77:
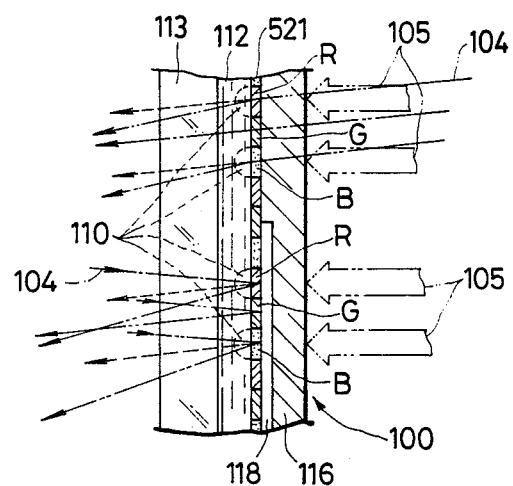

FIG. 77 shows another embodiment of the colored light modulating device according to the present invention. This FIG. is a schematic cross-sectional view showing, for convenience of illustration, the upper half as the transmitting type light modulating device and the lower half as the reflecting type light modulating device. Reference numeral 116 designates a light-to-heat converting medium, and reference numeral 118 denotes a reflecting film. The reflecting film 118 is not provided in the transmitting type light modulating device 100 shown in the upper half. Reference numeral 521 designates a colored mosaic filter. The specific structure and manufacturing technique of such filter are described in detail in Japanese Patent Publications Nos. 13094/ 1977 and 36019/1977 which are incorporated herein by reference, and therefore need not be described in detail herein. Reference numeral 112 designates a liquid layer, and reference numeral 113 denotes a transparent protective plate. The elements forming the light modulating device 100, except the colored mosaic filter 521, are as described in connection with FIG. 18 and are omitted herein for simplicity of description.

In the embodiment illustrated, when the liquid layer 112 in contact with the red filter portion R of the colored mosaic filter 521 is conduction-heated by the light-to-heat converting medium layer 116 which has absorbed radiation 105 and the heated area 110 of the liquid layer is created thereon, the parallel illuminating light 104 reflected by the reflecting film 118 or transmitted through the light-to-heat converting medium layer 116 passes through the heated area 110 of the liquid layer, whereby on the basis of the mechanism as previously described, the light passes along a crooked optical path indicated by dots-and-dash line which differs from the optical path of the light having passed as indicated by broken line when the heated area 110 of the liquid layer is absent, and emerges out of the light modulating device 100. The transmitted light or the reflected light emerging from the light modulating device 100 when white light has entered the red filter portion R is only the light whose red is visually perceived (hereinafter referred to as the red light). With regard also to the lights passed through the blue filter portion B and the green filter portion G, their paths of travel are similar to the path of travel of the aforementioned light passed through the red filter portion R. However, in the case of FIG. 77, with regard to the green filter portion G, only the light ray which does not pass through the heated area 110 of the liquid layer is shown. Also, where the incident light 104 is white light, the light passed through the blue filter portion B is only the light whose blue is visually perceived (hereinafter referred to as the blue light), and the light passed through the green filter portion G is only the light whose green is visually perceived (hereinafter referred to as the green light). When the observer, not shown, views the light modulating device 100 toward the direction of the light passed through the heated area 110 of the liquid layer, he will visually perceive the false color by the additive color process. For example, the observer, not shown, can visually perceive the white color when the liquid layer 112 is heated simultaneously in the red filter portion R, the green filter portion G and the blue filter portion B of the adjacent color mosaic filter 521 and the heated area 110 of the liquid layer is formed.

Also, by disposing a light-intercepting filter, not shown, in front of the light modulating device 100 as described in connection with FIG. 18, of the lights emerging from the light modulating device 100, only the light passed through the heated area 110 of the liquid layer is made to pass through the openings of the light-intercepting filter, not shown, whereby the false color display by a more apparent additive color process can be obtained.

Figure 78:
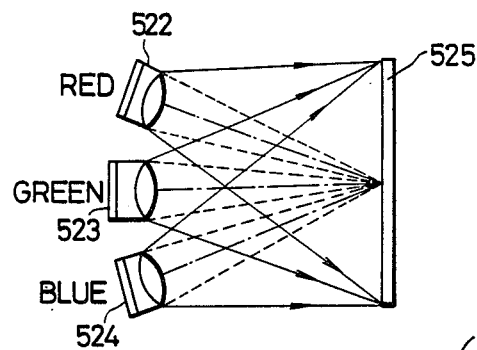
Figure 79:
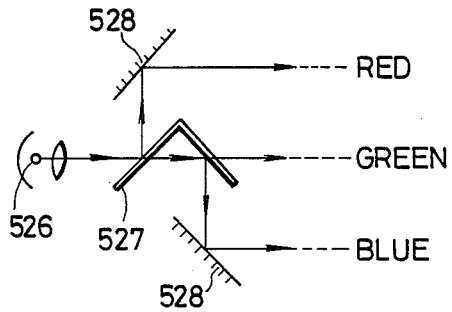

FIG. 78 shows a simultaneous type colored light valve projection apparatus in which projection devices 522, 523 and 524 of three red, blue and green channels are parallel-arranged so that images are projected onto a screen 525 at a time and the rasters of three primary colors are snugly superposed one upon another on the screen 525. As shown in FIG. 79, the light from a white light source 526 is resolved into three primary colors by two dichroic mirrors 527 and mirrors 528 so as to provide the illuminating light sources of red, blue and green projection devices. Accordingly, the utilization rate of the light fluxes of the light sources is about three times that in the case of the succession type.

Figure 80:
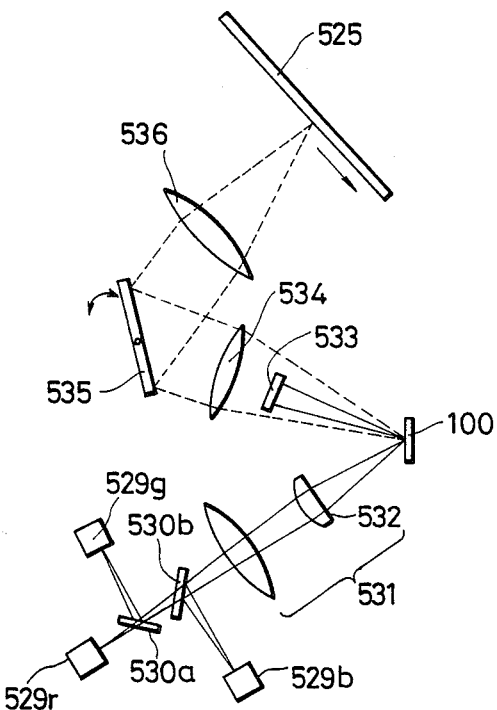

FIG. 80 schematically shows the construction of a display apparatus which utilizes the light modulating device 100 shown in FIG. 2 to project colored images onto a screen.

Reference characters 529r, 529g and 529b denote a red light source, a green light source and a blue light source, respectively, which put out red light, green light and blue light, respectively. These light sources put out lights time-serially alternately in the named order. Reference characters 530a and 530b designate half-mirrors for reflecting the lights from the green light source 529g and the blue light source 529b, respectively, and directing these lights in the same direction as the direction of the light of the red light source 529r. Reference numeral 531 denotes a linear image forming optical system comprising a cylindrical lens 532 or the like. The linear image forming optical system 531 is for imaging the light from any one of the red light source 529r, the green light source 529g and the blue light source 529b in the form of a line on the heat-generating portion of the reflecting type light modulating device 100 incorporating therein the heat-generating means shown in FIG. 2. The optical image in the form of a line formed on the light modulating device 100, if the heated area of the liquid layer is not formed in the liquid layer of the light modulating device 100, is reflected by the light modulating device 100 and is condensed on a light-intercepting filter 533 by the linear image forming optical system 531 through the light modulating device 100. Reference numeral 534 designates a lens, reference numeral 535 denotes a galvano mirror as an example of the light deflector, and reference numeral 536 designates a lens. By these, the light scattered from the heated area of the liquid layer of the light modulating device 100 is imaged on a screen 525. The galvano mirror 535 is for scanning an image corresponding to the linear image reflected from the light modulating device 100 in the direction of arrow indicated near the screen 525.

Now, let it be assumed that the galvano mirror 535 lies at a certain position. The red light from the red light source 529r is imaged in the form of a line on the light modulating device 100 by the linear image forming optical system 531. In synchronism therewith, the heat-generating resistance members of the light modulating device 100 are supplied with power through a switching circuit, not shown, in accordance with a video signal and thereby generate heat, so that a heated area (not shown) is formed in the liquid layer of the light modulating device 100. The red light scattered by this heated area of the liquid layer is imaged as point images on the screen 525 through the lens 534, the galvano mirror 535 and the lens 536. With regard also to the green light source and the blue light source, by the same operation as described with respect to the red light source, a linear image comprising point images corresponding to the video signal is superposed on the same line on the screen 525. If, in this manner, linear images are formed one after another on the screen 525 by the scanning of the galvano mirror 535, a colored projected image corresponding to the video signal will be formed on the screen 525.

Figure 81:
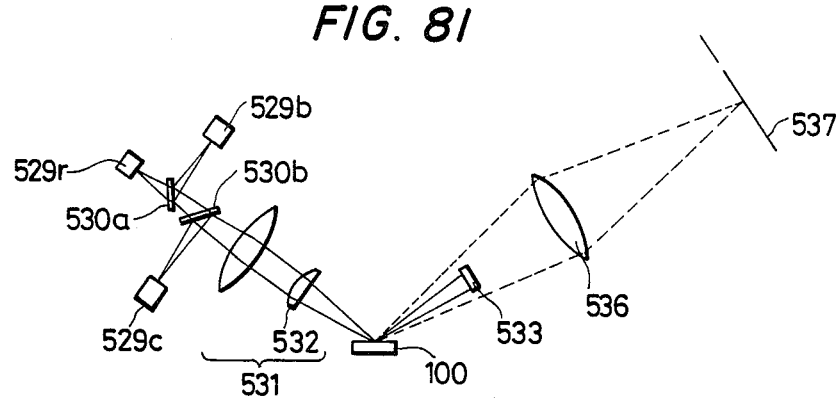
Figure 82A:
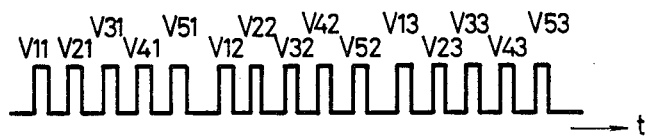
Figure 82B:
Figure 82C:
Figure 82D:
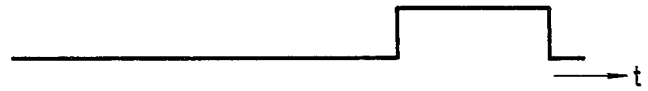

FIG. 81 shows another embodiment of the light modulation apparatus for obtaining colored images to which the light modulating device according to the present invention is applied. A light source 529r is a red light-emitting diode, a light source 529g is a green light-emitting diode, a light source 529b is a blue light-emitting diode, reference numeral 530a designates a dichroic mirror transmitting the red wavelength band therethrough and reflecting the green wavelength band, and reference numeral 530b denotes a dichroic mirror transmitting therethrough the other wavelength bands than the blue wavelength band and reflecting the blue wavelength band. These are arranged so that the light flux from each light source arrives at the heat-generating resistance members of the light modulating device 100. By using such three color light sources and a single light modulating device, it is possible to create colored images on the light-receiving medium. FIG. 82 shows one type of the colored image producing system shown in FIG. 81. FIG. 82(A) shows a voltage pulse train input to the heat-generating resistance members (not shown) of the light modulating device 100. In FIG. 82(A), $V_{1i}$, $V_{2i}$, ..., $V_{5i}$ (i=1-3) indicates the voltage pulses applied to the heat-generating resistance members, and i(=1-3) indicates the number of the period thereof. FIG. 82(B) shows a current signal pulse input to the light-emitting diode 529r, and also shows that the light-emitting diode 529r emits light for the period during which the voltage pulse train $V_{11}$, $V_{21}$, ..., $V_{51}$ is produced. FIG. 82(C) shows a current signal pulse input to the light-emitting diode 529g and also shows that this light-emitting diode emits light for the period during which the voltage pulse train $V_{12}$, $V_{22}$, ..., $V_{52}$ is produced. FIG. 82(D) shows that the light-emitting diode 529b likewise emits light for the period during which the voltage pulse train $V_{13}$, $V_{23}$, ..., $V_{53}$ is produced. In FIGS. 82(A), (B), (C) and (D), the horizontal axis represents time t and, in the preceding time zone, not shown, the above-described signal pulse is generated periodically. When a photosensitive medium 537 is moved in the direction of arrow as shown in FIG. 81, red, green and blue spots arranged in the direction of arrow, i.e., the direction of movement of the photosensitive medium, are formed on the surface of the photosensitive medium. These three spots form a picture element, whereby color recording can be accomplished. In FIG. 82(A), a voltage pulse has been input to all of the heat-generating resistance members at the same time interval, but if the voltage pulse is generated in accordance with an image signal, it will be possible to produce any colored image on the photosensitive medium 537. As described above, the present embodiment need not specially have a polarization characteristic and permits the use of light sources different in wavelength.

Figure 83:
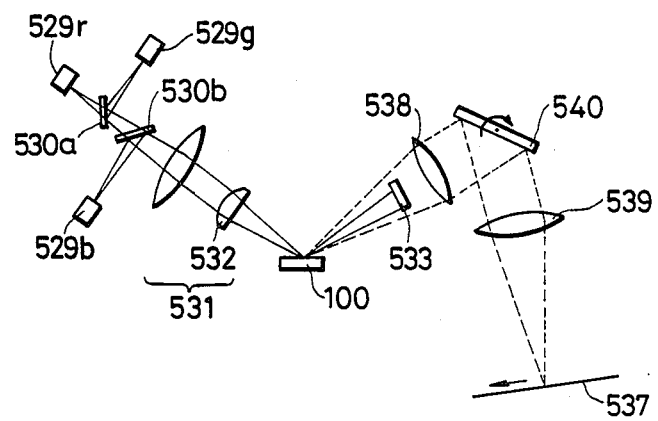

FIG. 83 shows an example of the application of the apparatus shown in FIG. 81, namely, an embodiment in which the colored image shown in FIG. 81 is deflected by the use of a deflector 540 and the whole surface of the stationary photosensitive medium 537 can be scanned by a scanning spot. If a photosensitive recording material such as silver halide film is chosen as the photosensitive medium, a digital color printer can be realized. In the present invention, the contrast of the signal light (the divergent light due to the distribution of refractive index) is high and the diverging efficiency is high and therefore, the brightness of the imaged spot light on the photosensitive medium can be made high and it becomes possible to realize the digital color printer as mentioned above. Of course, the digital printer may be a monochromatic printer using a single light source of the described type.

Figure 84:
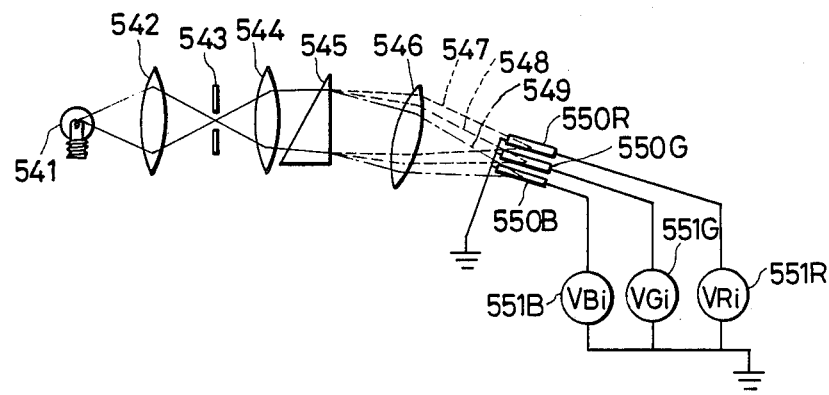

FIG. 84 shows a further embodiment of the light modulation apparatus for obtaining colored images to which the light modulating device according to the present invention is applied. In FIG. 84, a light source 541 is a popular white light lamp such as a halogen lamp, a lens 542 is a condensing lens, reference numeral 543 designates a pin-hole plate for limiting a secondary light source image, reference numeral 544 denotes a collimater lens, reference numeral 545 designates a prism for causing color dispersion, reference numeral 546 denotes a converging lens, and reference characters 550R, 550G and 550B designate heat-generating resistance members for producing red, green and blue scattered lights, respectively, which are color signals. The heat-generating resistance members 550R, 550G and 550B are independently connected to voltage application means 551R, 551G and 551B, respectively, for generating voltage pulses corresponding to input signals. For simplicity of illustration, the details of the light modulating device are not shown here, but it is of the same construction as that shown in FIG. 3, except for the heat-generating resistance members.

In the above-described embodiment, it is possible to condense a red light flux, a green light flux and a blue light flux on the heat-generating resistance members 550R, 550G and 550B, respectively, by the color dispersing prism 545 and the lens 546 and modulate the color signal lights in accordance with the image signals.

Further, in FIG. 84, a cylindrical lens having a generating line in a direction perpendicular to the plane of the drawing sheet may be used instead of the lens 546 so that a red light flux, a green light flux and a blue light flux may be linearly imaged. At this time, the linear light fluxes corresponding to the respective colors are formed while being arranged in slightly spaced apart relationship with one another. Accordingly, by making the heat-generating resistance members 550R, 550G and 550B into a unit and arranging a plurality of such units along the directions of the linear images, there can be obtained a plurality of rows of color picture elements. Instead of the prism as the light flux dispersing means in FIG. 84, a diffraction grating may be used to obtain the same effect.

FIGS. 85 to 95 illustrate some embodiments of the electrical driving for a plurality of heat-generating means in a case where such plurality of heat-generating means are used with respect to the light modulating device of the present invention.

Figure 85:
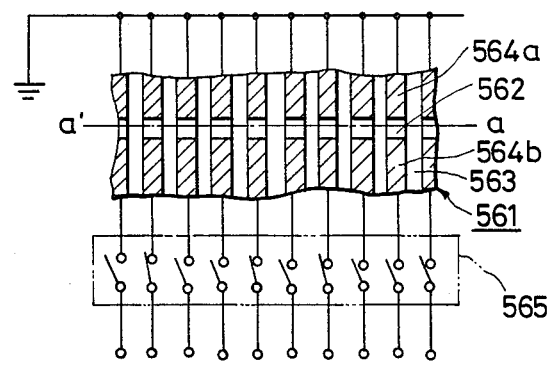
FIGS. 85, 86(A) and (B), 87, 88,89, (A) and (B) 90, 91, 92, 93, 94 and 95 illustrate embodiments regarding the electrical drive for light modulation in a light modulation apparatus using the light modulating device of the present invention.

FIG. 85 is a schematic, fragmentary view of an embodiment of the heat-generating resistance members as heat-generating means. The heat-generating portions of the heat-generating means 561 shown in FIG. 85 are arranged in the form of dotted line. Reference numeral 562 designates heat-generating resistance members arranged in the direction of line a—a' alternately with insulating layers 563. Electrodes 564a and 564b are provided on the opposite sides of each heat-generating resistance member 562. The electrodes 564a are connected in common and grounded. The other electrodes 564b are connected to the electronic switches of a switching circuit 565. The other ends of these electronic switches are connected to a common DC power source, not shown. It is to be understood that the electronic switches of the switching circuit 565 are opened and closed in response to an image signal.

Many of the conventional light modulating devices utilizing the electro-optic effect or the acousto-optic effect use optical crystal and the response speed of light to the electrical signal input thereto is high and the decay time is short. For example, in many of the light modulating devices utilizing the electro-optic effect or the acousto-optic effect, the decay time is 1 $\mu$sec or less. Accordingly, a light modulating device utilizing the electro-optic effect or the acousto-optic effect can exhibit the advantage of high response speed as a flying spot scan type modulating device, but where it is used as a shutter array as shown in U.S. Pat. No. 4,281,904, the time during which it can modulate the incident light flux is short because its response speed as the device is high as described above and accordingly, to obtain a sufficient quantity of light, a light source of high brightness must be employed. Where it is impossible to make the brightness of the light source so high, it is necessary to make the width of the input signal for driving the light modulating device long to thereby prolong the input time.

In contrast, the light modulating device of the present invention creates a distribution of refractive index by heat being locally applied to a thermal effect medium whose refractive index is liable to be varied by heat, and modulates a light flux. The modulation characteristic of such thermo-optic effect light modulating device differs from that of the above-described electro-optic or acousto-optic type light modulating device, and a particularly remarkable difference of the former from the latter is that the decay time is as long as several tens of $\mu$sec to several tens of msec.

Where image formation or display is carried out by the use of the light modulating device as described above, a light modulating portion which can independently perform light modulation corresponds to one dot of light modulation on the plane of projection, and there are about 2,100 dots in the direction of the shorter side of format A4 and therefore, in order that the direction of the shorter side of format A4 may be modulated at a time, 2,100 light modulating portions must be arranged in a row. To drive these light modulating portions, the same number of driving circuits as the light modulating portions become necessary, and this leads to bulkiness and complication of the light modulating device.

An embodiment which will now be described has an effect that the driving mechanism is simplified in a light modulating device provided with a plurality of modulating porions. That is, in a thermo-optic effect light modulating device, the decay time is long and therefore, even if the width of the input signal driving the light modulating device is short, light modulating action can be effected in the light modulating portions for a long time and the total quantity of modulated light reaches a sufficient quantity. Accordingly, the driving time during which one modulating portion of the light modulating device is driven is short, or in other words, the pulse width of the driving pulse is short and therefore, a plurality of light modulating portions can be time-divisionally driven by a driving circuit. Therefore, the number of driving circuits can be reduced for the number of light modulating portions and thus, the driving means can be simplified. Such embodiment will hereinafter be described by reference to the drawings.

Figure 86A:
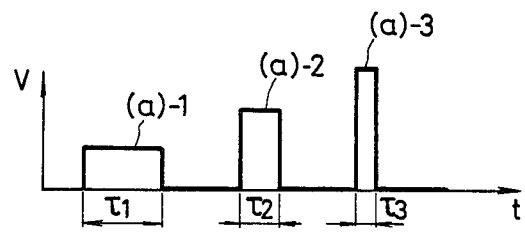
Figure 86B:
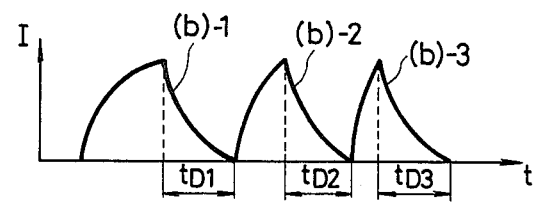

FIG. 86 illustrates the relation between the input voltage signal and the light output response characteristic of the thermo-optic effect light modulating device according to the present invention, FIG. 86(A) showing a voltage pulse which is an input signal, and FIG. 86(B) showing the output response characteristic of the light modulated by the distribution of refractive index created in the medium by the voltage pulse. In these Figures, the horizontal axis represents time.

In FIG. 86(A), (a)-1 to (a)-3 show the cases where a voltage is input with the voltage value V changed in accordance with the pulse width of each voltage pulse. In FIG. 86(B), (b)-1 to (b)-3 show the response of the light output I corresponding to each voltage input pulse. If the voltage pulse width is shortened with the input voltage value remaining constant, the ratio of quantity of light between the modulated light and the non-modulated light of the thermo-optic effect light modulating device is reduced, and FIG. 86 shows the manner in which the voltage value is made higher as the input voltage pulse width is shortened in order to avoid the above mentioned reduction of light quantity as far as possible. In FIG. 86(B), $t_{Di}$ (i=1, 2, ...) shows the decay time of the light output, and in the case of a thermooptic effect light modulating device, the decay time $t_{Di}$ is often in the range of several tens of μsec to several tens of msec although the characteristic differs variously depending on the medium, structure, etc. used. In contrast, the pulse width $\tau_i$ (i=1, 2, ...) of the voltage pulse which is an input signal is more effective as it is shorter. The details thereof will hereinafter be described.

Figure 87:
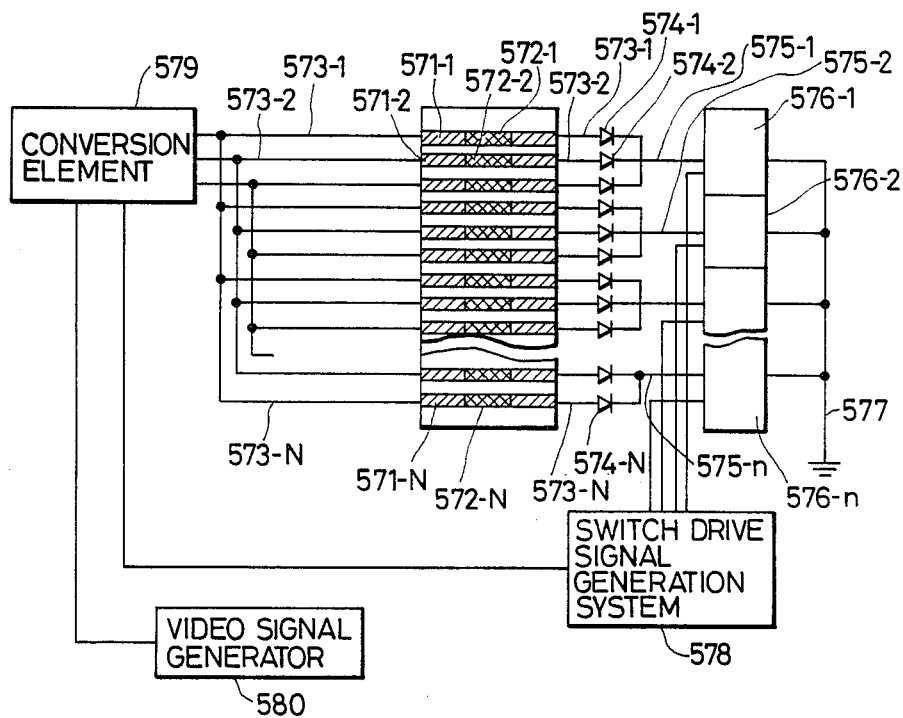

FIG. 87 is a plane view of the thermo-optic effect light modulating device shown in FIG. 3 and shows the driving method of the voltage signal applied to the heat-generating resistance members used in the present embodiment. In FIG. 87, reference numerals 571-1, 571-2, ..., 571-N designate conductors connected as the electrodes of N heat-generating resistance members designated by 572-1, 572-2, ..., 572-N.

Conductors 573-1, 573-2, ..., 573-N are connected to the respective electrodes and rectifying elements 574-1, 574-2, ..., 574-N are connected in the intermediate portions of these connections. These rectifying elements are connected to conductors 575-1, 575-2, ..., 575-n so that each set of three (this number will hereinafter be referred to as the number of simultaneous drives and may be any number) rectifying elements are parallel-connected. Further, the conductors 575-1, 575-2, ..., 575-n are connected to switch elements 576-1, 576-2, ..., 576-n, respectively, and also to a switch driving signal producing system 578, so that only when a signal produced by the switch driving signal producing system is input to any one of the switch elements 576-1, 576-2, ..., 576-n, that switch becomes conductive with a conductor 577 grounded or connected to a predetermined potential. On the other hand, design is made such that a signal is input from the switch driving signal producing system 578 also to a series-to-parallel conversion element 579 and the video signals from a video signal producing device 580 are put out in parallel by the number of simultaneous drives (in this case, three as mentioned previously). The number of simultaneous drives of parallel signals are parallel-input to the heat-generating resistance members 572-1, 572-2, .... Where the signal input from the switch driving signal producing system 578 to the switch elements 576-1, 576-2, ... is a time-serial signal, the switch elements become conductive in succession and in that case, the aforementioned parallel input signals are input to the heat-generating resistance members corresponding to the switch elements which are in conductive state. One of the parallel input signals is a voltage signal having the pulse width $\tau_i$ shown in FIG. 86, and at any given time, the number of simultaneous drives of parallel signals are applied only to the heat-generating resistance members corresponding to that number and n applications of the parallel signals are effected in succession, whereby each video signal is distributed to N heat-generating resistance members.

As described above, the fact that the afore-mentioned decay time is long is utilized and the signal need not be applied to all of N heat-generating resistance members at a time, but they can be driven n (<N) times. The number of heat-generating resistance members to be driven at a time may be N/n.

Figure 88:
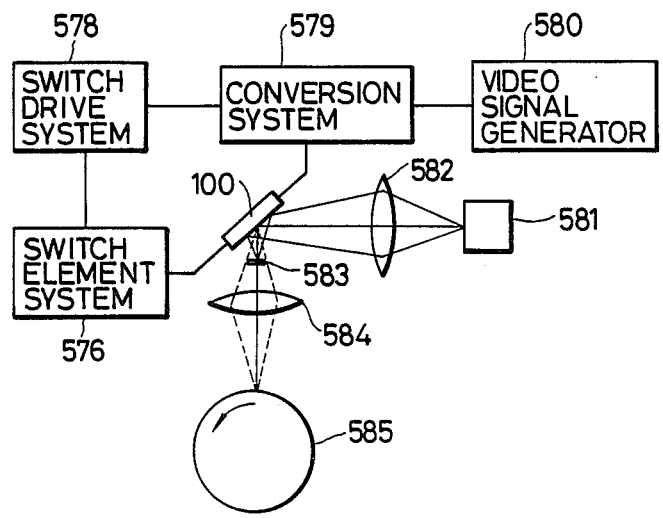

FIG. 88 shows an optical printer apparatus as an embodiment using the light modulating device of the present invention. In FIG. 88, reference numerals 576, 578, 579 and 580 respectively designate a switch element system, a switch driving system, a series-to-parallel converting system and a video signal producing device having the same functions as the members designated by the same reference numerals in FIG. 87. Reference numeral 100 denotes a light modulating device including the rectifying elements 574-1 to 574-n shown in FIG. 87. Light is modulated by the principle shown in FIG. 3. Reference numeral 581 designates a light source unit having a light source such as a laser, a light-emitting diode or a halogen lamp. The light flux emitted from the light source unit 581 illuminates the light modulating device 100 by an illuminating optical system 582. Designated by 583 is a light-intercepting filter for intercepting as much as possible of the non-modulated light flux of the above-mentioned illuminating light. The filter 583 is so disposed as to pass therethrough as much as possible of the modulated light flux indicated by broken lines. The above-mentioned modulated light flux forms an imaged spot on a cylindrical member 585 on which an electrophotographic photosensitive medium is provided, by means of an imaging lens 584. The light modulating device 100 has a one-dimensional array of the heat-generating resistance members in a direction perpendicular to the plane of the drawing sheet, and is designed such that the modulated light from the array is formed as a one-dimensionally arranged spot in parallelism to the generating line of the cylindrical member 585.

In FIG. 88, the light source unit may be a light source unit using a halogen lamp having a linear filament or a halogen lamp having a slit opening, and the illuminating optical system 582 may be a cylindrical lens or a multi-lens array.

The number of the heat-generating resistance members of the light modulating device 100 is 2,000 to 5,000 and they are projected onto the electrophotographic photosensitive medium 585 by the imaging lens 584 with a length of 200–300 mm. At this time, the imaging lens may project the heat-generating resistance members with an enlargement magnification or one-to-one magnification. Particularly, in the case of one-to-one magnification, there is an advantage that the entire apparatus can be made compact. Also, in this case, if use is made of a halogen lamp having a linear filament or a light source unit having a slit-like opening as previously described, the effect thereof will be great. That is, if coherent light such as a laser is used to illuminate the heat-generating resistance member portion having a length of 200–300 mm as previously described, the illuminating system will become complicated or bulky, but if the light source unit as described above is used, the illuminating system may be a popular one such as a cylindrical lens or a multi-lens array.

Distilled water or ethyl alcohol is mentioned as the thermal effect medium used in this embodiment, but alternatively, liquid crystal or the like may be used as such medium. The pulse width of the voltage applied to each heat-generating resistance member is 10–50 μsec, and the decay time of the modulated light is 100–500 μsec. Accordingly, the number of divisions of drive is possible up to the order of 50.

Also, by combining the driving method of FIGS. 86–88 with the apparatus described in connection with FIGS. 36–38, it is possible to realize a recording apparatus using divisional drive.

FIGS. 89 to 93 shows an embodiment of the heat-generating element or the like as the heat-generating means according to the present invention. FIG. 89(A) shows a transmitting type light modulating device, and FIG. 89(B) shows a reflecting type light modulating device.

Figure 89A:
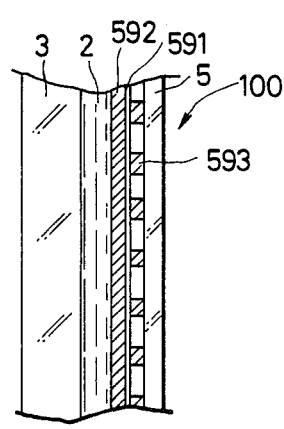

In FIG. 89, reference numeral 3 designates a transparent protective plate, and reference numeral 2 denotes a liquid layer. These are elements having the same functions as those described in connection with FIG. 1. Reference numeral 591 designates a heat-conductive insulating layer. A plurality of heat-generating resistance wires 592 and 593 as heat-generating means are two-dimensionally arranged in the form of a matrix on the opposite surfaces of the insulating layer 591 so as to intersect each other on the opposite sides of the insulating layer. Designated by 5 is a substrate as a support plate for the heat-generating resistance wires 592, 593 and the insulating layer 591. In the case of the transmitting type light modulating device 100 shown in FIG. 89(A), the heat-generating resistance wires 592, 593, the substrate 5 and the insulating layer 591 are transparent and, for example, the heat-generating resistance wires 592 and 593 are formed of transparent thin film of indium tin oxide. In these light modulating devices 100, design is made such that only when both of the predetermined heat-generating resistance wires 592 and 593 are selected and generate heat, a heated area (not shown) of the liquid layer in the modulatable higher temperature region is formed in the liquid layer 2 in the area of intersection between the two heat-generating resistance wires. Also, as previously described in connection with FIG. 18, a pressure absorbing film 119 and a reflecting film 118 may be used as required.

Figure 90:
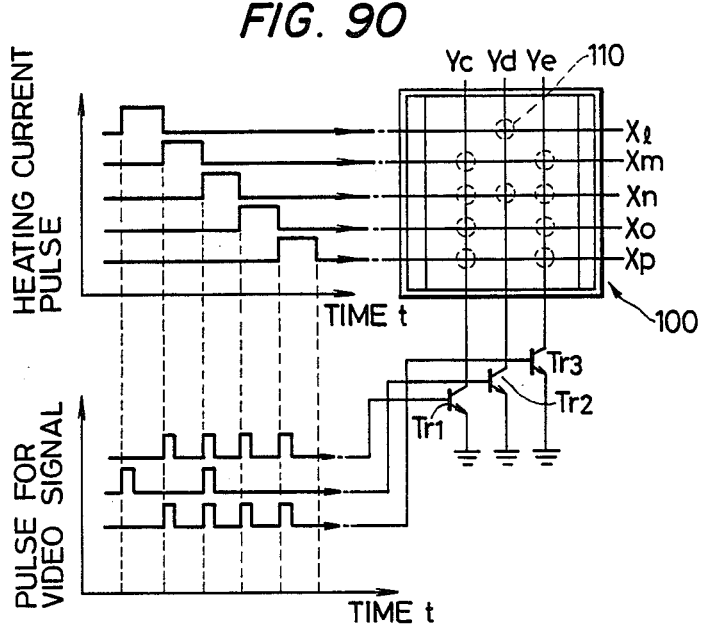

Reference is now had to FIG. 90 to describe in more detail an example in which such light modulating device is matrix-driven.

In FIG. 90, the light modulating device 100 may be regarded as having a construction similar to that described in connection with FIG. 89. The light modulating device 100 comprises heat-generating resistance wires of row axes Xl, Xm, Xn, Xo and Xp (which will hereinafter be referred to as the row wires) and heat-generating resistance wires of column axes Yc, Yd and Ye (which will hereinafter be referred to as the column wires). One end of the column wires Yc, Yd and Ye is connected to a common DC power source and the other ends thereof are connected to the collectors of transistors Tr1–Tr3 having their emitters grounded.

When a heating current pulse is applied to the row wires Xl, Xm, Xn, Xo and Xp in succession, liquid layers (not shown) corresponding to these row wires are linearly heated in succession and at this time, the degree of heating is set so as to be below the threshold value of the heating of the liquid and therefore, a heated area 110 of the liquid layer which is a higher temperature region for modulation is not created in the liquid layer. On the other hand, a video signal pulse is applied to the bases of the transistors Tr1–Tr3 in synchronism with the application of the heating current signal to turn on these transistors Tr1–Tr3, whereby a predetermined video signal is applied to the column wires Yc, Yd and Ye connected to the transistors Tr1–Tr3, respectively. By the application of this video signal, liquid layers corresponding to the column wires Yc, Yd and Ye are linearly heated. Thus in the area of intersection between the row wires and the column wires in which the heating current pulse and the video signal are synchronized with each other, the liquid layer is additively heated by the heat generation of the two and the degree of heating of the liquid layer exceeds the threshold value of heating. If conditions are set so that the heated area 110 of the liquid layer is formed in the corresponding liquid layer only when it is additively heated, the heated area 110 of the liquid layer will be formed in the area of intersection between a selected row wire and a selected column wire.

In the above-described example, modulation can just likewise be accomplished even when the driving system is changed as described in the following. That is, there will be obtained the same effect even if modification is made such that the video signal is applied to the row wires and the heating current signal is applied to the column wires. Thus, the light modulating device 100 illustrate in FIG. 89 enables even the matrix driving to be accomplished. Where the thickness of the liquid layer of the light modulating device 100 is very small, the heat-generating resistance wires arranged in the form of stripes may be installed on both of the transparent protective plate and the substrate, whereby the following effects will arise:

(1) The manufacturing process becomes simpler and the yield is improved; and (2) Since the liquid layer is heated from the opposite sides thereof, the thermal efficiency is good.

It is desirable that a radiator plate be separately provided to enhance the radiating effect of the heat-generating resistance wires. This radiator plate may be substituted for by the substrate 5 (FIG. 89). The aforedescribed row wires and column wires are spaced apart from each other by an insulating layer 591 having a thickness of several $\mu$m and therefore, where the two signals are applied at a time, the conduction heat does not arrive at the liquid layer 2 at the same time due to the time lag of heat conduction and in some cases, this hinders formation of the heated area of the liquid layer. Accordingly, in some cases, it is preferable that the pulse applied to the signal line nearer to the liquid layer 2 be delayed with respect to the signal pulse applied to the other signal line to enhance the additive heating effect. All of the two signal lines need not be formed by heat-generating resistance members. Rather, in some cases, it is preferable that to economize energy, only the area of intersection between the row wires and the column wires be formed by a heat-generating resistance member and the other portion be formed of a good conductor such as Al.

Figure 91:
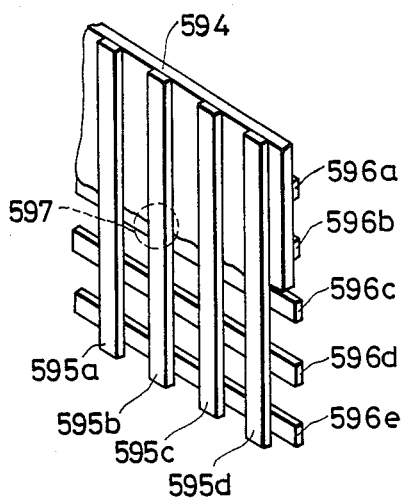

Reference is now had to FIG. 91 to describe another example of the heat-generating means for constituting a light modulating device suitable for the matrix driving as shown in FIG. 90.

FIG. 91 is a perspective view schematically depicting a part of the heat-generating means. In FIG. 91, reference numeral 594 designates a heat-generating resistance layer which may be obtained by forming a known heat-generating resistance material (such as nichrome alloy, hafnium boride, tantalum nitride, or the like) into a planar film. Although not shown, such resistance layer 594, of course, extends to the lower portion of FIG. 91. Reference characters 595a, 595b, 595c and 595d designate column conductors, and reference characters 596a, 596b and 596c denote row conductors. All these conductors may be obtained from a good conductor such as gold, silver, copper or aluminum (although not mentioned, the conductors are usually covered with an insulating film (not shown) such as $SiO_2$). In the illustrated heat-generating element, when, for example, the column conductor 595b and the row conductor 596c are selected and a voltage is applied to both of them, power is supplied to a part of the resistance layer 594 corresponding to the area 597 of intersection therebetween and this part generates heat.

In this manner, any area of intersection between the row conductors and the column conductors can be caused to generate heat.

Accordingly, in a light modulating device incorporating therein the illustrated heat-generating element as the heat-generating means comprising the heat-generating resistance wires 592, 593 and insulating layer 591 of FIG. 89, display of a dot matrix image is possible by a matrix driving system similar to that shown in FIG. 90.

Now, in the heat-generating means shown in FIG. 91, it is also possible to provide the heat-generating resistance layer 594 dividedly only at the areas of intersection between the row conductors 595 and the column conductors 596 (in the other areas, to insulate the conductors from each other), and in such construction (FIG. 92), occurrence of cross talk inconvenient to the modulation faithful to the signal can be substantially prevented.

Figure 92:
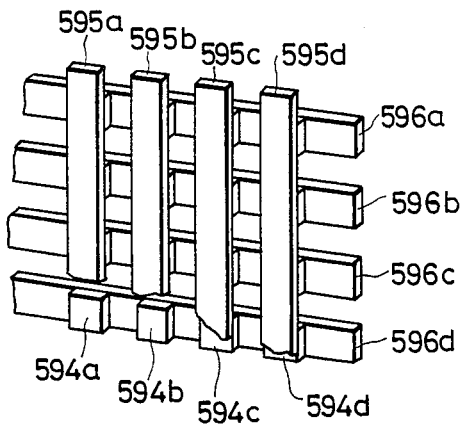

In the example shown in FIG. 92, row conductors 596a, 596b, ... (hereinafter referred to as the row conductors 596) and column conductors 595a, 595b, ... (hereinafter referred to as the column conductors 595) are disposed with an insulating layer (not shown) of $SiO_2$, $Si_3N_4$ or like material interposed therebetween, but the insulating layer in the areas of intersection between the row conductors 596 and the column conductors 595 is removed and instead thereof, heat-generating resistance members 594a, 594b, ... (hereinafter referred to as the heat-generating resistance members 594) are embedded in those areas.

Figure 93:
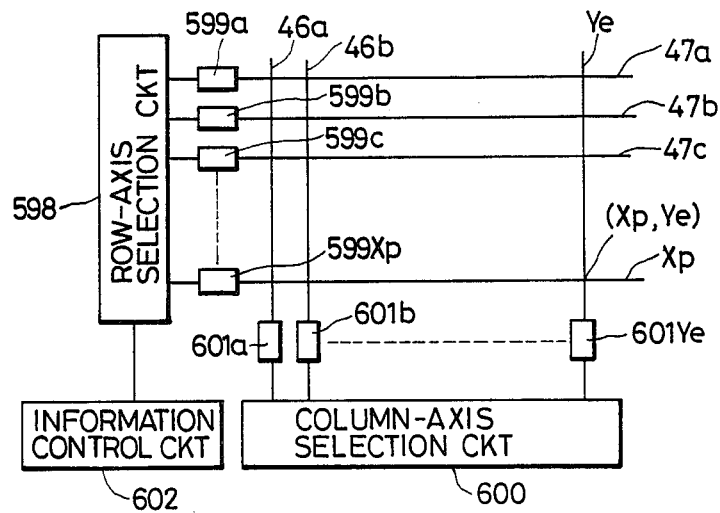

Reference is now had to FIG. 93 to describe in more detail an example in which a light modulating device incorporating therein the heat-generating means shown in FIG. 92 instead of the heat-generating means comprising the heat-generating resistance members 592, 593 and insulating layer 591 shown in FIG. 89 is matrix-driven. A row axis selecting circuit 598 is electrically coupled to row axis driving circuits 599a, 599b, ... (hereinafter referred to as the row axis driving circuits 599) by signal lines, and the output terminals of the respective row axis driving circuits 599 are coupled to the respective row conductors 596. The manner in which the output terminals are coupled to the row conductors 596 may be various, but herein it is to be understood that the number of output terminals is the same as the number of row conductors 596 and that an output terminal is coupled to a row conductor.

The relation among a column axis selecting circuit 600, column axis driving circuits 601a, 601b, ... (hereinafter referred to as the column axis driving circuits 601) and column conductors 595 is similar to that described above. An information control circuit 602 is electrically coupled to the row axis selecting circuit 598 and the column axis selecting circuit 600 by signal lines. The information control circuit 602 puts out an information control signal to thereby instruct which row axis the row axis selecting circuit 598 should select, and this also holds true for the column axis selecting circuit 600.

That is, by the information control signals from the information control circuit 602, the row axis selecting circuit 598 selects (switches on) a particular row axis (a particular row conductor) through one of the row axis driving circuits 599. For example, if the row axis selecting circuit 598 selects the row conductor Xp, it produces Xp row selection signal and in response thereto, the row axis driving circuit 599 Xp inputs a row axis driving signal also to the row conductor Xp. On the other hand, when a video signal which is one of the information control signals from the information control circuit 602 is input to the column axis selecting circuit 600, the column axis selecting circuit 600 selects a predetermined column axis (a predetermined column conductor) in response thereto. For example, if the column axis selecting circuit 600 selects the column conductor Ye, the column axis driving circuit 601 Ye receives the Ye column selection signal produced from the column axis selecting circuit 600 and renders the column conductor Ye conductive.

If selection of a row axis and selection of a column axis are effected in synchronism with each other, in the case of the present example, a current flows to the heat-generating resistance member present at the point of intersection (the selected point: Xp, Ye) between the row conductor Xp and the column conductor Ye and thus, Joule's heat is generated and a heated area of the liquid layer is formed in the liquid layer, not shown. A leak current also flows to the non-selected point, but this current is of a value below the value of the heated area forming current and therefore, no heated area is formed in the liquid layer. Also, by endowing the heat-generating resistance members 594 with a diode function, the leak current can be further weakened Again in FIG. 93, as described in connection with FIG. 90, the wires are successively scanned by a row axis driving signal and in synchronism therewith, a column axis selection signal is put out to render a selected column conductor 595 conductive through the column axis driving circuit 601, whereby two-dimensional modulation can be accomplished. The column axis selecting circuit 600 puts out a column axis selection signal in response to the command by the video signal. The direction of the current flowing through the heat-generating resistance members at this time is not important. Such row and column axis selecting circuits 598 and 600 and row and column axis driving circuits 599 and 601 may be constructed by the well-known techniques and by the use of shift transistors, transistor arrays or the like.

Figure 89B:
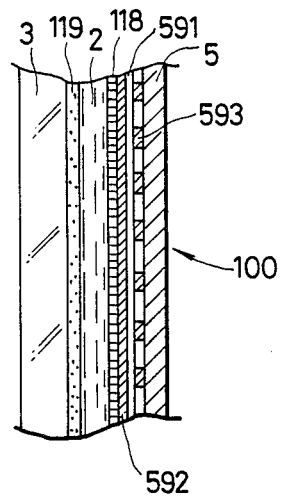

Again in the above-described light modulation system by the matrix driving utilizing the heat-generating element, the pressure absorbing film 9 may be used for the transmitting type light modulating device 100 shown in FIG. 89(A), as already described in connection with FIG. 18(B), or also in the light modulating device 100 of the construction shown in FIG. 89(B), anti-corrosive silicon oxide film or silicon nitride film may be interposed between the liquid layer 2 and the reflecting film 118 or between the liquid layer 2 and the heat-generating means (for example, the heat-generating resistance wire 592 thereof) as required, thereby suitably preventing the reaction-corrosion between the liquid layer 2 and them.

Also, of course, the red filter portion R, the green filter portion G and the blue filter portion B of the colored mosaic filter shown in FIG. 77 may be suitably arranged on the heated area of the heat-generating means (for example, in the case of the light modulating device 100 shown in FIG. 89, the area of intersection between the heat-generating resistance members 592 and 593, and in the case of the heat-generating means shown in FIG. 92, the heat-generating resistance member 594), thereby adopting a construction similar to that shown in FIG. 77, whereby color display can be accomplished on the same principle as that shown in FIG. 77 by the modulating device using the heat-generating means shown in FIG. 89 or 92.

However, in a light valve type projection apparatus as a display apparatus using a light modulating device utilizing such a heat-generating element, the portions concerned with the radiation input means as shown in FIGS. 26 and 27, namely, the unshown laser light source, the light modulator, the rotational polygonal mirror, the galvano mirror, the lens, etc., are of course unnecessary. Of course, such a matrix driving type display element is also applicable to the light valve type projection apparatus shown in FIGS. 22–25.

Figure 94:
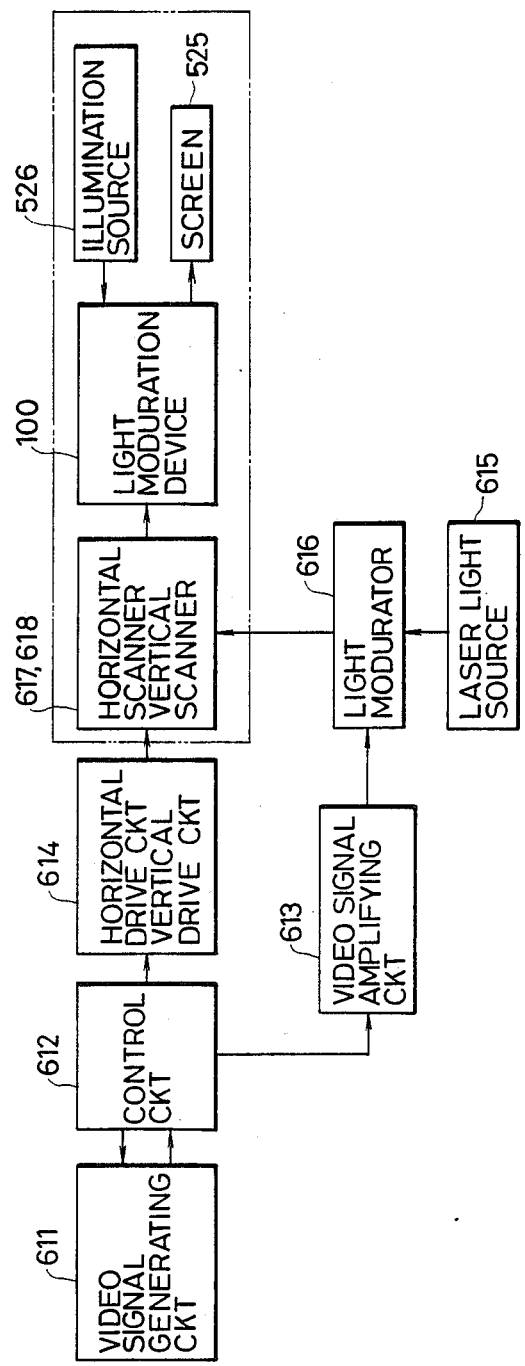

FIG. 94 illustrates the signal production, the driving system and the driving method in a case where a light-to-heat converting medium is used as the heat-generating means and is caused to generate heat relative to the incident light flux, with a display apparatus taken as an example.

In FIG. 94, reference numeral 611 designates an image producing circuit which produces an image signal, reference numeral 612 denotes a control circuit for controlling the image signal and imparting this signal to an image amplifying circuit 613 and a horizontal and vertical driving circuit 614, reference numeral 615 designates a laser light source, and reference numeral 616 denotes a light modulator for modulating the laser beam from the laser light source in accordance with the signal from the image amplifying circuit 613. The light modulated by the light modulator 616 enters a horizontal scanner 617 or a vertical scanner 618. The horizontal scanner 617 and the vertical scanner 618 operate in response to the driving signals from the horizontal and vertical driving circuit 614 which are synchronized with the image signal. The construction of the part encircled by a broken line is the same as the previously described construction and need not be described.

Figure 95:
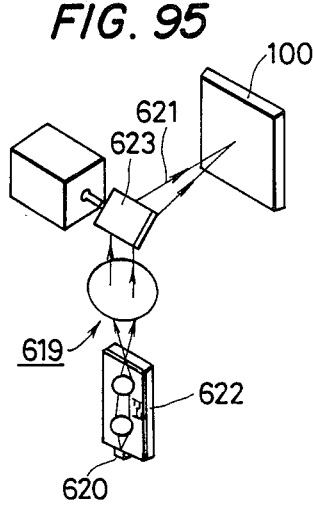

The image signal put out from the image producing circuit 611 is amplified by the image amplifying circuit 613 through the control circuit 612. The light modulator 616 is driven by the amplified image signal input thereto and modulates the laser beam emitted from the laser light source 615. On the other hand, a horizontal synchronizing signal and a vertical synchronizing signal are put out from the control circuit 612 and drive the horizontal scanner 618 and the vertical scanner 617, respectively, through the horizontal and vertical driving circuit 614. In this manner, a thermal two-dimensional image is formed in the liquid layer of the light modulating device 100. The operation of the part encircled by the broken line after this is as previously described and the description thereof is omitted for simplicity. Where TV electric wave is to be received, a receiver may be used instead of the image producing circuit 611. As another means for applying a thermal signal to such light modulating device 100, an optical system 619 shown, for example, in FIG. 95 is utilized. In FIG. 95, a laser beam 621 put out from a laser oscillator 620 passes through a thin film waveguide type deflector 622, whereafter it is rapidly scanned over the surface of the light modulating device 100 while being reflected by a galvano mirror 623. If an image signal circuit (not shown) is connected to the laser oscillator 620, specific image making will become possible.

In the light modulating device of the present invention, the modulatable quantity of light varies with time. By utilizing such variation in the modulatable quantity of light, it is possible to control the quantity of light of the modulated light flux.

Such control of the quantity of light of the modulated light flux enables half-tone images to be formed in recording and display.

FIGS. 96 to 101 illustrate an embodiment concerning the half-tone images.

Figure 96A:
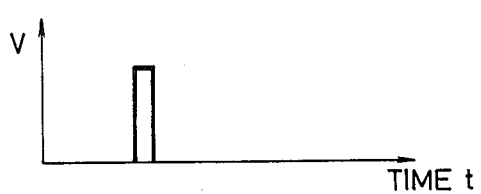
FIGS. 96(A) and (B), 97, 98, 99(A)-(D), 100 and 101 illustrate an embodiment in which the light modulating device of the present invention is used to create a halftone.
Figure 96B:
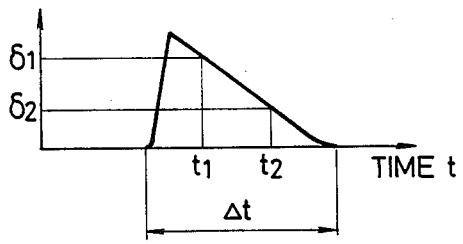

The light modulating device shown in FIG. 2 is first used to describe a light modulating method according to the present embodiment, namely, a method of controlling the quantity of light of the modulated light flux. FIG. 96(A) shows a pulse signal applied to the heat-generating resistance members, and FIG. 96(B) shows a variation in the quantity of light of a light flux whose wavefront has been converted by a distribution of refractive index created correspondingly thereto, namely, the quantity of light of the modulated light flux. As can be seen from FIG. 96 (B), when a pulse voltage is applied to the heat-generating resistance members, the curve representing the quantity of light of the modulated light flux due to the distribution of refractive index sharply rises under the influence of the thermal response characteristic of the thermal effect medium layer, but after disappearance of the applied pulse, the curve representing the quantity of light of the modulated light flux attenuates while depicting a gentle curve under the influence of the thermal capacities of the heat-generating resistance members and the thermal effect medium layer. The embodiment of the present invention shown here utilizes the decay curve portion of the quantity of light of the modulated light flux to continuously control the quantity of light of the modulated light flux and create, for example, an image having a half tone. That is, provision is made of means for producing a pulse light emitted for a sufficiently short time as compared with a time $\Delta t$ during which the light modulation indicated by the curve representing the distribution of quantity of light of the modulated light flux shown in FIG. 96(B) is possible. For example, when pulse lights of the same quantity of light are produced at t1 and t2 within said time $\Delta t$, if the quantity of light of the modulated light flux obtained at $t_1$ is 1, the quantity of light of the modulated light flux at $t_2$ is $\delta_2/\delta_1$. In this manner, by selecting the time during which a pulse light is produced, it is possible to obtain a desired quantity of modulated light.

FIG. 97 shows an embodiment of the light modulation apparatus according to the present invention. Reference numeral 630 designates a semiconductor laser, and reference numeral 631 denotes an anamorphic lens system for forming the light flux from the semiconductor laser as a linear image on the light modulating device 100. The anamorphic lens system 631 comprises a collimater lens 631a for collimating the light flux from the semiconductor laser and a cylindrical lens 631b having its generating line in a direction perpendicular to the plane of the drawing sheet. The light modulating device 100 is the same as that shown in FIGS. 19(A) and (B) and therefore, it is simply shown here. Reference numerals 632 and 633 designate optical systems for selectively directing to a light-receiving medium 634 the light flux subjected to modulation by the light modulating device and the light flux not subjected to modulation. The light flux not subjected to modulation is regularly reflected and therefore this light flux is intercepted by a light-intercepting filter 632. On the other hand, the light flux subjected to modulation spreads by its wavefront being converted and most of it goes beyond the light-intercepting filter 632 and is condensed on the light-receiving medium 634 by the lens 633.

A video signal supplied from a circuit, not shown, is input to a pulse generating circuit 635 and a pulse phase modulating circuit 636. When the video signal is input to the pulse generating circuit 635, a predetermined number of pulses at equal intervals are generated in this circuit. This predetermined number is a number corresponding to the number of resolving points, for example, in one line scan. The signal from the pulse generating circuit 635 is input to a semiconductor laser driving circuit 638 through a delay circuit 637 and causes the semiconductor laser 630 to oscillate pulses at predetermined intervals. At this time, the delay circuit 637 causes the pulse oscillated by the pulse generating circuit 635 to be delayed by a time equal to a pulse interval. The pulse signal from the pulse generating circuit 635 is further input to the pulse phase modulating circuit 636 and applied as a pulse voltage to the heat-generating resistance members 6a, 6b, 6c, 6d, 6e through a driver circuit 639. At this time, in the pulse phase modulating circuit 636, the information of the light and shade of the video signal input at the same time is converted into pulse phase information and, on the basis of this information, the pulse signal from the pulse generating circuit 635 is phase-modulated.

The light flux emitted from the semiconductor laser 630 forms a linear image on the heat-generating resistance members of the light modulating device 100 with the aid of the anamorphic lens system 631, and the light flux whose wavefront has been converted by the distribution of refractive index created on the heat-generating resistance members is imaged on the light-receiving medium 634 by the lens 633, as indicated by broken line. The light flux whose wavefront is not converted and which has been regularly reflected is intercepted by the light-intercepting filter 632.

The quantity of light I which illuminates the heat-generating resistance members varies in the fashion of pulse at a predetermined period and intensity as shown in FIG. 98(A) while, on the other hand, the pulse voltage V applied to the heat-generating resistance members is subjected to phase modulation Δ in proportion to the density of the image as shown in FIG. 98(B). Accordingly, the time during which the distribution of refractive index is created also varies correspondingly and, as indicated by broken lines in FIG. 98(C), the rising point of time of the curve representing the quantity of light of the modulated light is varied. The illuminating light is pulse illumination of a predetermined period as shown in FIG. 98(A) and as a result, the quantity of light I' of the modulated light flux is the portion indicated by oblique line in FIG. 98(C), and it will be seen that the quantity of light of the modulated light flux continuously varies in proportion to the phase modulation Δ. Desirably, the straight portion of the falling curve of the quantity of light of the modulated light flux may be used to vary the quantity of light of the modulated light flux, but it is also possible to suitably choose and use the non-straight portion in accordance with the characteristic curve of the photosensitive medium If the latter use is made, gamma correction of the photosensitive medium can be easily accomplished.

The embodiment of FIG. 98 has been shown with respect to a case where the interval of the illuminating light flux is made constant and the interval of the applied signal voltage is varied, but the same effect may also be obtained if the interval of the applied signal voltage is made constant and the interval of the illuminating light flux is varied.

Also, in some cases, depending on the characteristic of the modulating device, the time distribution of the modulated quantity of light gently rises and sharply falls conversely to the case shown in FIG. 98(C). In such cases, it is desirable to use the gently rising portion of the curve of the modulated quantity of light to control the modulated quantity of light.

As described above, in the light modulating method shown in FIGS. 96–98, images having a half-tone can be easily obtained by simple means.

By utilizing the characteristic that the falling characteristic of the modulated light output of the light modulating device of the present invention is gentle, an output characteristic equivalent to the modulated light output for an applied DC voltage can be obtained even when a periodical pulse voltage is applied. An embodiment thereof will now be described.

FIG. 99(A) shows a periodical pulse voltage signal having a pulse width of about 50 μsec and a period of about 100 μsec (10 kHz) which is input to the aforedescribed modulating device. FIG. 99(B) shows the time response of the light output on the surface of the light-receiving medium in FIG. 19(A). The average output intensity thereof is indicated by Ia. FIG. 99(C) shows a periodical pulse voltage signal having the same pulse width as that shown in FIG. 99(A) but having a pulse number reduced to one half, and FIG. 99(D) shows the time response of the light output thereof. The average intensity of the then light output is indicated by Ib.

As described above, by changing the pulse number of the voltage signal, the average intensity of the light output can be varied and this is applicable to the display or recording having a half-tone. Where the quantity of light as described above is to be controlled by an applied DC voltage, it is necessary to change the voltage value thereof, but in the case of the present embodiment, it is also possible to control the quantity of light by changing the pulse number, namely, by the digital method, without changing the voltage value.

A further embodiment will now be described as a method of controlling the quantity of light of the modulated light.

Figure 100:
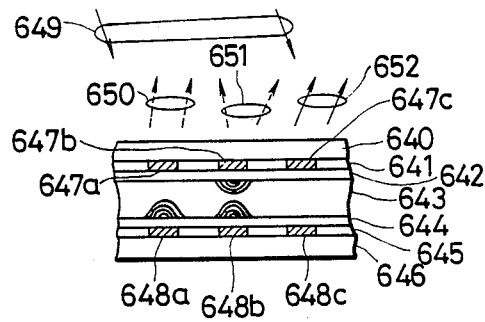

FIG. 100 shows an embodiment of the light modulating device used in the light modulating method according to the present invention. In FIG. 100, reference numeral 640 designates a transparent substrate, and reference numeral 641 denotes a layer in which heat-generating resistance members 647a, 647b and 647c are provided and which is formed a transparent insulative substance. Reference numerals 642 and 644 designate insulating layers formed of a transparent substance, reference numeral 643 denotes a thin layer of thermal effect medium, reference numeral 645 designates an insulating layer in which heat-generating resistance members 648a, 648b and 648c are provided, and reference numeral 646 denotes a substrate. The heat-generating resistance members 647a, 647b, 647c and the heat-generating resistance members 648a, 648b, 648c are disposed in opposed relationship with each other with the thermal effect medium interposed therebetween, and the heat-generating resistance members 647a and 648a, 647b and 648b, 647c and 648c respectively form a pair and correspond to the minimum segment on the light-receiving medium, namely, a picture element. When, as shown in FIG. 100, a signal current is supplied to the heat-generating resistance members 647b, 648a and 648b to cause them to generate heat, distributions of refractive index are created near the respective resistance members. When a parallel light flux 649 enters such a light modulating device, the incident light flux is subjected to wavefront conversion action by the distribution of refractive index as described above, and the light flux having entered the light modulating portions 647a and 648a becomes a wavefront-converted light flux 650 and the light flux having entered the light modulating portions 647b and 648b becomes a wavefront converted light flux 651 and emerges. On the other hand, the light flux not subjected to wavefront conversion action by the light modulating portions 647c and 648c emerges while remaining to be a parallel light flux 652. As regards these light fluxes 650, 651 and 652 from the light modulating device, if the arrangement of the optical system shown in FIG. 19(A) or 19(B) is employed, the light whose wavefront has been converted and the light whose wavefront has not been converted can be selectively caused to arrive at the light-receiving medium. At this time, the quantity of light of the wavefront-converted light created in the thin layer 643 of thermal effect medium is controlled by the degree of the distribution of refractive index, and in FIG. 100, the wavefront-converted light flux having the greatest quantity of light is the light flux 651 and next, the light flux 650, and the light flux 652 does not contain the wavefront-converted light. Thus, in such a light modulating device as shown in FIG. 100 wherein two light modulating portions form a pair and correspond to a segment, it becomes possible to control the quantity of light of the wavefront-converted light by selecting the number of light modulating portions which are in operation and thereby obtain a half-tone image. Means for independently controlling the operations of the light modulating portions could be easily accomplished by any person skilled in the art and therefore need not be described herein.

Figure 101:
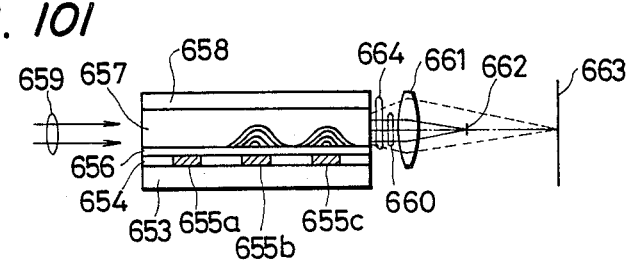

FIG. 101 shows another embodiment. Reference numeral 653 designates a substrate, reference numeral 654 denotes an insulating layer having heat-generating resistance members 655a, 655b and 655c, reference numeral 656 designates a thin layer of insulative substance having good heat conductivity, reference numeral 657 denotes a thin layer of thermal effect medium, and reference numeral 658 designates a protective plate. Three light modulating portions, i.e., heat-generating resistance members 655a 655b and 655c, effect modulation of the quantity of light corresponding to a segment, for example, a picture element. Accordingly, by a plurality of such light modulating devices as shown, for example, in FIG. 101 being disposed in a direction perpendicular to the plane of the drawing sheet, modulations of the quantities of light of a plurality of segments are effected at a time. When there is no distribution of refractive index, the incident light flux 659 is not subjected to wavefront conversion action but intactly emerges from the light modulating device. The emergent light flux 660 not subjected to modulation is condensed by an imaging lens 661 and intercepted by a light-intercepting plate 662. On the other hand, when, as shown in FIG. 101, a signal current flows to the heat-generating resistance members 655b and 655c and a distribution of refractive index is formed, the incident light flux 659 is subjected to wavefront conversion action. The light flux 664 indicated by broken lines whose wavefront has been converted by the light modulating device is converged by the imaging lens 661 and partly intercepted by the light-intercepting filter 662, but most of the wavefront-converted light flux is images on the light-receiving medium 663. Of the light flux emerging from the light modulating device, the proportion of the wavefront-converted light flux is affected by the degree of the distribution of refractive index and can be variously varied by changing the number and combination of the heat-generating resistance members 655a, 655b, 655c to which the signal current is supplied, whereby a multi-tone image can be obtained.

As described above, in the light modulating method shown in FIG. 100 or 101, a plurality of light modulating portions capable of independently modulating light are provided for the minimum segment in order to control the quantity of light of this segment, and the number or combination of the light modulating portions is changed to thereby enable the quantity of light arriving at a segment to be controlled and thus, multi-tone image density can be easily obtained.

Figure 102:
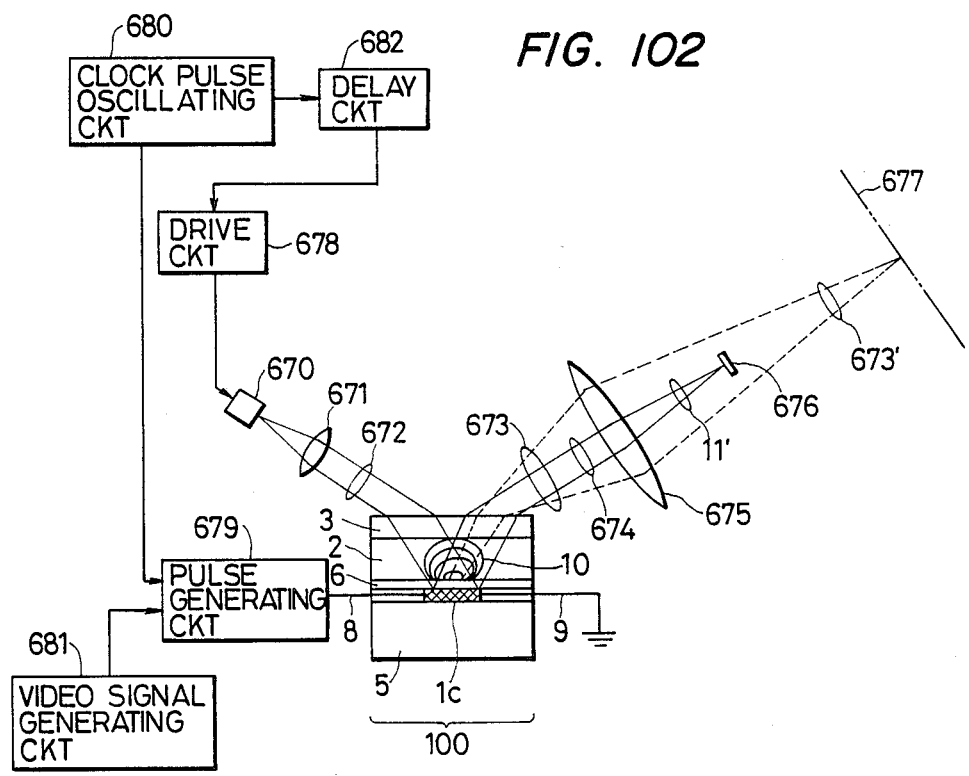

Reference is now had to FIGS. 102 to 112 to describe some embodiments of the illuminating system and method for causing a light flux to enter the light modulating device of the present invention. First, FIGS. 102 and 103 illustrate an embodiment which effective utilizes the quantity of light from a light source unit as the modulated light and reduces the creation of noise light. In FIG. 102, the light modulating device 100 is identical to that shown in FIGS. 2 and 3. Reference numeral 670 designates a semiconductor laser, and reference numeral 671 denotes a collimater lens for collimating the semiconductor laser. The light flux oscillated by the semiconductor laser is made into a parallel light flux by the collimater lens 671 and enters the light modulating device 100. The light flux 672 entering the light modulating device 100 creates a distribution of refractive index 10 when one of heat-generating resistance members, 1c, is driven by a voltage Vi, and the light flux having entered the light modulating device emerges therefrom as a wavefront-converted light flux 673. The light flux 674 which is regularly reflected by the surface of the heat-generating resistance members and whose wavefront is not converted by the distribution of refractive index 10 is imaged by a lens 675 and intercepted by a light-intercepting filter 676 disposed at the imaging position of the lens 675. The wavefront-converted light flux 673 is partly intercepted by the light-intercepting filter 676, but by making the size of the light-intercepting filter 676 into a minimum size for intercepting the imaged spot of the light flux 674 whose wavefront is not converted, it is possible to apply most of the wavefront-converted light flux 673' to a light-receiving medium 677. By applying a voltage pulse Vi corresponding to an image signal to the heat-generating resistance member 1c through a conductor 8 or rendering such voltage pulse into zero, creation or disappearance of the distribution of refractive index 10 is repeated. In that case, turn on and off of a light spot occurs on the light-receiving medium 677. By rendering the points on the heat-generating resistance members and the point on the light-receiving medium 677 conjugate by the lens 675, the image of the portion in which the distribution of refractive index has been created near the heat-generating resistance members can be formed as a spot on the light-receiving medium 677.

The light source 670 is driven by a light source driving circuit 678. On the other hand, the heat-generating resistance members are driven by the input pulse from an applied voltage pulse generating circuit 679. This applied voltage pulse generating circuit generates a pulse signal by receiving as inputs the signal from a clock pulse oscillating circuit 680 which oscillates pulses of a predetermined period and the signal from a video signal producing circuit 681. On the other hand, the driving circuit 678 is driven by a signal pulse resulting from the pulse generated from the clock pulse oscillating circuit 680 being delayed by a predetermined time $\tau d_0$ by a delay circuit 682. The time chart of this driving circuit is shown in FIG. 103.

FIG. 103(A) shows voltage pulses $V_1$, $V_2$, ... having a basic frequency f which are generated for driving the heat-generating resistance members and the semiconductor laser 670 by the clock pulse oscillating circuit 680. These clock pulses immediately heat the heat-generating resistance members when the signal from the video signal producing circuit 681 is input to the applied voltage pulse generating circuit 679, thereby forming the distribution of refractive index 10 which presents the quantity-of-light variation characteristic curves as shown in FIG. 103(B) which are capable of converting the wavefront with respect to time, or in other words, modulatable quantity-of-light variation characteristic curves $I_{s1}$, $I_{s2}$ and $I_{s3}$. The distribution of refractive index 10 is delayed by $Zd_s$ with respect to the pulse input signal, and the curves $I_{s1}$, $I_{s2}$ and $I_{s3}$ are correspondingly delayed by $\tau d_s$. In FIG. 103(B), $I_{N1}$ and $I_{N2}$ indicate the modulated quantities of light created by noise. On the other hand, the clock pulse from the clock pulse oscillating circuit 680 used for driving the semiconductor laser 670 is delayed by $\tau d_0$ by the delay circuit 682, as shown in FIG. 103(C), and is input to the light source driving circuit 678. FIG. 103(D) shows the intensities of light $I_{01}$, $I_{02}$, ... when the light source driving circuit 678 is driven by the applied voltage pulse shown in FIG. 103(C) to thereby cause the semiconductor laser 670 to emit pulse light. In this case, design is made such that the pulse light is produced with a delay of $\tau d_0$ with respect to the time when the applied voltage pulse is generated. As described above, the creation of the distribution of refractive index is delayed by $\tau d_s$ with respect to the time when the applied voltage pulse is generated and correspondingly, as shown in FIG. 103(B), the production of the wavefront-converted modulated lights $I_{s1}$, $I_{s2}$, ... is also delayed by $\tau d_s$, and said design is for the purpose of causing the modulated lights to be produced at a time near it. The period of production thereof is the same as the period of generation of the applied voltage pulse, i.e., f.

When, as shown in FIG. 103(E), the pulse light flux of the semiconductor laser is produced in synchronism with the applied voltage pulse and applied to the modulating device 100, there is obtained the intensity of the wavefront-converted light flux as shown in FIG. 103(E). That is, the intensity of light $I_1$ is given by $$I_1 \alpha I_{s1} \times I_{01}.$$

Also, as previously described, by suitably selecting the pulse width $\tau 0$ of the modulated light entering the light modulating device, it becomes possible to irradiate the light modulating device while avoiding the time zone when the distribution of refractive index which may cause the noise lights $I_{N1}$ and $I_{N2}$ is created, and as shown in FIG. 103(E), the noise lights produced in FIG. 103(B) can be eliminated.

The value of the time $\tau d_0$ by which the pulse light illuminating the light modlating device is delayed and the value of the time width of the pulse light may be suitably determined in accordance with the quantity of mudulated light variation characteristic of the modulating portion of the light modulating device.

The above-described embodiment is very effective in a case where a plurality of heat-generating means are illuminated by a common light source.

In the above-described embodiments, the light modulating devices in which the distribution of refractive index by heat is created have been described by way of example, whereas the present invention is not restricted to the above-described various light modulating devices, but is also applicable to a light modulating device in which light modulation is possible for a predetermined time by a signal and the modulatable quantity of light varies with time within the predetermined time.

As described above, the light modulating method and apparatus according to the present embodiment have excellent effects that the light flux from the light source unit can be effective utilized, that by illuminating the light modulating device in the fashion of pulse, a light flux of high output is obtained for a light source such as a laser diode and that the noise modulated light resulting from the construction of the light modulating device itself can be intercepted.

FIG. 104 shows another embodiment of the system for illuminating the light modulating device according to the present invention. In FIG. 104, reference numeral 691 designates a semiconductor laser, reference numeral 692 denotes a collimater lens for collimating the light flux from the semiconductor laser, and reference numeral 693 designates a diffraction grating having a plurality of rectangular openings disposed in direction Y, each of the openings having its longer sides in direction X and its shorter sides in direction Y. Reference numeral 694 denotes an anamorphic imaging lens system comprising a spherical lens 694a and a cylindrical lens 694b. The spherical lens 694a is disposed so that the surface of the diffraction grating 693 exists on one focal plane of the spherical lens 694a, and accordingly, the diffracted light from the diffraction grating is made into a parallel light flux by the spherical lens 694a. The cylindrical lens 694b is a positive cylindrical lens having its generating line in direction Y which is the direction of arrangement of the rectangular openings of the diffraction grating. Reference numeral 100 designates a light modulating device provided with a plurality of heat-generating resistance members arranged at predetermined intervals as described above. The direction of arrangement of the heat-generating resistance members is coincident with the direction Y of the generating line of the cylindrical lens 694b, and the position of the focal line of the cylindrical lens 694b is substantially coincident with the heat-generating resistance members. Accordingly, the linear spectrum of the diffracted light from the diffraction grating 693 is formed in the heat-generating resistance members the anamorphic lens system 694. The pitch of the diffraction grating and the construction factors of the anamorphic lens system 694 are determined so that each spectral image is formed in coincidence with the position of the heat-generating resistance members. Up to which order diffracted light the diffracted lights created by the diffraction grating are utilized and how each diffracted light is projected onto the heat-generating resistance members may be suitably set in accordance with conditions. For example, it is possible to set so that the openings of the diffraction grating and the heat-generating resistance members correspond to 1 to 1, and to set the factors of said optical system so that the 0-order diffracted light passed through each opening has its spectral image formed on the corresponding heat-generating resistance member and that ±1st order diffracted lights of relatively high intensity created in each opening have their spectral images formed on the other heat-generating resistance members than the heat-generating resistance member on which the spectral image of the 0-order diffracted light is formed so that the ±1st order diffracted lights do not become noise light. Also, for example, the number of the openings of the diffraction grating may be smaller than the number of the heat-generating resistance members and it is possible to make such design that the heat-generating resistance members at three different positions are illuminated by three 0-order and ±1st order diffracted lights created in one opening. In this manner, the optical system is set so that, of the plurality of diffracted lights of respective orders created in the openings of the diffraction grating, up to the diffracted light not allowable as noise light has its spectral image formed on each heat-generating resistance member. Reference numeral 695 designates an anamorphic lens system similar to the anamorphic lens system 694 and comprising a cylindrical lens 695a having its generating line in direction Y and a spherical lens 695b having one focal plane thereof disposed so as to be substantially coincident with the heat-generating resistance members. The focal line position of the cylindrical lens 695a is substantially coincident with the heat-generating resistance members and accordingly, the light flux regularly reflected by the heat-generating resistance members is made into a parallel light flux by the cylindrical lens 695a. Designated by 696 is a light-intercepting filter provided on the focal plane of the spherical lens 695b. The light-intercepting filter 696 has its light-intercepting portion patterned so as to intercept the light flux not subjected to mudulation by the heat-generating resistance members, namely, the regularly reflected light flux. On the other hand, as regards the light flux subjected to modulation by the heat-generating resistance members, the X-direction component thereof is made into a parallel light flux by the cylindrical lens 695a and then is imaged on the light-intercepting filter by the spherical lens 695b, while the Y-direction component thereof is not subjected to refracting action by the cylindrical lens 695a but is made into a parallel light flux by the spherical lens 695b. Accordingly, the modulated light flux is formed as a linear image on the light-intercepting filter 696 and therefore, most thereof passes through the light-intercepting filter 696. Reference numeral 697 designates an anamorphic lens system comprising a cylindrical lens 697a having its generating line in direction Y and a spherical lens 697b. The cylindrical lens 697a has its focal plane on the light-intercepting filter 696 and accordingly, the light flux passing through the light-intercepting filter 696 is made into a parallel light flux by the cylindrical lens 697a and imaged on a light-receiving medium 698 by the spherical lens 697b.

In the light modulation apparatus shown in FIG. 104, the light flux from the semiconductor laser 691 is collimated by the collimater lens 692 and enters the diffraction grating 693. The light flux diffracted by the diffraction grating 693 forms a linear spectrum of the diffraction grating on the heat-generating resistance members of the light modulating device 100 with the aid of the anamorphic lens system 694. The distributions of quantity of light 699a, 699b, 699c, 699d and 699e on the heat-generating resistance members 610a, 610b, 610c, 610d, and 610e are shown in FIG. 105(A), and the shapes 700a, 700b, 700c, 700d and 700e of the spectral linear images formed on the heat-generating resistance members are shown in FIG. 105(B). It can be seen from FIGS. 105(A) and 105(B) that the linear spectral images well illuminate the heat-generating resistance members in accordance with the shape and arrangement thereof. The light flux not modulated by the heat-generating resistance members is intercepted by the light-intercepting filter 696, while the light flux modulated by the heat-generating resistance members passes through the light-intercepting filter 696 and is imaged on the light-receiving medium.

In the above-described embodiment, each of the anamorphic lens systems 694, 695 and 697 comprises a combination of a cylindrical lens and a spherical lens, but alternatively may comprise a signal lens having a toric surface.

Further, in the above-described embodiment, the heat-generating resistance members are of a shape long in one direction and therefore the spectral image is formed linearly, but the shape of the spectral image may also be easily varied variously by the shape of the heat-generating resistance members.

Furthermore, in the above-described embodiment, the light modulating device has been shown as being of the reflecting type, but of course, the light modulating device may also be of the transmitting type.

As described above, in the light modulation apparatus shown in the present embodiment, by illuminating only the light modulating portion of the light modulating device, creation of harmful light can be prevented and a signal light of excellent contrast can be obtained even if the other portion than the light modulating portion is coarse-surfaced or impurities are present.

Figure 106A:
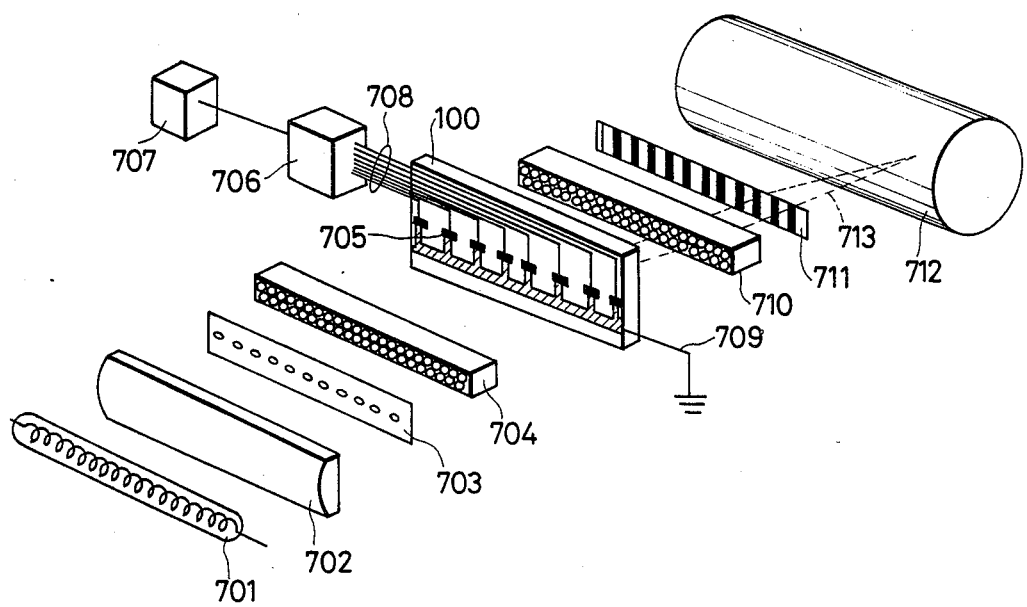

FIG. 106(A) shows an embodiment in which the light modulating device of the present invention is illuminated by an illuminating system using pin-holes. Reference numeral 701 designates a light source such as a halogen lamp, reference numeral 702 denotes a condensing lens such as a cylindrical lens for linearly condensing the light flux emitted from the light source, reference numeral 703 designates a pin-hole plate having a plurality of pin-holes arranged at equal intervals on a straight live, reference numeral 704 denotes a composite lens system for collimating the light fluxes emerging from the pin-holes, reference numeral 100 designates light modulating means for modulating light on the basis of the aforedescribed principle, the light modulating means having the construction as shown in FIG. 4. and having a plurality of heat-generating resistance members 705, reference numeral 706 denotes voltage application means for converting the electrical signal from a video signal source 707 into a voltage, reference numeral 708 designates a conductor for transmitting the voltage to the heat-generating resistance members 705, and reference numeral 709 denotes a conductor having one end thereof connected to the heat-generating resistance members 705 and the other end thereof grounded. In accordance with the principle described in connection with FIG. 19(A), a distribution of refractive index is formed only in the liquid of the heat-generating resistance member to which a voltage has been applied, and of the aforementioned condensed light flux, the light flux in the portion wherein the distribution of refractive index has been formed is subjected to wavefront conversion action. Designated by 710 is a lens system having an imaging effect on both of the aforementioned collimated light flux and aforementioned light flux subjected to the wavefront conversion action. This lens system may be a lens system having an optical axis, but here it is a multilens array comprising a plurality of lenses. Reference numeral 711 designates a light-intercepting filter having light-intercepting portions provided at a pitch proportional or identical to the pitch of the pin-holes provided in the aforementioned pin-hole plate. The lens systems 704 and 710 are installed so that the images of the pin-holes are formed on these light-intercepting portions. On the other hand, when a voltage is applied to the heat-generating resistance members 705, the light flux is subjected to wavefront conversion action by the distribution of refractive index formed in the vicinity thereof, and that light flux 713 is imaged on a photosensitive medium 712 disposed at a position different from the position of the light-intercepting filter, by the lens system 710. That is, when no voltage is applied to the heat-generating resistance members 705, all of the light fluxes emergent from the pin-holes of the pin-hole plate 703 are intercepted by the light-intercepting filter 711, and only when a voltage is applied to the heat-generating resistance members 705, an imaged spot is formed and recorded on the photosensitive medium 712.

FIG. 107(A) shows the shape of the heat-generating resistance members 705 in their plane of arrangement. Reference character 714($i$) ($i=1-N$) designates the heat-generating resistance members, reference character 715($i$) denotes electrodes to which a voltage is applied from voltage application means, and reference numeral 716 designates a grounded electrode. The shape of the heat-generating resistance members 714($i$) is such that the length thereof in the direction of arrangement thereof is ly and the length thereof in the direction orthogonal thereto is lx. When the relation that ly<lx is satisfied, the light utilization factor becomes great in the optical recording apparatus of the present embodiment. The reason therefor will now be described by reference to FIG. 107(B).

Figure 106B:
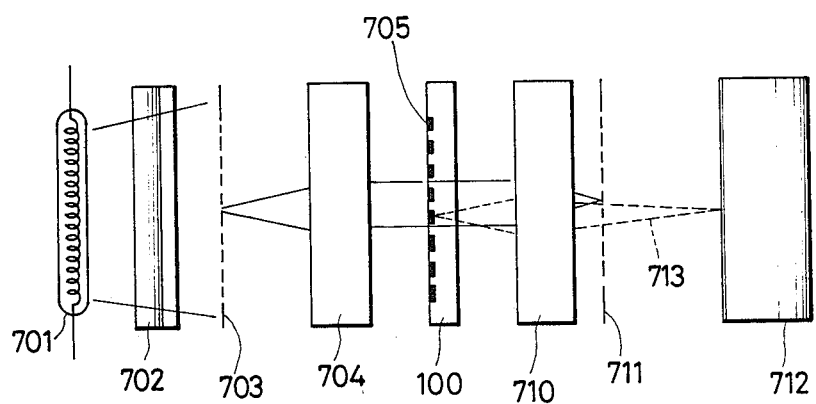

FIG. 107(B) shows the distribution of equal refractive index curve in the liquid formed when a voltage is applied to a heat-generating resistance member 714($i$). When, as shown in FIG. 107(A), the length ly of the heat-generating resistance member in the direction of arrangement thereof is shorter than the length lx of the heat-generating resistance member in a direction orthogonal thereto (ly°lx), the equal refractive index curve assumes an elliptical distribution having its major axis in the direction of lx, as indicated by 717. This means that the variation in refractive index assumes a steep gradient in the direction of ly, and the light flux having entered this portion of the distribution of refractive index is subjected wavefront conversion action more intensely in the direction of ly than in the direction of lx. Accordingly, as shown in FIGS. 106(A) and 106(B), the light flux subjected to wavefront conversion action and the light flux not subjected to wavefront conversion action can be separated in the direction orthogonal to the direction of arrangement of the heat-generating resistance members, and the latter light flux can be intercepted by the light-intercepting filter 711. In the above-described example, the medium in which the distribution of refractive index is formed by the heat-generating resistance members has been described as liquid, and for example, water, ethyl alcohol or the like is used as such medium.

The embodiment which will now be described relates to an optical element suitable for a light modulating optical system such as an optical shutter array which requires uniform illumination over the entire array, and to an optical apparatus employing such optical element. Generally, where it is desired to condense light efficiently on a portion to be irradiated, it is most preferable to use a laser of good directionality and monochromaticity as a light source. However, where the portion to be irradiated is linear as previously described, it is difficult to illuminate the entire portion to be irradiated at uniform intensity. One reason therefor is that the light flux emitted from a laser does not have a uniform cross-sectional intensity distribution and its intensity is reduced from the center toward the marginal portion in accordance with the Gaussian distribution. As the means for solving such a problem, a method of taking out and using only the portion of a light flux expanded by the use of a light flux diameter expanding optical system which can be regarded as uniform or a method using a light flux intensity converting optical element comprising a combination of two conical lenses is known. However, the former method is very poor in light utilization efficiency, and in the case of the latter method, it is difficult to machine the element without eccentricity or adjust the arrangement thereof.

The present embodiment has been devised to overcome the above-noted disadvantages and provide an optical system suited for uniformly illuminating a linear portion to be irradiated, and it divides the wavefront of a light flux emitted from a laser light source into two and superposes the divided wavefronts one upon the other and condenses them linearly, thereby achieving uniform linear illumination.

This embodiment will hereinafter be described by reference to the drawings.

Figure 108:
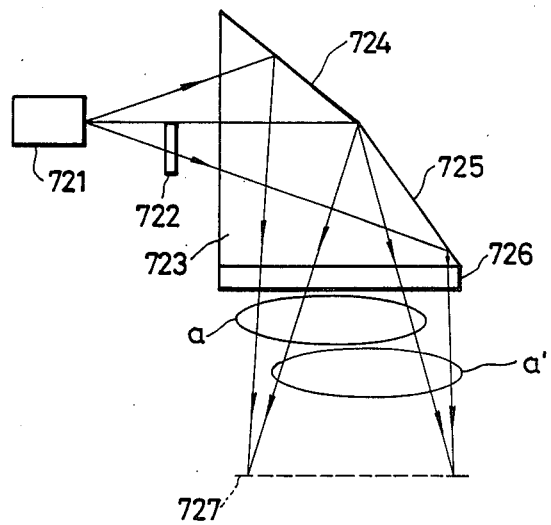
Figure 109A:
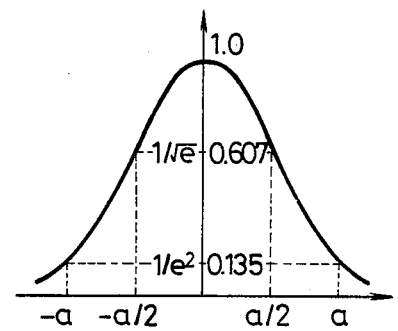

In FIG. 108, reference numeral 721 designates a semiconductor laser which is a light source, reference numeral 722 denotes a half wavelength plate for changing the direction of polarization of a part of the light flux emitted from the semiconductor laser 721, reference numeral 723 designates a prism for dividing the wavefront of the light flux from the semiconductor laser 721 into two light fluxes a and a′ different in direction of reflection by reflecting surfaces 724 and 725 angled relative to each other, and serving to superpose said two light fluxes one upon the other on a light-receiving medium to be described, reference numeral 726 denotes a cylindrical lens cemented to the prism 723 and having a power in a direction perpendicular to the plane of the drawing sheet for linearly condensing the light flux emergent from the prism 723, and reference numeral 727 designates a linear surface to be irradiated installed at the condensing position of the cylindrical lens 726. As regards the light flux emitted from the semiconductor laser 721, the intensity distribution thereof in the basic mode exhibits a Gaussian type curve as shown in FIG. 109(A). Accordingly, when the surface 727 to be irradiated is directly irradiated with this light flux, if use is made of a light flux of up to the intensity of $1/\sqrt{e}$ of the central intensity, the marginal intensity will be reduced by about 40% as compared with the central intensity, as can be seen from FIG. 109(A), and remarkable irregularity of illumination will be caused.

Figure 109B:
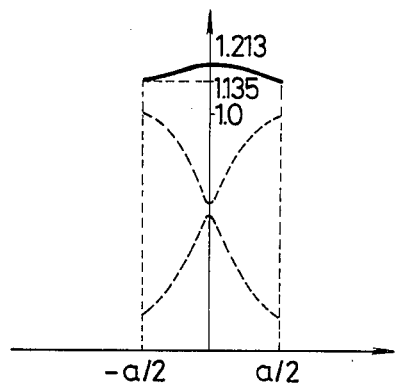

On the other hand, according to the present embodiment, the light flux is divided into two portions a and a' by the reflecting surfaces 724 and 725 of the prism 723 of FIG. 108 and said light fluxes a and a' are superposed one upon the other on the surface 727 to be irradiated. If, for example, a light flux of up to $1/e^2$ of the central intensity of the incident light flux is divided into two light fluxes on the surface 27 to be irradiated and the divided light fluxes are again superposed one upon the other, illumination having less irregularity than in the case of the direct irradiation can be obtained as shown by solid line in FIG. 109(B). In the case of FIG. 109(B), the reduction rate of the marginal intensity is about 6% as compared with that of the central intensity, and this is a remarkable improvement over the reduction rate of 40% in the case of the direct irradiation. In the foregoing, the two divided light fluxes have been described as being perfectly coincident with each other when they are superposed one upon the other, but by suitably shifting the area in which they are superposed one upon the other, an intensity distribution of better uniformity and free of irregularity can be obtained, although the usable area is somewhat narrowed. Also, in FIG. 108, to prevent the interference between the two light fluxes superposed one upon the other, the half wavelength plate 722 is inserted for the purpose of rotating the direction of polarization of one of the two light fluxes by 90° relative to that of the other light flux. Such half wavelength plate 722 is unnecessary where the interference between the light fluxes superposed one upon the other is practically harmless or where the interference property of the light source is so poor that no interference fringe is produced on the surface 727 to be irradiated.

Figure 110:
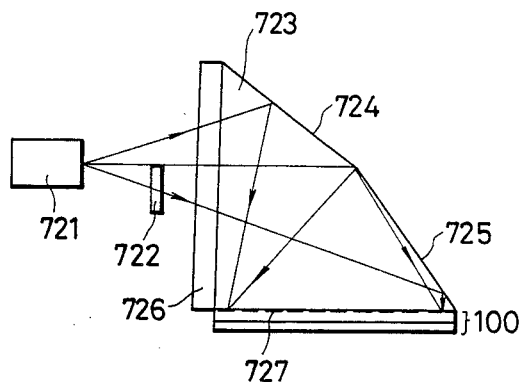

FIG. 110 shows another embodiment. In FIG. 110, reference numerals similar to those in FIG. 108 designate similar elements. The difference of this embodiment from the embodiment of FIG. 108 is that the surface 727 to be irradiated is joined to the prism 723, the cylindrical lens 726 is joined to the exit surface of the prism 723 and the condensing position of the cylindrical lens is coincident with the surface 727 to be irradiated which is the exit end surface of the prism. Such construction is particularly advantageous in making the device compact and enhancing the reliability of the device by integral formation in a case where the surface 727 to be irradiated, as in the thermal effect type light modulating device 100, is an array-like light modulator capable of being formed on a substrate such as glass by the photolithographic process. The effect of this embodiment is the same as that of the FIG. 108 embodiment and therefore need not be described.

Figure 111A:
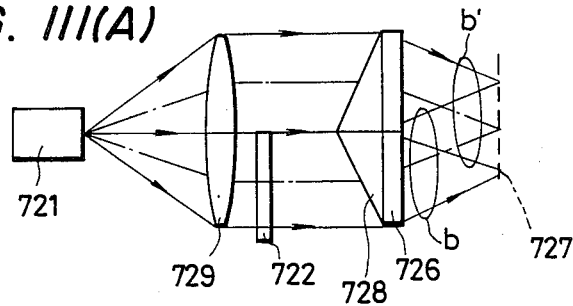
Figure 111B:
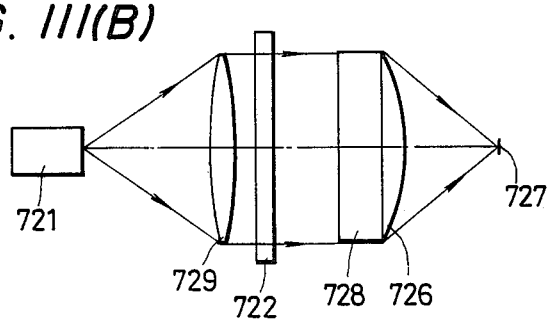

FIG. 111 shows a further embodiment, FIG. 111(A) being a side view thereof and FIG. 111(B) being a plan view thereof. In FIG. 111, reference numerals similar to those in FIGS. 108 and 109 designate similar elements.

A feature of this embodiment is that a transmitting type biprism 728 having a predetermined vertical angle instead of reflecting surfaces is employed as light flux dividing and synthesizing means. The light flux emitted from a semiconductor laser 721 is made into a parallel light flux by a collimater lens 729 and the direction of polarization of a part of this light flux is changed by a half wavelength plate 722, whereafter the light flux is divided into two light fluxes b and b' by the biprism 728 and then is linearly condensed on a light-receiving medium 727 by a cylindrical lens 726 cemented to the biprism 728.

The effect of this embodiment is similar to that of the embodiments of FIGS. 108 and 110, but by using the transmitting type biprism 728, the vertical angle thereof is made greater than that of the reflecting type prism where the same angle of intersection is given to the divided light fluxes and thus, the manufacture of the prism becomes easier. The collimater lens 729 and the half wavelength plate 722 shown in FIG. 111 are not always indispensable elements and may be omitted if desired.

Figure 112:
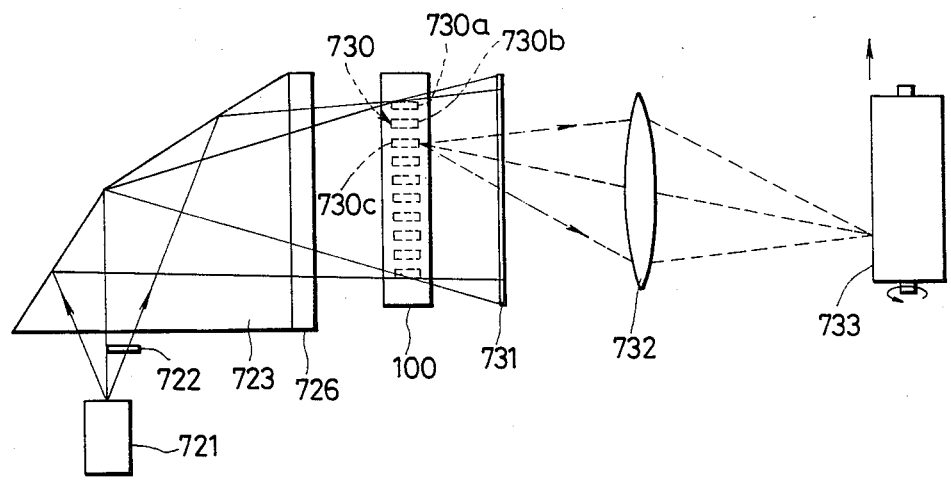

The embodiment of FIG. 112 is an example applied to an image forming apparatus, and this Figure is a view thereof as seen from above it.

Reference numeral 721 designates a laser light source which generates a light flux having a Gaussian type intensity distribution. Reference numeral 722 denotes a half wavelength plate, and reference numeral 723 designates an optical element identical to that shown in FIG. 108. Reference numeral 726 designates a cylindrical lens, and reference numeral 100 denotes a light modulating device. A heater array 730 comprising heat-generating resistance members 730 (730a, 730b, 730c) is schematically shown. Reference numeral 731 designates a light-intercepting plate having a sufficient size to intercept only the regularly reflected light from the light modulating device 100, reference numeral 732 denotes an imaging lens for projecting the divergent light from the light modulating device 100, and reference numeral 733 designates a photosensitive drum rotatable in the direction of arrow. The position of the surface of the photosensitive drum 733 is optically conjugate with the row of heat-generating resistence members 730 through the imaging lens 732.

The operation of the present embodiment will now be described by reference to FIG. 112. The laser light from the laser light source 721 is converted into a parallel light flux having a substantially uniform intensity distribution as described in connection with FIG. 108 by the optical element 723. The light flux emergent from the optical element 723 is linearly condensed on the heater array 730 by the cylindrical lens 726. At this time, the direction in which the conversion of the light flux of the cross-sectional intensity distribution has been effected by the optical element 723 and the direction of linear condensation are made substantially coincident with each other. When the heater array 730 is not electrically energized, this linearly condensed light flux is all intercepted by the light-intercepting plate 731. Now, if the heat-generating resistance member 730c of the heater array 730 of the light modulating device 100 is electrically energized, a distribution of refractive index is formed in a portion of the liquid layer thereon. The light entering this portion and emerging therefrom becomes a divergent light as indicated by broken lines, and most of this divergent light is not intercepted by the light-intercepting plate 731 but is imaged as a point image on the photosensitive drum 733 by the imaging lens 732. Accordingly, by the heater array 730 being driven in accordance with image signals, an image comprising an aggregate of point images corresponding to the image signals is formed in the direction of arrow on the surface of the photosensitive drum 733. By such scanning being repeated, a two-dimensional sensitized image is formed on the surface of the photosensitive drum 733. Thereafter, the electrostatic latent image formed on the photosensitive drum 733 may be suitably processed by well-known means and the image may be formed on paper or the like. Alternatively, the necessary heat-generating resistance members of the heater array 730 of the light modulating device 100 may be electrically energized at a time without scanning the heater array 730 and a linear aggregate of point images may be formed on the photosensitive drum 733 at the same time. As a further alternative, a screen may be disposed instead of the photosensitive drum 733, and a galvano mirror (not shown) for scanning in a direction orthogonal to the array direction of the heater array 730 may be disposed between the screen and the imaging lens 732 and further, if required for aberration correction, a further imaging lens (not shown) may be disposed between the galvano mirror and the screen, whereby a two-dimensional image can be formed and displayed on the screen.

What is important in the image forming apparatus as the optical apparatus shown in FIG. 112 is that the optical element 723 is used, whereby the light flux has a uniform intensity distribution in the direction of arrangement of the heater array 730 and is expanded to a sufficient width to fully irradiate the heater array 730. Accordingly, the intensity of the point images formed on the photosensitive drum 733 is substantially uniform and an image of high resolution is obtained.

As described hitherto, the optical element shown in the present embodiment can convert the intensity distribution of the light flux into a desired distribution of intensity of light by a simple construction and moreover can readily effect conversion of the diameter of the light flux. An image forming apparatus such as an optical printer or a display apparatus provided with the optical element according to the present invention can provide images of high resolution and high quality free of irregularity.

An embodiment relating to the application of the light modulating device according to the present invention will now be described by reference to the drawings.

Figure 113:
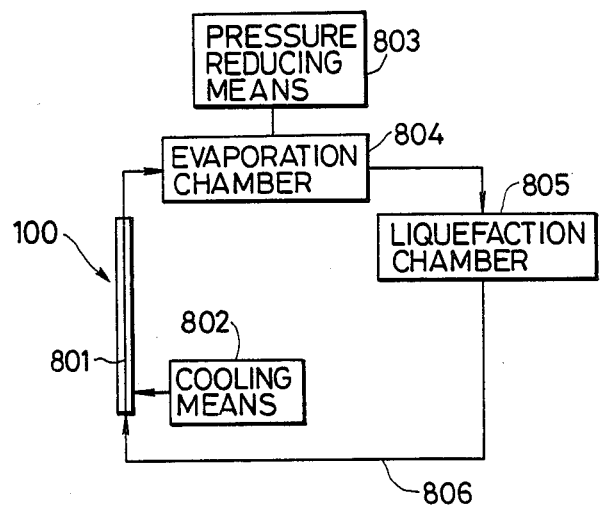
FIG. 113 is a block diagram of the liquid circulating system of the light modulation apparatus for cooling the liquid layer of the light modulating device of the present invention.

FIG. 113 is a block diagram of the liquid body circulating system of a light modulation apparatus for cooling the liquid layer of the light modulating device. When the light modulating device 100 is continuously driven for a long time, the temperature of the liquid layer 801 in the device 100 may gradually rise due to the accumulated heat thereof and vapor bubbles may be suddenly created in the liquid layer 801 in which the liquid is in the form of a thin layer. Such an increase in the accumulated heat may cause noise and this is not preferable. Thus, in the present example, to prevent the accumulation of heat in the liquid layer 801, design is made such that the liquid body in the liquid layer 801 circulates between the light modulating device 100, a gasifying or evaporation chamber 804 and a liquefying or liquefaction chamber 805.

The function of the gasifying chamber 804 is to take such excessive heat as gasification heat and to absorb or alleviate any pressure developed by unforeseen reaction of vapor bubbles. Pressure reducing means 803 for maintaining the gasifying chamber 804 in a predetermined pressure-reduced state is added to the gasifying chamber 804.

If the gasifying chamber 804 is at a lower pressure, the evaporation speed of the liquid increases and the heat radiation speed also becomes higher, and this also is an effect of the pressure reducing means. The gasified vapor then discharges heat out of the system in the liquefying chamber 805 and is liquefied therein, and is again introduced into the liquid layer 801 in the light modulating device 100 via a circulation path 806. Accordingly, the liquid circulating system which circulates the liquid from the liquid layer 801 to the gasifying chamber 804 via the circulation path 806 while maintaining the pressure-reduced state by the pressure reducing means 803, and further from the gasifying chamber 804 to the liquefying chamber 805 and thence back to the liquid layer 801 displays its effect in eliminating thermal noise as an image defect and eliminating any noise resulting from pressure.

Further, by adding radiating means or cooling means 802 comprising a Peltier effect element or the like to the light modulating device 100, the above-described effect can be expedited and thus, an enlarged picture plane can be projected onto the aforementioned light-receiving medium.

Now, in the liquid circulating system described above in connection with FIG. 113, it is not requisite to provide forcible liquid circulating means such as a pump. That is, a liquid circulating system can be formed by natural convection of the liquid.

When the liquid of the liquid circulating system is flowed during the period in which the heated area of the liquid layer is formed in the liquid layer 801, the velocity of flow should of course be of such a degree as not to disturb the heated area of the liquid layer.

The pressure reducing means 803 can be constituted by the use of a vacuum pump or an electromagnetic valve, and a fan for expediting radiation may be provided on the outer wall of the liquefying chamber 805.

Figure 114:
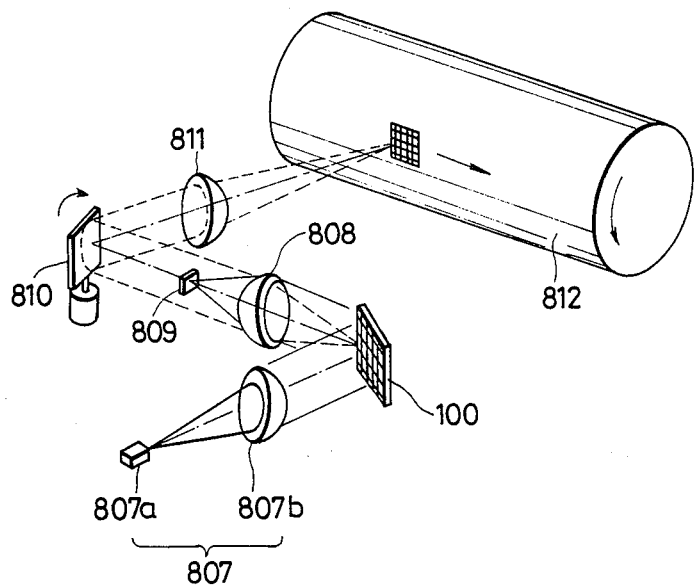
FIG. 114 shows an embodiment of the light modulation apparatus using the light modulating device shown in FIGS. 5(A) and (B).

FIG. 114 shows an embodiment of the light modulation apparatus using the light modulating device shown in FIGS. 5(A) and 5(B). The light modulating device 100 capable of creating a distribution of refractive index in a two-dimensional pattern is irradiated with the light flux from light flux producing means 807 comprising a light source 807a and a collimater lens 807b. The light flux not caused to diverge by the distribution of refractive index is condensed by a lens 808 and intercepted by a light-intercepting filter 809 provided on one focal plane of the lens 808. Since the light modulating device 100 is provided substantially in coincidence with the other focal plane of the lens 808, the light flux caused to diverge by the light modulating device 100 is made into a substantially parallel light flux by the lens 808 and is imaged on light-receiving medium 812 by a lens 811, thereby forming a two-dimensional image corresponding to the created pattern of the distribution of refractive index. If a deflecting mirror 810 is disposed between the lens 808 and the lens 811 so as to deflect the aforementioned divergent light flux, the scanning image of said two-dimensional image can be obtained on the light-receiving medium 812. If, for example, design is made such that various character patterns can be formed by the distribution of refractive index by the use of the light modulating device which two-dimensionally creates the distribution of refractive index, a printer terminal device such as a word processor can be realized. The rotation of the aforementioned deflecting mirror should desirably be intermittent rotation because the distribution of refractive index is not created on the entire surface at a time by the light modulating device 100.

Also, as regards the light modulating device capable of forming a two-dimensional pattern, it is needless to say that the transmitting type light modulating device as shown in FIG. 4 can be obtained.

Figure 115:
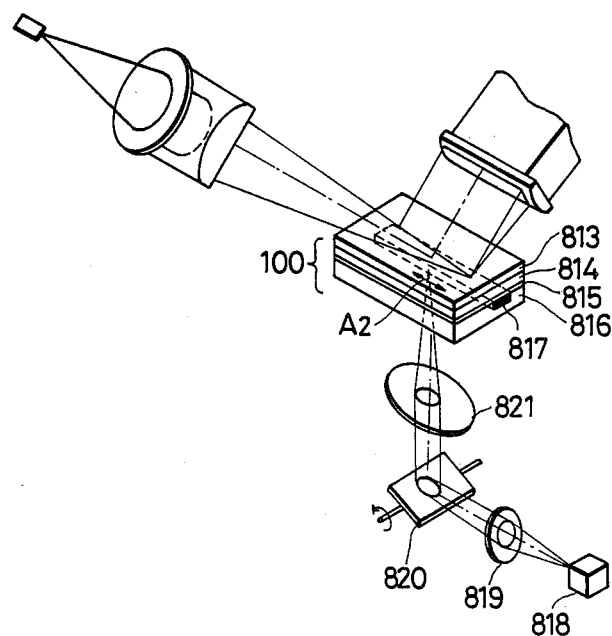
FIG. 115 shows an embodiment in which a light beam is scanned to form a distribution of refractive index.

In the foregoing, the embodiments using heat-generating resistance members to form a distribution of refractive index have been described, but it is also possible to obtain a distribution of refractive index by scanning a light beam and converting the scanned beam into heat. FIG. 115 shows an embodiment in which a light beam is scanned to form a distribution of refractive index. The light modulating device 100 is comprised of a transparent protective plate 813, a thin liquid layer 814, a heat-conductive electrically insulating layer 815 and a transparent support member 816. The support member 816 is provided with a light-to-heat converting medium 817. Reference numeral 818 designates a semiconductor laser capable of self-modulating. The light flux from the laser 818 is made into a parallel beam by a collimater lens 819 and imaged on the light-to-heat converting medium 817 by a condenser lens 821 for scanning through a galvano mirror 820. The light-to-heat converting medium 817 is formed of a material which absorbs the light flux from the semiconductor laser 818 particularly well, and accordingly, the light flux passing through the light-to-heat converting medium 817 becomes substantially null. The scanning optical system is set so that a light beam spot moves in the direction of arrow $A_2$ along the light-to-heat converting medium 817 when the galvano mirror 820 is rotated about its axis of rotation. In the area of the light-to-heat converting medium 817 wherein the beam spot by the semiconductor laser 818 is formed, the light beam is converted into heat and a distribution of refractive index is formed in the thin liquid layer through the insulating layer 815. Therefore, by turning on and off the beam from the semiconductor laser in accordance with the rotation of the galvano mirror 820, a distribution of refractive index can be formed at a desired position. As the optical system for projecting the light flux caused to diverge by the distribution of refractive index and directing the divergent light to the light-receiving medium, use may of course be made of any of the optical systems using the above-described light modulating devices and therefore, such optical system need not be described here.

Also, by providing the light-to-heat converting medium 817 over the whole surface of the support member 816 and making the scanning optical system for applying a light beam to the light-to-heat converting medium 817 into a two-dimensional scanning optical system, it is possible to obtain the light modulating device by the distribution of refractive index having the two-dimensional pattern shown in FIGS. 5(A) and 5(B).

The embodiments which will be described with reference to FIGS. 116–122 are directed to an optical element suitable for use in an optical recording apparatus, an optical display apparatus, an optical imaging apparatus, an optical communication apparatus or the like.

In the above-mentioned apparatuses, various systems and elements having the functions of modulating and branching off a light flux have heretofore been proposed, but they have numerous disadvantages in respect of the size of the element, the utilization efficiency of the light flux, the complexity of the structure, etc.

The primary object of each of the present embodiments is to solve the above-noted problems peculiar to the known optical elements and to provide an optical element which is compact and simple in construction and which has the functions of modulating and branching off a light flux.

The present embodiments achieve the above object by paying attention to the fact that the absolute value of the degree of temperature dependence ($\Delta n/\Delta T$) of the refractive index of liquid is greater by one unit or more than that of the dielectric crystal used in the above-described embodiments. In the present embodiments, liquid crystal is included in the category of liquid. Particularly, liquid crystal has its refractive index varied by 0.1 or more when it produces phase change between the liquid crystal phase and the liquid phase due to the temperature change in the interior of the liquid crystal and therefore, liquid crystal is suitable as a material for realizing the present embodiments.

A feature of the optical elements shown in the present embodiments is that, in an optical element basically comprising a first medium, a second medium in contact with the first medium and temperature control means for controlling the temperature at a predetermined position of the first medium, liquid is used as the first medium and the boundary surface between the first medium and the second medium is made planar and the boundary surface is obliquely disposed with respect to a light ray entering the boundary surface, so that the optical path of the light ray is changed, for transmission or total reflection, in the boundary surface or the angle of refraction during transmission is changed to thereby bend the optical path. According to the present embodiments, the absolute value of the degree of temperature dependence ($\Delta n/\Delta T$) of the refractive index of liquid is greater by one unit or more than that of dielectric crystal and therefore, as compared with the prior art example, equivalent or improved optical characteristics can be created even for a small temperature change, and this can greatly contribute to compactness of the element, reduction of power consumption, etc.

Further, where liquid crystal is used as the first medium, there is provided a greater effect because the amount of variation in refractive index during the phase change of liquid crystal is great as previously described.

The details of the present embodiments will hereinafter be described by reference to FIGS. 116 to 122 of the drawings.

Figure 116:
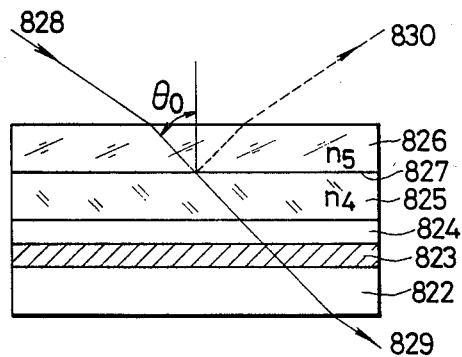
FIGS. 116 and 117 are principle views for illustrating an embodiment in which the present invention is applied to a light branching apparatus.

FIG. 116 illustrates the principle of the present embodiments. In FIG. 116, reference numeral 822 designates an optically transparent substrate which may be, for example, optical glass. Reference numeral 823 denotes an optically transparent heat-generating resistance member which is an example of the heat-generating means. The heat-generating resistance member 823 may generate heat by a voltage being applied thereto from a power source, not shown. The voltage applied may be a DC voltage or an AC voltage. The material of the heat-generating resistance member may be indium oxide, tin oxide or a mixture thereof having added thereto a suitable amount of zinc oxide, chromium oxide, antimony or the like. Reference numeral 824 denotes a thermally conductive, optically transparent insulating member which may be formed, for example, of silicon oxide, zirconium oxide or the like.

Reference numeral 825 designates a first medium comprising a liquid which is optically transparent and whose refractive index is variable by heat and which has a thermo-optic effect. The refractive index of the first medium is represented as $n_{825}$. Reference numeral 826 denotes a second medium which is optically transparent, and the refractive index thereof is represented as $n_{826}$. The second medium should desirably be a substance having a small degree of temperature dependence of refractive index, as compared with the first medium, and is formed, for example, of optical glass. As a result, the amount of variation in the refractive index of the second medium 826 is sufficiently small as compared with that of the first medium, and the influence thereof is almost negligible.

In FIG. 116, the incident light 828 enters at an angle of $\theta_0$ with respect to the plane normal of the boundary surface 827 between the first medium 825 and the second medium 826. If the state in which the heat-generating resistance member 823 is not generating any heat is defined as a first stationary state and if the then refractive index of the first medium is represented as $(n_{825})_1$, the incident light 828 passes through the element and becomes into a transmitted light 829 if $$n_{826} \cdot \sin \theta_0 \leq (n_{825})_1 \qquad (7)$$

Next, if the state in which the heat-generating resistance member 823 generates heat is defined as a second stationary state an if the then refractive index of the first medium is represented as $(n_{825})_2$ and $$n_{826} \cdot \sin \theta_0 > (n_{825})_2 \qquad (8)$$

is satisfied, the incident light 828 is totally reflected on the boundary surface 827 and becomes into a totally reflected light 830. That is, from formulas (7) and (8), it is necessary to use the construction of the element which satisfies $$(n_{825})_1 \leq n_{826} \cdot \sin \theta_0 \leq (n_{825})_2 \qquad (9).$$

Accordingly, water, ethanol or the like is suitable as the material of the first medium 825 because the absolute value of $\Delta n/\Delta T$ thereof is of the order of $10^{-4}$ (per deg) as compared with the fact that the absolute value of $\Delta n/\Delta T$ of the above-mentioned medium having a relatively great absolute value of the degree of temperature dependence $(\Delta n_{825}/\Delta T)$ of refractive index, for example, optical glass, is of the order of $10^{-6}$ (per deg). Alternatively, among mediums such as liquid crystal in which phase transition occurs between the liquid crystal phase (having refractive indices $n_e$ and $n_o$ because of anisotropic medium) and the liquid phase (isotropic and having a refractive index $n_i$) with a certain phase-transition temperature as the boundary, there are mediums in which the difference in refractive index $\Delta n$ ($=n_e-n_i$ or $n_o-n_i$) between the two phases is 0.1 or more, and such mediums also are suitable ones. In this case, however, because of the optical anisotropy of the liquid crystal phase, it is necessary to arrange the direction of polarization of the incident light and the orientation of the molecular axis of the liquid crystal into a predetermined direction. Thus, by using a medium having a great absolute value of the degree of temperature dependence of refractive index, the amount of variation in temperature of the first medium by the heat-generating resistance member may be small as compared with that of dielectric crystal or the like, and this is preferable in the use of the element or device.

The structurally important point of the optical element according to the present invention is that in the interior of the first medium 825, the direction in which a variation in refractive index occurs need not always be made orthogonal to the optical path. This results in the feature that there is no limitation by the beam diameter of the incident light ray. Further, by thinning the first medium 825, it is possible to make the element compact, and by shortening the time of heat transfer from the heat-generating resistance member 823 to the boundary surface 827, it becomes also possible to enhance the response speed.

Furthermore, the use of liquid as the first medium 825 not only results in the feature attributable to the aforementioned fact that the absolute value of $\Delta n/\Delta T$ is great, but also eliminates the limitation in size caused by the manufacturing method as encountered in the case of dielectric crystal or the like and thus makes it easy to provide a larger area for the element and for example, it is also possible to use a common medium for a plurality of heat-generating resistance members.

In the present embodiment, the incident light 828 may be a parallel light or a non-parallel light if it is within a range which satisfies formula (9). Also, in the foregoing description, an example in which the incident light 828 is transmitted in the first stationary state and the incident light 828 is totally reflected in the second stationary state has been shown, but alternatively, this may be reversed. These are made possible by selection of the positive or negative of the degree of temperature dependence $\Delta n_{825}/\Delta T$ of the refractive index of first medium 825 and the refractive indices $n_{825}$ and $n_{826}$ of the first medium 825 and the second medium 826, respectively.

The effect of the embodiment shown in FIG. 116 will now be described briefly by showing specific numerical data thereof. As the first medium 825, use is made of liquid crystal in which $n_o=1.50$ and $n_i=1.60$. Where the incident light 828 is used in the form of P-polarized light, the molecular axis of the liquid crystal may be oriented in a direction perpendicular to the plane of the drawing sheet, and where S-polarized light is used, the molecular axis of the liquid crystal may be oriented in the plane of the drawing sheet in parallelism or perpendicularly to the boundary surface 827. As the second optical medium, use is made of optical glass in which $n_5=1.60$. Thus, according to the aforementioned formula (9), $\theta_0$ has a degree of freedom within the range of $70° \leq \theta_0 \leq 90°$. As the first medium 825, use may also be made of liquid crystal in which $n_e=1.80$ and $n_i=1.60$. In this case, the liquid crystal can be oriented in the combination converse to what has been described above, for the P-polarized light or the S-polarized light which is the incident light. As the second optical medium 826, use can be made of optical glass in which $n_5=1.80$. When calculation is made in the same manner as the above-described example, there is obtained $63° \leq \theta_0 \leq 90°$, which means a greater degree of freedom.

Although not shown in FIG. 116, prisms for incidence and emergence may be attached to the second optical member 826 and the support member 822 to cause the incident light 828 to enter the boundary surface 827 at a desired angle $\theta_0$ and to enable the emergent lights 829 and 830 to be taken out.

In the foregoing description made in conjunction with FIG. 116, the substrate 822, the heat-generating resistance member 823 and the insulating member 824 through which the transmitted light 829 passes have been described as being formed of optically transparent materials, whereas, in a case of use wherein attention is paid only to the modulation effect of the totally reflected light 830, not all of these need be transparent but one of them may be a light-absorbing member. Also, in the foregoing description, a heat-generating resistance member has been used as an example of the heat-generating means 823, but instead thereof, forcible cooling means such as a Peltier element may be employed or both of them may be used to achieve a higher speed.

It is also possible to arrange a plurality of heat-generating means 823 in the form of an array or a matrix to enable them to be used as a shutter array.

Figure 117:
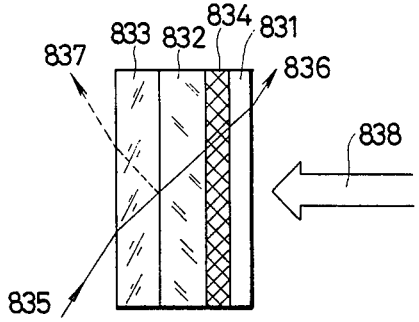

FIG. 117 shows a modulating device according to an embodiment constructed by the use of new heat-generating means. In FIG. 117, reference numeral 831 designates a transparent substrate, reference numeral 832 denotes a first medium, and reference numeral 833 designates a second medium. Reference numeral 834 designates a light-to-heat converting medium having sensitivity only to the wavelength of radiation 838 and capable of absorbing the radiation 838, converting it into heat and transferring the heat to the first medium 832. As a result, in a certain state, the incident light 835 becomes a transmitted light 836, and in a further state, it becomes a totally reflected light 837 and is subjected to an action similar to that described in connection with FIG. 116. The radiation 838 can also scan the light-to-heat converting medium 834 with the aid of a scanning optical system, not shown.

Figure 118:
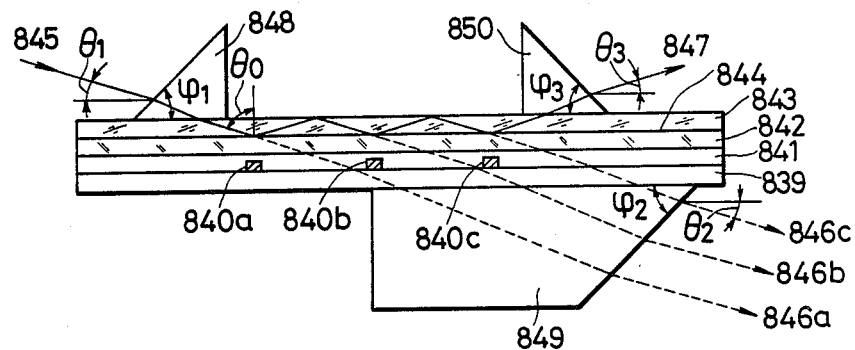
FIGS. 118 and 119 show an embodiment in which the present invention is applied to a light switching apparatus.

FIG. 118 shows an embodiment of the light switching apparatus. A feature of the embodiment shown in FIG. 118 is that the light modulating device shown in FIGS. 116 and 117 is adapted to the light ray travelling through a waveguide. In FIG. 118, reference numeral 839 designates a transparent substrate, reference characters 840a, 840b and 840c denote transparent heat-generating resistance members, reference numeral 841 designates a transparent insulating member, reference numeral 842 denotes a first medium having the thermo-optic effect, reference numeral 843 designates a second medium, reference numeral 848 denotes a prism for incident light, and reference numeral 849 designates a prism for transmitted emergent light.

To take an example of the numerical data, liquid crystal in which the normal refractive index $n_o$ during liquid crystal phase and the isotropic refractive index $n_i$ during liquid phase are $n_o=1.5$ and $n_i=1.545$, respectively, is used as the first medium 842. That is, in the first stationary state in which the heat-generating resistance members do not generate any heat, $(n_{825})_1=n_o=1.5$, and in the second stationary state in which the heat-generating resistance members generate heat, $(n_{825})_2=n_i=1.545$. Optical glass in which $n_{826}=1.53$ is used as the second medium 843. If the angle formed between the plane normal of the boundary surface 844 between the first medium 842 and the second medium 843 and the incident light 845 in the second medium 843 is $\theta_0$, from formula (9), it is necessary that $$1.5 \leq 1.53 \cdot \sin \theta_0 (\leq 1.53) < 1.545 \quad (10)$$

be satisfied and accordingly, the following is obtained:

$$78.6° \leq \theta_0 \leq 90° \quad (11)$$

When the heat-generating resistance member 840a generates heat whereby the second medium 842 in the vicinity thereof is in the second stationary state, the incident light 845 is transmitted through the boundary surface 844 and becomes a transmitted light 846a. On the other hand, when the heat-generating resistance member 840a does not generate heat whereby the second medium 842 is in the first stationary state, the incident light 845 is totally reflected by the boundary surface 844 and is again totally reflected between the second medium 843 and the air layer and travels toward the boundary surface 844. The period of the repetition of the total reflection occurring in the second medium 843 on the opposite sides thereof is determined by the thickness of the second medium 843 and the angle of incidence $\theta_0$ of the incident light 845 in the second medium 843 and accordingly, if the heat-generating resistance members 840b and 840c are disposed on the basis of said period, when one of the heat-generating resistance members 840a, 840b and 840c generates heat, transmitted lights 846a, 846b and 846c corresponding to that heat-generating resistance member appears due to the above-described principle. On the other hand, when none of the heat-generating resistance members generates heat, a totally reflected light 847 appears. If the refractive indices $n_{848}$, $n_{849}$ and $n_{850}$ of the prisms for incidence and emergence are $n_{848}=n_{849}=n_{850}=1.693$ and the angles of taper $\phi_1$, $\phi_2$ and $\phi_3$ with respect to the horizontal direction of the device shown in FIG. 118 are $\phi_1=\phi_2=\phi_3=45°$, the angles $\theta_1$, $\theta_2$ and $\theta_3$ formed by the horizontal direction of the device with respect to the incident light 845, the transmitted light 846 and the totally reflected light 847, respectively, are given as follows, by formula (11):

$$10.3° \leq \theta_1, \theta_2, \theta_3 \leq 14.6° \quad (12)$$

However, since liquid crystal is used as the first medium 842 and the ordinary refractive index $n_o$ thereof is utilized, where in FIG. 118, the molecular axis of the liquid crystal is oriented in a direction perpendicular to the plane of the drawing sheet, the incident light 845 must be P-polarized light vibrating in the plane of the drawing sheet and, where the molecular axis of the liquid crystal is parallel to the boundary surface 844 or perpendicular to the boundary surface 844, the incident light 845 must be S-polarized light vibrating in the direction perpendicular to the plane of the drawing sheet.

The refractive indices of the other components of the modulating device than those described above with the numerical values thereof mentioned, for example, the transparent support member 839, the transparent heat-generating resistance members 840, the insulating member 841, unshown transparent electrode, unshown adhesive agent, unshown liquid crystal orienting agent, etc., may be 1.53 or more as can be seen from formula (10).

Figure 119:
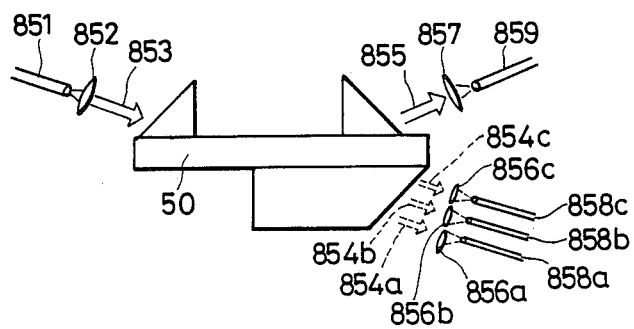

FIG. 119 shows an embodiment in which the device shown in FIG. 118 is used as a switching apparatus for optical communications. Reference numeral 851 designates an optical fiber for incident light, and reference numeral 852 denotes a collimater for collimating the light flux from the end of the optical fiber. The incident light 853 enters the optical element shown in FIG. 118. On the previously described principle, the transmitted lights 854a, 854b, 854c and the totally reflected light 855 respectively enter optical fibers 858a, 858b, 858c and 859 for emergent light with the aid of imaging lenses 856a, 856b, 856c and 857.

In the form of use employing the polarized state of the light flux passing through the element, the fibers 851, 858a, 858b, 858c and 859 for incident light and emergent light may be polarized plane preservation (or single polarization) fibers. The imaging lenses 856a, 856b, 856c and 857 may be planar microlenses constructed on the end surface of a prism for emergence.

Figure 120:
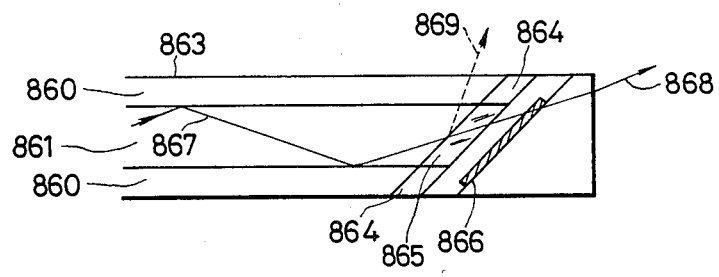
FIG. 120 shows an embodiment in which the present invention is applied for light branching.

FIG. 120 shows a further embodiment in which the device shown in FIGS. 116 and 117 is adapted to the light ray travelling through a waveguide. The end surface of a waveguide 863 comprising a clad 860 and a core 861 is obliquely cut and the device according to the present embodiment is attached to the cut surface. Reference numeral 864 designates the side wall of a liquid chamber for confirming therein a first medium 865 which is liquid. The side wall 864 also serves to make the waveguide and the optical element integral with each other. Alternatively, it is possible to make these integral with each other by other means, not shown. In the embodiment shown in FIG. 120, the core 861 performs the function of a second medium which is in contact with the first medium 865. In the present embodiment, at least a part of the incident light flux 867 propagated through the core 861 in the boundary surface between the core 861 and the liquid 865 has its optical path changed to the transmitted light 868 or the totally reflected light 869, depending on the presence of heat generation of a heat-generating resistance member 866. This results in the feature that, for example, the quantity of light of the transmitted light 868 is varied depending on the presence of heat generation of the heat-generating resistance member 866.

By coupling a plurality of such optical elements as shown in FIG. 120 in series, it is possible to improve the extinction ratio of the transmitted light 868. Accordingly, by making the above-described optical elements into the form of a one-dimensional array and combining it with a light-receiving medium, it is possible to use the optical elements as a light valve for a recording apparatus. Further, by constructing the optical elements into the form of a two-dimensional matrix, the application thereof as a display element is also possible.

Figure 121:
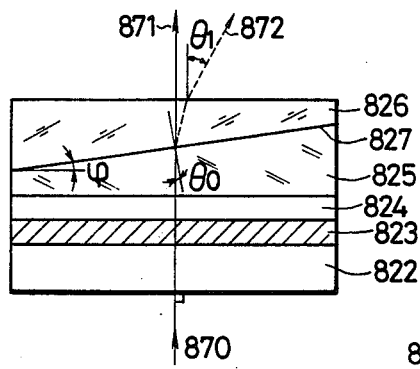
FIGS. 121 and 122 show an embodiment in which the present invention is applied to a light modulating and deflecting device.

In the embodiments shown in FIGS. 116 to 120, description has been made of the device having the function of transmitting or totally reflecting the incident light ray in the boundary surface. Reference is now had to FIG. 121 to describe a device having the function of varying the angle of refraction of the incident light ray onto the boundary surface on the basis of the same principle as that of the above-described embodiments to thereby modulate and deflect the incident light ray. In FIG. 121, members similar to those described in connection with FIG. 116 are given similar reference numerals. A feature of the present device is that the boundary surface 827 forms an angle $\phi$ with respect to a direction horizontal to the plane of the drawing sheet. For simplicity, if the incident light ray 870 is caused to enter the element perpendicularly thereto, the angle $\theta_0$ formed by the incident light ray 870 with the plane normal of the boundary surface 827 is expressed as $\theta_0 = \phi$. If the refractive indices $n_{825}$ and $n_{826}$ of a first medium 825 which is liquid and a second medium 826, respectively, are set to equal values in the state in which a heat-generating resistance member 823 does not generate heat, the incident light ray 870 travels rectilinearly in the boundary surface 827 and becomes an emergent light ray 871. On the other hand, when the refractive index of the first medium 825 has become higher than that of the second medium by the heat generation of the heat-generating resistance member 823, the incident light ray is refracted in the boundary surface 827 and the end surface of the second medium 826 which is adjacent to the emergence side, as shown in FIG. 120, and becomes an emergent light ray 872 forming an angle of $\theta_1$ with respect to the rectilinearly travelling emergent light 871.

Figure 122:
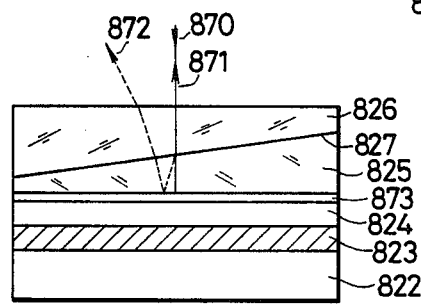

For example, the second medium 826 is formed of optical glass in which $n_{826} = 1.50$, and is set to $\phi = 30°$. A liquid material such as carbon tetrachloride or ethyl alcohol is used as the material of the first medium 825. Carbon tetrachloride has $n_{825} = 1.46$, $\Delta n/\Delta T = -6 \times 10^{-4}$ and a boiling point of 77° C. Ethyl alcohol has $n_{825} = 1.36$, $\Delta n/\Delta T = -4 \times 10^{-4}$ and a boiling point of 78° C. If the internal temperature of carbon tetrachloride is changed by 50° C. at a temperature below the boiling point thereof, the refractive index thereof will change to 1.43. Accordingly, as the result of the temperature change of 50° C. due to the heat generation or the not-heat generation of the heat-generating resistance member 823, the angle of emergence $\theta_1$ of the emergent light ray 872 varies within the range of about 1°. The embodiment shown in FIG. 122 is one in which the embodiment shown in FIG. 121 is constructed as the reflecting type, and a feature of this embodiment is that a reflecting film 873 is provided between a thermally conductive insulating member and a first medium 825. The incident light ray 870 onto the element is reciprocally transmitted through the boundary surface 827 and therefore, as compared with the embodiment shown in FIG. 121, this embodiment can achieve deflection of the emergent light basically at an angle two times greater. In this case, the support member 822, the heat-generating resistance member 823 and the insulating member 824 need not always be transparent.

Again in the embodiments shown in FIGS. 121 and 122, it is possible to use liquid crystal as the first medium 825 and utilize the difference between the anisotropic and the isotropic refractive index of the liquid crystal during the phase transition thereof, but detailed numerical data thereof are not shown here.

As described above, the device according to the present embodiment, as compared with the convertional device, is compact and simple in construction and yet exhibits a high response speed, and is capable of being driven under a low voltage and excellent in durability. The present device can change the optical path by selecting the incident light for total reflection or for transmission or by varying the angle of refraction thereof and as a result, it has the functions of modulating, deflecting, branching off and synthesizing light. Also, if a plurality of such devices are arranged, they can be used as a switching array or a shutter array and accordingly, the present device is suitable for use in an optical recording apparatus, an optical display apparatus, an optical imaging apparatus, an optical communication apparatus or the like.

Where the device of the present invention is applied as a light modulator or a printer, it is often used with an optical system such as a lens, and the device can be made relatively compact and light in weight, whereas the dimensions of the optical system are large and therefore, in some cases, compactness as a whole cannot be achieved. In view of this problem, the present embodiment provides a light modulating optical system in which the members including the optical system are made integral with one another and which is compact and light in weight.

Figure 123:
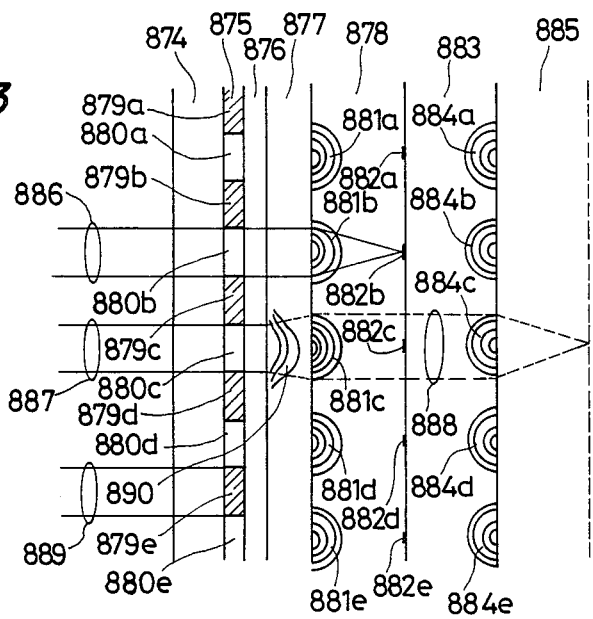

In the embodiment shown in FIG. 123, reference numeral 874 designates a glass substrate, and reference numeral 875 denotes an electrode portion in which transparent heat-generating resistance members 880a-880e and light-intercepting filters 879a-879e are formed. Reference numeral 876 designates a protective layer comprising a dielectric film, reference numeral 877 denotes a thermal effect medium, reference numeral 878 designates a glass plate having planar microlens arrays 881a-881e, and reference characters 882a-882e denotes light-intercepting filters formed on the end surface of the glass plate. The transparent heat-generating resistance members 880a-880e and the light-intercepting filters 879a-879e are formed on the glass substrate 874 by the photolithographic technique, and the protective layer 876 formed as by vapor deposition exists thereon. The thermal effect medium is formed while being enclosed in a cell by the use of a technique similar to the technique of manufacturing liquid crystal display plates. The glass plate 878 serves as a cover for sealing the thermal effect medium and also as a substrate for the planar microlens arrays 881a-881e and the light-intercepting filters 882a-882e. Reference numeral 883 designates a glass plate having planar microlens arrays 884a-884e. The glass plate 883 is adhesively secured to the glass plate 878. Reference numeral 885 denotes the surface of a light-receiving medium.

The glass substrate 874, the electrode portion 875, the protective layer 876, the thermal effect medium 877, the glass plate 878 having planar microlenses, the light-intercepting filters 882a-882e and the glass plate 883 are formed integrally with one another and fixed relative to one another. Of the parallel light fluxes entering from the left-hand side of FIG. 123, the light flux 886 transmitted through the transparent heat-generating resistance member 880b which is not generating heat is condensed by the planar microlens, is all intercepted by the light-intercepting filter 882b installed at the imaging point position of the planar microlens, and does not emerge to the right of the glass plate 878. On the other hand, the light flux 887 entering the portion of the thermal effect medium 877 in which a distribution of refractive index 890 is formed by the heat generation of the transparent heat-generating resistance member 880c is subjected to wavefront conversion action by the distribution of refractive index 890, becomes a divergent light flux emerging as if from a point, enters the planar microlens 881c and emerges therefrom, whereafter it again becomes a parallel light flux 888, travels to the right and is condensed on the surface 885 of the light-receiving medium by the second planar microlens. Also, of the incident light fluxes, the light flux 889 entering the intermediate portion of adjacent heat-generating resistance members is intercepted by the light-intercepting filter 879e provided in the same portion and does not emerge to the right irrespective of the heat generation or the non-heat generation of the heat-generating resistance members. Accordingly, as can be seen from the foregoing description, it is only in the portion of the thermal effect medium in which a distribution of refractive index is formed by the heat-generating resistance members that the light flux emerges to the right and thus, by ON-OFF of the electrical signal applied to the heat-generating resistance members, it is possible to obtain a modulated signal light of good contrast.

The glass substrate, the light-intercepting filters, the thermal effect medium, the heat-generating resistance members, the planar microlenses, etc. which constitute the device according to the present embodiment can be manufactured in successive processes by the use of the photoetching technique and accordingly, these members including the optical system can be made integral with one another, and this leads to the possibility of providing a light-weight, compact and inexpensive device.

Figure 124:
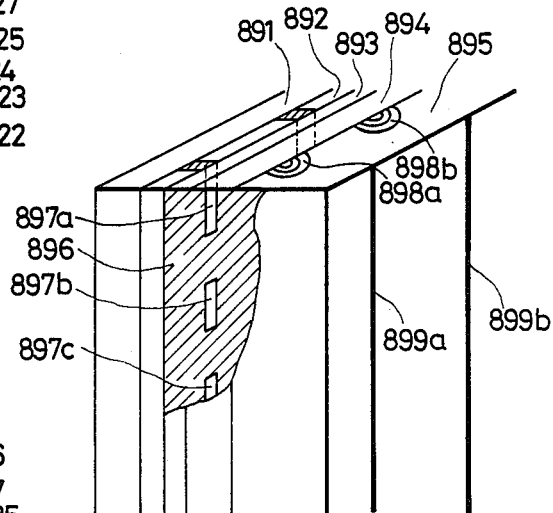
FIGS. 123 and 124 show an embodiment of the light modulating optical system using the present invention.

In the embodiment shown in FIG. 124, reference numeral 891 designates a glass substrate, reference numeral 892 denotes a layer including transparent heat-generating resistance member arrays 897a-897c, a light-intercepting filter 896 and transparent electrodes (not shown), reference numeral 893 designates a dielectric protective film, reference numeral 894 denotes a thermal effect medium, and reference numeral 895 designates a glass plate including therein planar microlenses 898a and 898b having a refractive power only in one direction. Reference characters 899a and 899b denote second light-intercepting filters in the form of stripes installed at the condensing positions of the planar microlenses 898a and 898b.

In the present embodiment, the direction of array of the heat-generating resistance members is the same as the lengthwise direction of the heat-generating resistance members and the distribution of refractive index by heat is liable to be formed in a direction orthogonal to the direction of array of the heat-generating resistance members. In such a case, the refractive power of the planar microlenses may exist only in the direction orthogonal to the direction of array of the heat-generating resistance members, and these lenses are equivalent to cylindrical lenses. Accordingly, the second light-intercepting filters may also be in the form of stripes extending in the direction of array.

Although not shown in the present embodiment, further planar microlenses may be adhesively secured to the rear of the second light-intercepting filters, whereby a light-weight, compact unitary type light modulating optical system similar to the embodiment of FIG. 123 can be obtained.

In the above-described two embodiments, the planar microlens means a so-called gradient index type planar microlens which locally provides a distribution of refractive index to a planar glass substrate due to ion exchange, but use may also be made of a distribution of refractive index type lens whose end surface is planar and which has a distribution of refractive index symmetrical in the radial direction relative to the optical axis.

Figure 125A:
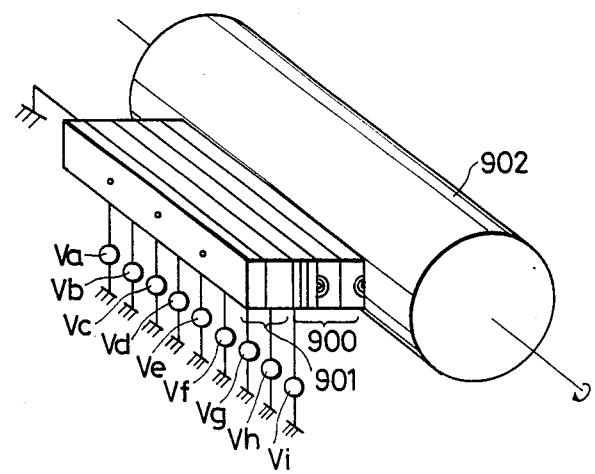
FIGS. 125(A) and (B) shows an embodiment in which the present invention is applied to a printer.
Figure 125B:
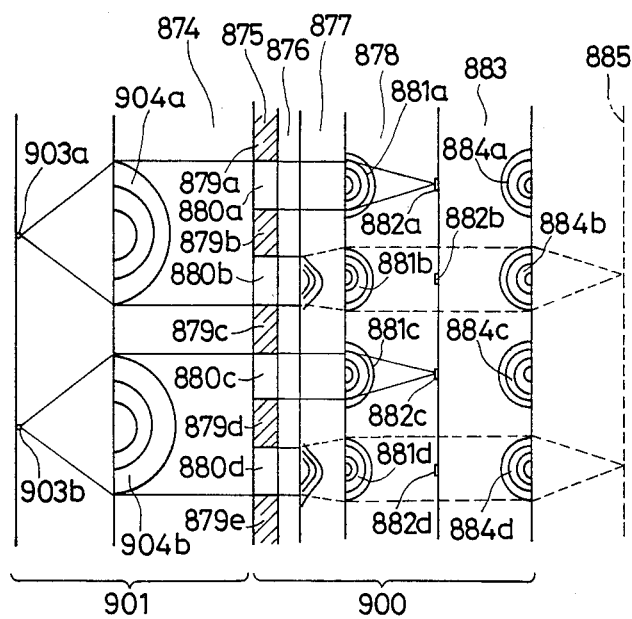

FIGS. 125(A) and (B) show an example in which the light modulating optical system shown in FIGS. 123 and 124 is applied to a printer. In FIG. 125(A), reference numeral 900 designates an arrangement in which the light modulating optical systems described in connection with FIG. 123 are arranged in a straight array, reference numeral 901 denotes an illuminating optical system, and reference numeral 902 designates a light-receiving medium. In FIG. 125(B) which illustrates the structure of the illuminating optical system 901 and of the light modulating optical system 900, the light modulating optical system is of the same structure as the embodiment of FIG. 123. The illuminating optical system 901 comprises LED arrays 903a, 903b, ... and planar microlens arrays 904a, 904b, ..., and is arranged such that a light flux collimated by a combination of an LED and a planar microlens illuminates two or more heat-generating resistance members of the light modulating optical system. By adopting such an arrangement, the number of LEDs can be reduced as compared with the number of heat-generating resistance members and thus, power consumption can be reduced. Also, by making the LED arrays 903a, 903b, . . . and the planar microlens arrays 904a, 904b, . . . integral with the light modulating optical system 900, the entire apparatus can be made compact.

According to the present embodiment, as described above, a light modulating optical system which is easy to manufacture and stable in structure as well as compact and light in weight can be provided by making the light modulating device and the optical system integral with each other.

We claim:

1. A light modulation apparatus comprising:
   a liquid medium whose refractive-index is variable dependent on temperature;
   means for imparting heat to said medium to such a degree that boiling does not occur to said medium to create a temperature distribution in said medium and forming a light modulating portion in said medium;
   means for condensing a light flux modulated by said light modulating portion; and
   a light-receiving member disposed at a position not optically conjugate with said light modulating portion with respect to said condensing means.

2. A light modulating device according to claim 1, wherein said device is provided with heat-generating resistance members as the heat-generating means.

3. A light modulating device according to claim 2, wherein said heat-generating resistance members are arranged in the form of a linear array.

4. A light modulating device according to claim 2, wherein said heat-generating resistance members are arranged in the form of a matrix.

5. A light modulating device according to claim 1, wherein a planar light-reflecting layer is provided between said liquid medium and said heat-generating means.

6. A light modulating device according to claim 1, wherein said device is further provided with a colored filter layer.

7. The light modulation apparatus of claim 1, wherein a plane defined by a boundary between the liquid medium and the heat-generating means is adapted to intersect the incidence direction of said light flux.

8. A light modulating device comprising:
   a liquid medium whose refractive index is variable dependent on temperature; and
   heat-generating means for heating said liquid medium to such a degree that boiling does not occur to said liquid medium to create a temperature distribution in said liquid medium so as to impart to said liquid medium a refractive-index distribution which is dependent on said temperature distribution;
   wherein said device further is provided with means for absorbing any pressure increase of said light medium.

9. The light modulating device of claim 8, wherein a plane defined by a boundary between the liquid medium and the heat-generating means is adapted to intersect the incidence direction of incident light flux.

10. A light modulation apparatus comprising:
    a liquid medium whose refractive-index is variable dependent on temperature;
    heat-generating means for heating said liquid medium to such a degree that boiling does not occur to said liquid medium to create a temperature distribution in said liquid medium so as to impart to said liquid medium a refractive-index distribution which is dependent on said temperature distribution;
    optical means for taking out one of a light flux modulated by said refractive-index distribution created in said liquid medium and a light flux not modulated by said refractive-index distribution from a state in which said light fluxes are mixedly present; and
    light receiving means for receiving the light flux taken out of said optical means, said light receiving means being provided so as not to be optically conjugate to the portion of the liquid medium where said refractive-index distribution is generated.

11. The light modulation apparatus of claim 10, wherein a plane defined by a boundary between the liquid medium and the heat-generating means is adapted to intersect the incidence direction of said light flux modulated by said refractive-index distribution.

12. An apparatus for controlling the quantity of light, comprising:
    a light modulating device, said device including a liquid medium whose refractive-index is variable dependent on temperature, and heat-generating means for heating said liquid medium to such a degree that boiling does not occur to said liquid medium to create a temperature distribution in said liquid medium; and
    means for controlling the quantity of a light flux subjected to modulation by said light modulating device;
    wherein said means for controlling the quantity of a light flux comprises illuminating means capable of applying a light flux to said light modulating device for a time shorter than a predetermined time during which said light modulating device can modulate the light flux in accordance with an input signal, and means for controlling the amount of relative time lag between the inputting of said input signal and the light emission of said illuminating means.

13. The apparatus for controlling the quantity of light of claim 12, wherein a plane defined by a boundary between the liquid medium and the heat-generating means is adapted to intersect the incidence direction of said light flux which is subjected to modulation.

14. A light modulating device for modulating an incidence light flux within a predetermined time with respect to an input signal, in which the modulatable quantity of light varies within said predetermined time, said device comprising:
    a liquid medium whose refractive-index is variable dependent on temperature;
    means for heating said liquid medium to such a degree that boiling does not occur to said liquid medium to create a temperature distribution in said liquid medium so as to impart to said liquid medium a refractive-index distribution which is dependent on said temperature distribution; and
    illuminating means for causing a light flux to enter said liquid medium for a time shorter than said predetermined time and having a predetermined ratio with respect to said predetermined time.

15. The light modulating device of claim 14, wherein a plane defined by a boundary between the liquid medium and the heat-generating means is adapted to intersect the incidence direction of said light flux.

16. A light modulation apparatus comprising:

a liquid medium whose refractive-index is variable dependent on temperature;

means for imparting regulated heat to said medium to such a degree that boiling does not occur to said medium so as to create a temperature distribution in said medium and forming a light modulating portion in said medium; and means for maintaining a light-receiving member for receiving a light flux modulated by said light modulating portion in said medium and wherein a diverse point of said modulated light flux which has been caused to diverge by said light modulating portion is in an optically conjugate relation to said light-receiving member.

17. The light modulation apparatus of claim 16, wherein a plane defined by a boundary between the liquid medium and the heat-generating means is adapted to intersect the incidence direction of said light flux.

18. A light modulation apparatus comprising:

a liquid medium whose refractive index is variable dependent on temperature;

means for imparting heat to said medium to such a degree that boiling does not occur to said medium to create a temperature distribution in said liquid and forming a light modulating portion in said medium;

means for causing a light flux to obliquely enter said light modulating portion;

optical means for directing the light flux from said liquid medium to a predetermined direction; and a light receiving means for receiving the light flux directed by said optical means, said optical means being provided so as not to be optically conjugate to said light modulating portion.

19. The light modulation apparatus of claim 11, wherein a plane defined by a boundary between the liquid medium and the heat-generating means is adapted to intersect the incidence direction of said light flux.

* * * * *

UNITED STATES PATENT AND TRADEMARK OFFICE
CERTIFICATE OF CORRECTION

PATENT NO. : 4,848,879  
DATED : July 18, 1989  
INVENTOR(S) : Nishimura, et al.

It is certified that error appears in the above-identified patent and that said Letters Patent is hereby corrected as shown below:

COLUMN 7,
    Line 46, change "111" to --111(A) and (B)--.

COLUMN 9,
    Line 35, change "tform" to --to form--.

COLUMN 12,
    Line 44, change "heated are" to --heated area--.

COLUMN 15,
    Line 20, change "$\Delta n/\leftarrow T$" to --$\Delta n/\Delta T$--.

COLUMN 16,
    Line 35, change "bf" to --of--; and
    Line 45, change "topproduce" to --to produce--.

COLUMN 17,
    Line 23, change "FIGS. 8(A)-8(B)" to --FIGS. 8(A)-8(F)--.

COLUMN 18,
    Line 53, change "i" to --in--.

COLUMN 22,
    Line 13, change "numeral 1]3" to --numeral 113--.

COLUMN 23,
    Line 13, change "o" to --or--; and
    Line 38, change "Eve" to --Even--.

COLUMN 26,
    Line 29, change "firs" to --first--.

UNITED STATES PATENT AND TRADEMARK OFFICE
CERTIFICATE OF CORRECTION

PATENT NO.   : 4,848,879

DATED        : July 18, 1989

INVENTOR(S) : Nishimura, et al.

It is certified that error appears in the above-identified patent and that said Letters Patent is hereby corrected as shown below:

COLUMN 27,
    Line 48, change "add" to --and--.

COLUMN 29,
    Line 21, change "rea" to --rear--;
    Line 27, change "th" to --the--;
    Line 41, change "a" to --an--; and
    Line 58, change "t" to --to--.

COLUMN 37,
    Line 17, change "t" to --to--.

COLUMN 94,
    Line 10, change "of" to --by--.

COLUMN 96,
    Line 16, change "claim 11," to --claim 18,--.

Signed and Sealed this

Twenty-sixth Day of November, 1991

Attest:

HARRY F. MANBECK, JR.

*Attesting Officer*    *Commissioner of Patents and Trademarks*